United States Patent
Endo

(10) Patent No.: US 7,002,972 B1
(45) Date of Patent: Feb. 21, 2006

(54) FACSIMILE COMMUNICATION SYSTEM

(75) Inventor: Hiroshi Endo, Saitama (JP)

(73) Assignee: Oki Data Corporation, Tokyo (JP)

( * ) Notice: Subject to any disclaimer, the term of this patent is extended or adjusted under 35 U.S.C. 154(b) by 981 days.

(21) Appl. No.: 09/651,362

(22) Filed: Aug. 28, 2000

(30) Foreign Application Priority Data

Sep. 27, 1999 (JP) ................................. 11/271531

(51) Int. Cl.
*H04L 12/56* (2006.01)
(52) U.S. Cl. ....................... 370/401; 370/235; 370/508
(58) Field of Classification Search ................ 370/401, 370/412, 413, 415, 419, 352, 353, 252, 516, 370/517, 508, 229, 231, 232, 235; 379/90.01, 379/100.01, 100.05, 100.06
See application file for complete search history.

(56) References Cited

U.S. PATENT DOCUMENTS

| | | | |
|---|---|---|---|
| 6,483,600 B1 * | 11/2002 | Schuster et al. ........... 358/1.15 |
| 6,757,367 B1 * | 6/2004 | Nicol ...................... 379/90.01 |
| 6,765,931 B1 * | 7/2004 | Rabenko et al. ............ 370/493 |

* cited by examiner

*Primary Examiner*—Brian Nguyen
(74) *Attorney, Agent, or Firm*—Rabin & Berdo, P.C.

(57) ABSTRACT

A facsimile communication system is provided which is capable of sending out picture data from a gateway device on a receiver side to a facsimile device on the receiver side even in the development of delays in communications caused by fluctuations in a communication network and of avoiding a forced breakdown of the facsimile communication occurring based on a judgement by the facsimile communication system that a communication failure has occurred due to the delays in communications.

In the facsimile communication system, the gateway device on the receiver side, after receiving a digital instruction (DCS) signal from the gateway device on a sender side, without waiting for the receipt of a receiving preparation confirmation (CFR) signal to be fed from a facsimile device on the receiver side, returns, for itself, the CFR signal to the gateway device on the sender side and then starts to receive picture data from the gateway device on the receiver side. The gateway device on the receiver side starts to send the picture data to the facsimile device on the receiver side when accumulated amounts of received picture data exceeds amounts of data required to prevent communication failures.

28 Claims, 26 Drawing Sheets

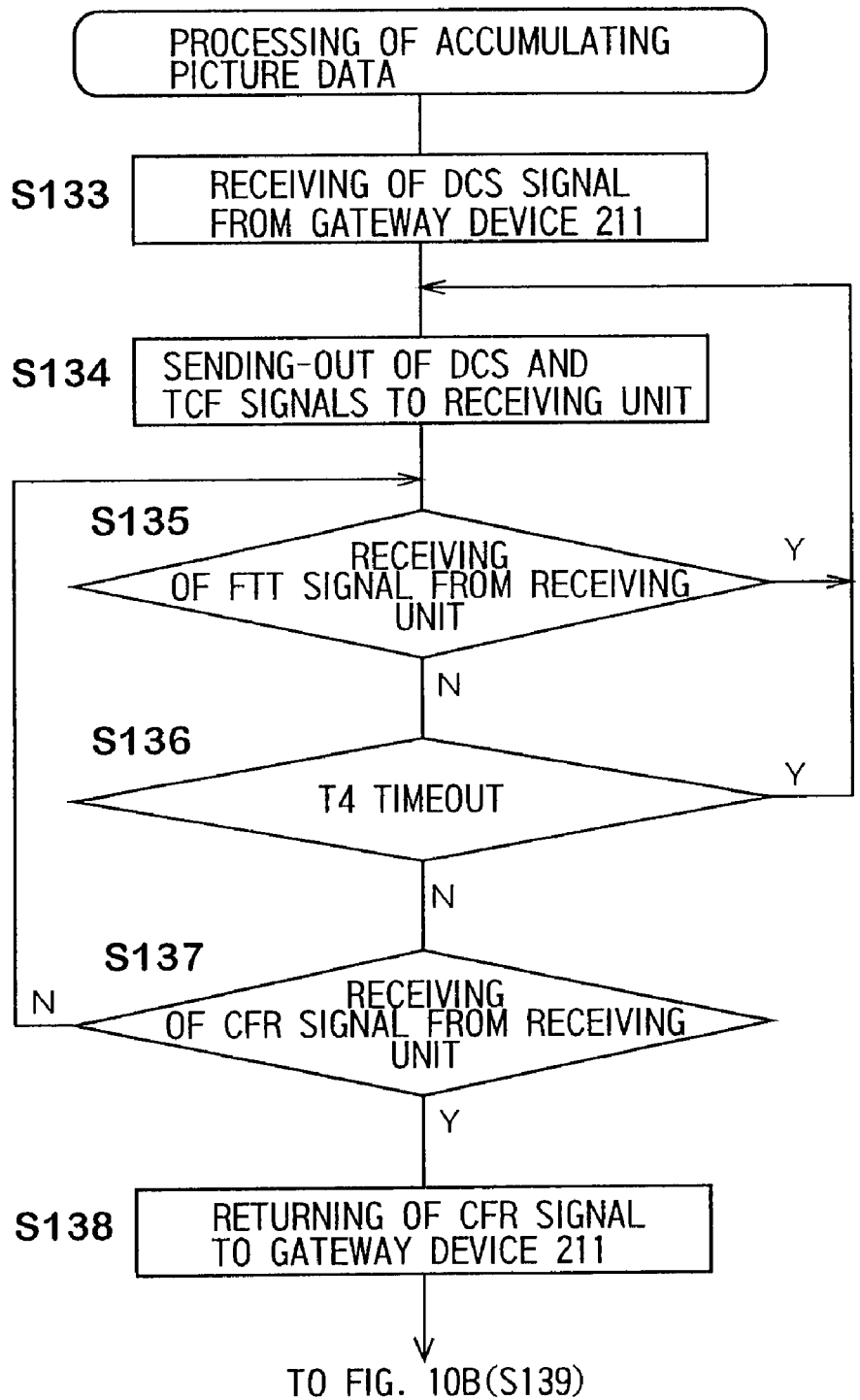

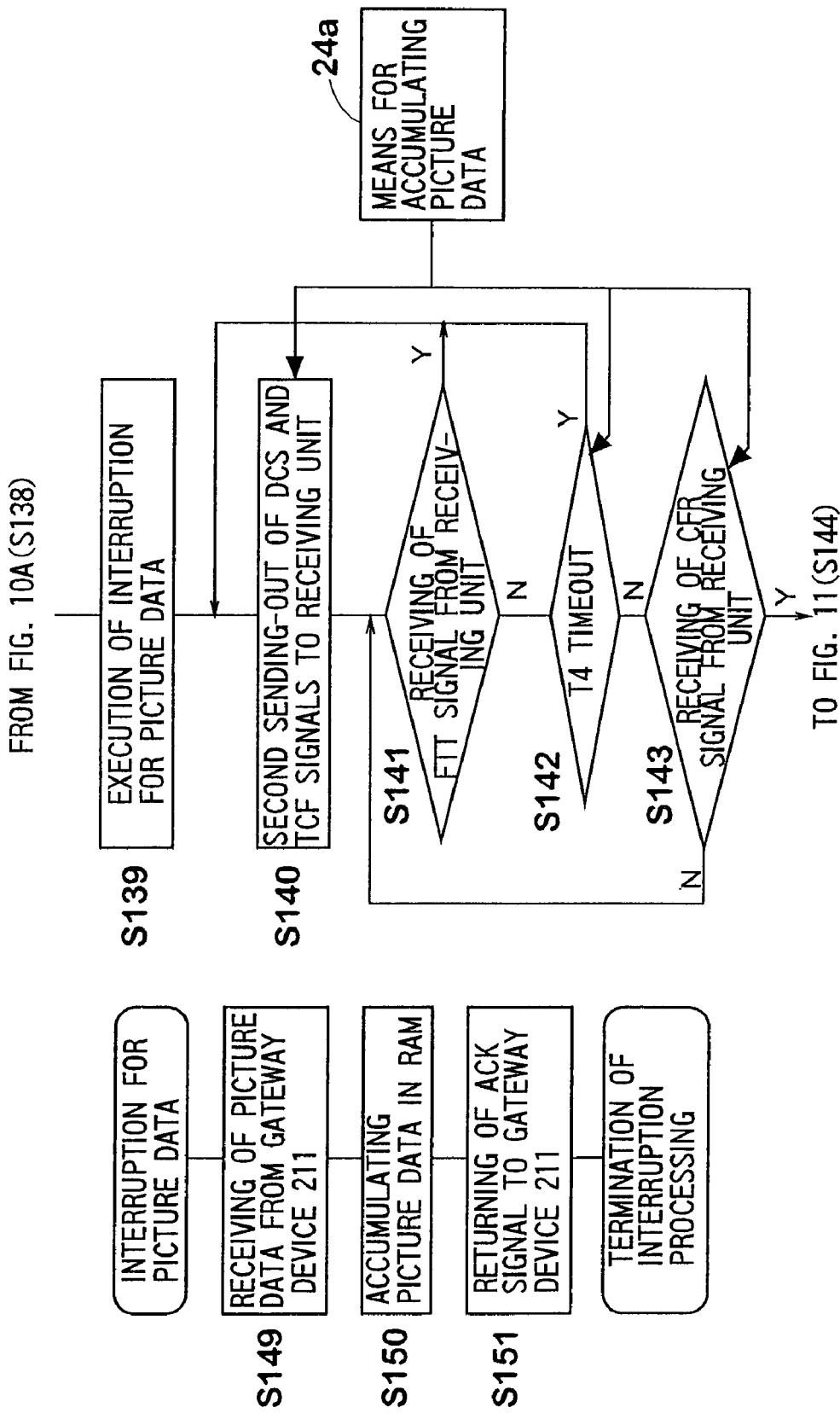

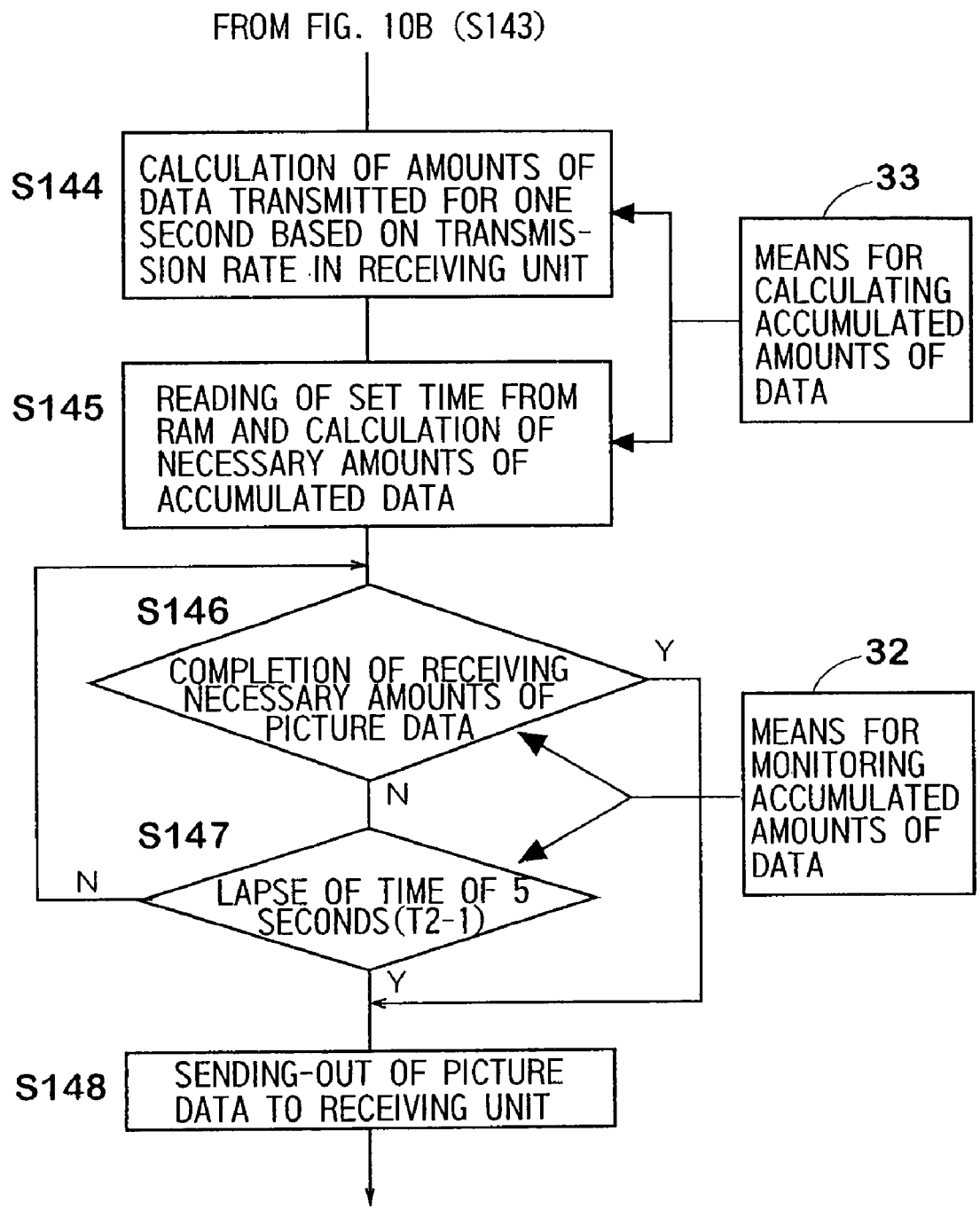

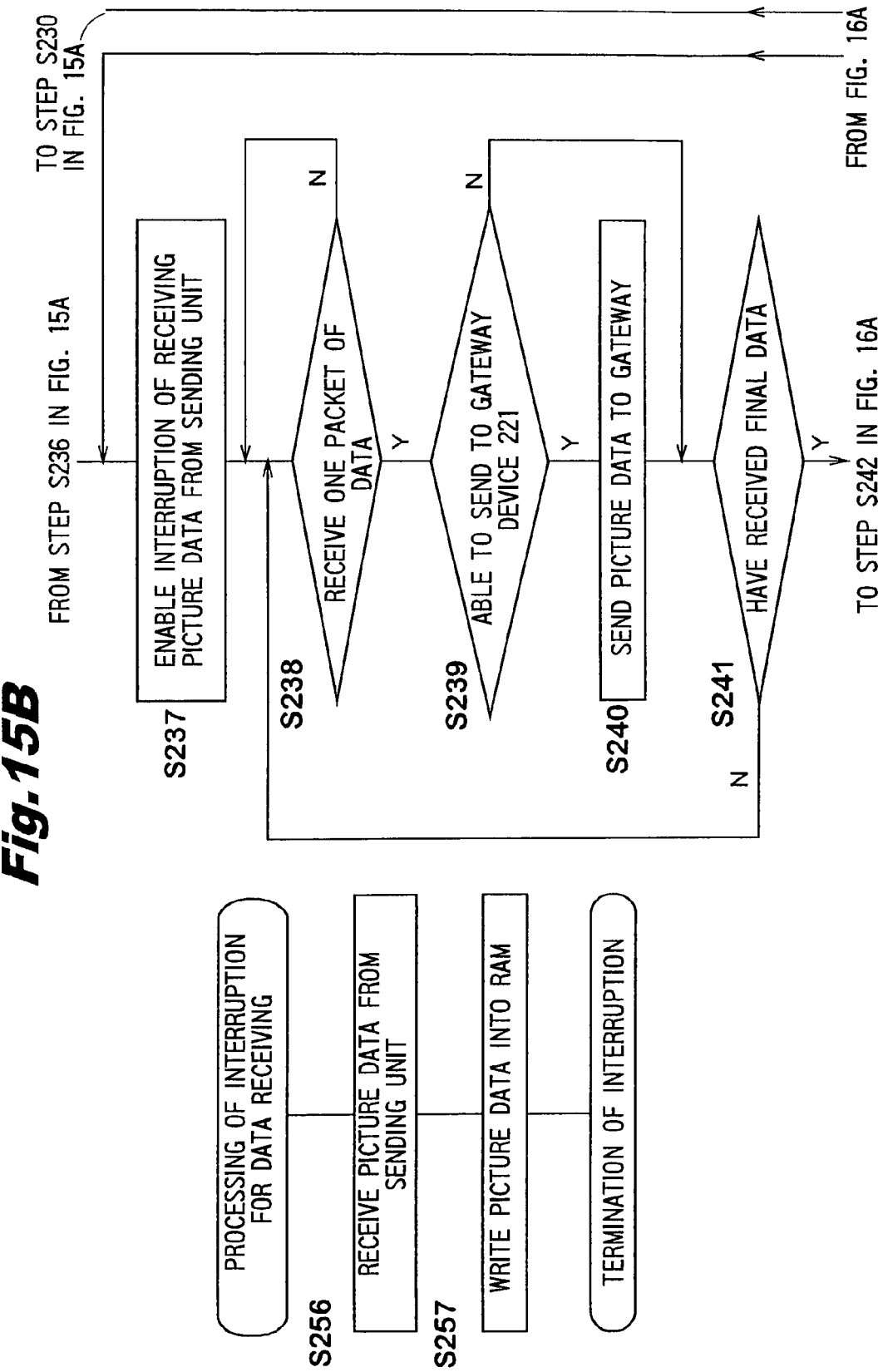

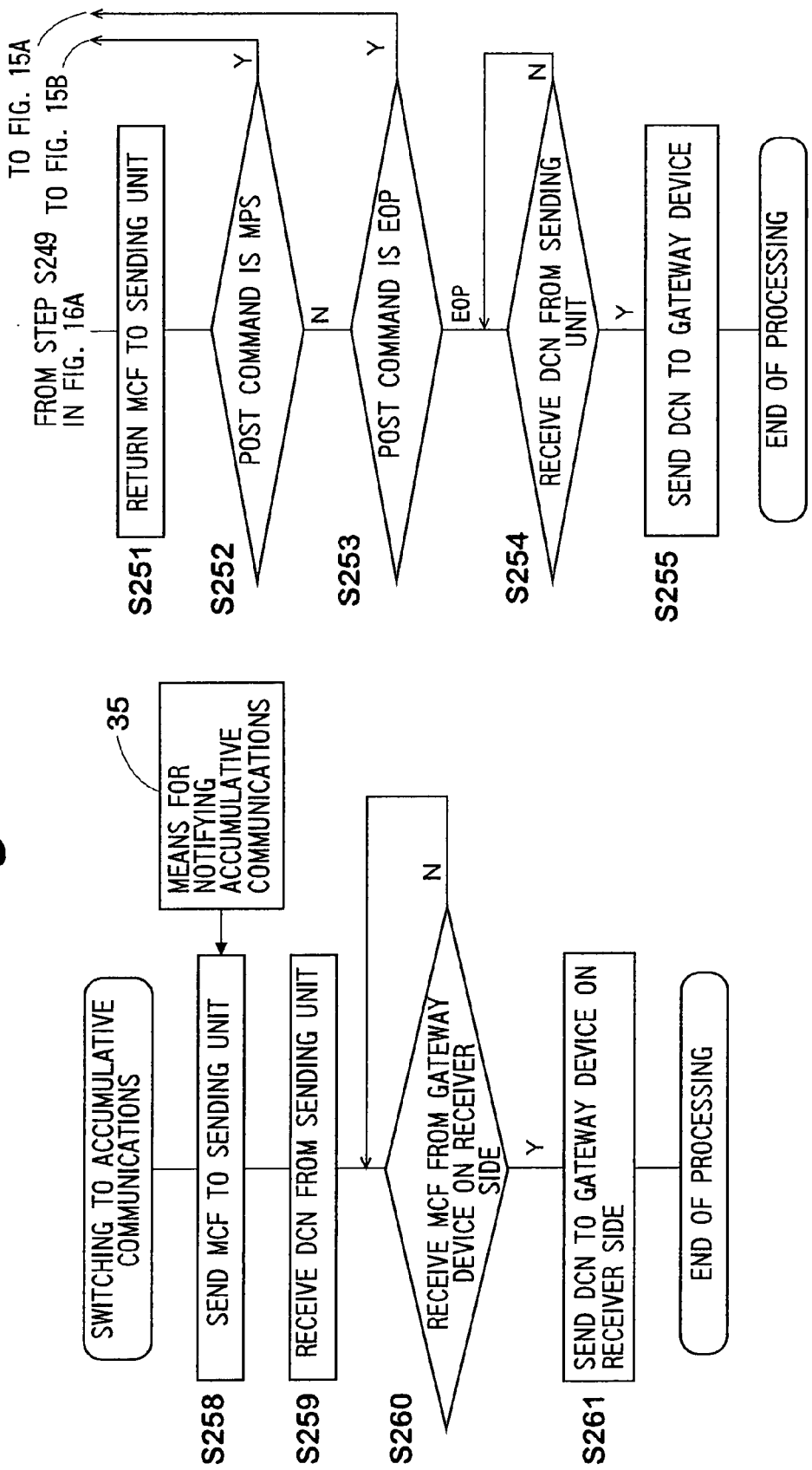

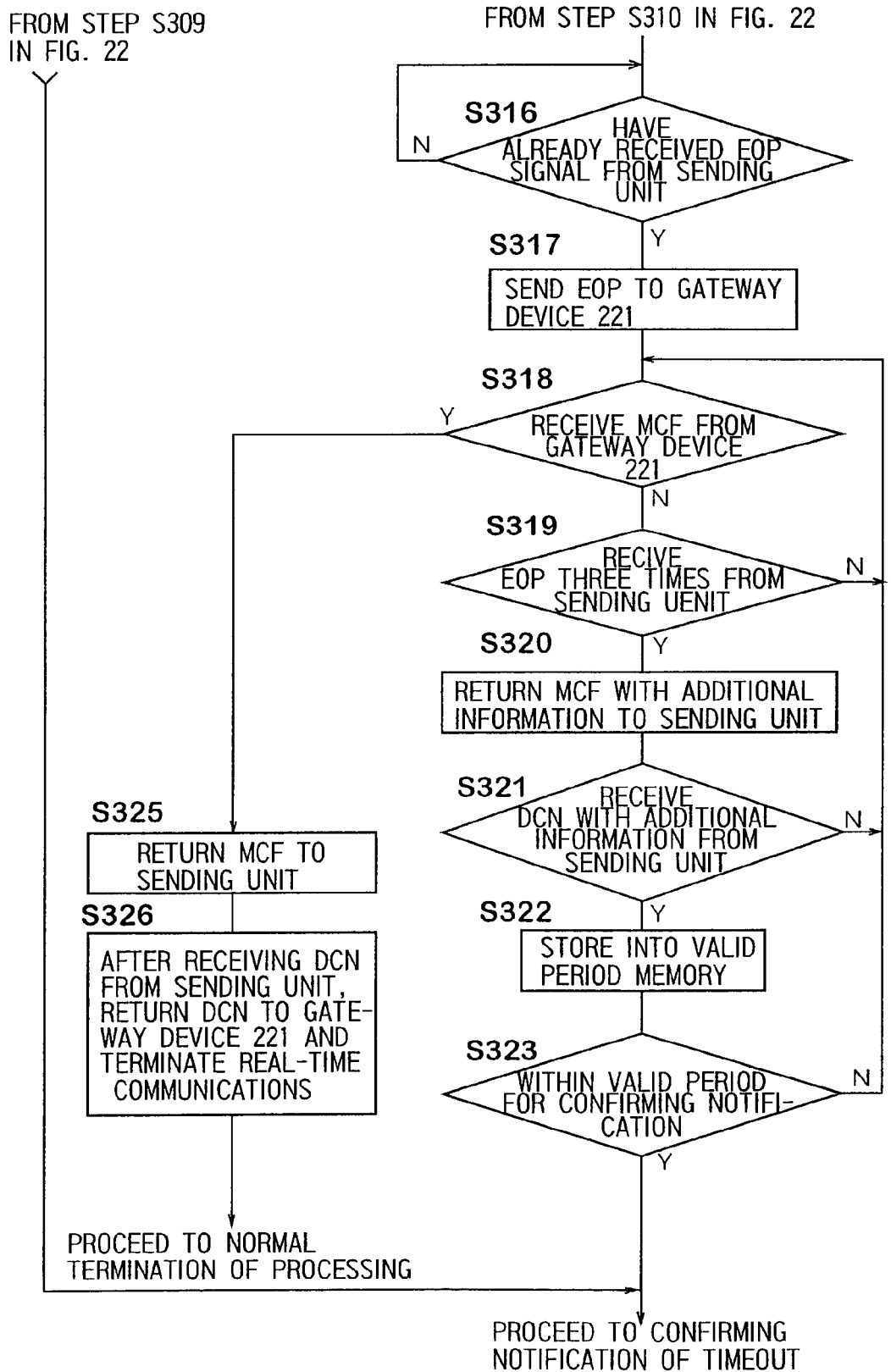

FACSIMILE COMMUNICATION SYSTEM

BACKGROUND OF THE INVENTION

1. Field of the Invention

The present invention relates to a facsimile communication system and more particularly to the facsimile communication system to perform facsimile communications through a communication network including a packet communication network or a like which uses a communication protocol being different from that applied to a telephone network.

2. Description of the Related Art

A communication procedure for the facsimile device connected to a public telephone network is designated in ITU-T (International Telecommunication Union-Telecommunication Standardization Sector), Recommendation T.30. According to the recommended communication procedure, generally, after a call is made, predetermined control signals are exchanged in consecutive order and data such as picture data is sent and received. In the facsimile device, in order to check if communications are normally performed, whether a valid signal is received within a predetermined time after a signal for the facsimile communications is sent is monitored. If the valid signal is not received within the predetermined time, the signal previously sent is transmitted again. If the re-sending is repeated predetermined number of times and nevertheless the valid signal is not received, the facsimile communication system judges a communication failure to have occurred and stops the subsequent facsimile communications forcedly.

In recent years, as an Internet becomes rapidly widespread, a communication procedure to implement the facsimile communications which can be performed through the Internet is proposed. According to the proposed communication procedure, each of paired facsimile devices is connected through the telephone network to each of gateway devices. The gateway devices are connected to each other through a packet communication network constituting the Internet. In the packet communication network connecting both the gateway devices, mutual communications are performed in accordance with the communication procedures designated in the ITU-T, Recommendation T.38.

However, the conventional facsimile communication system as described above have the following problems to be solved. That is, in the conventional communication network, if a traffic amount increases due to increased amount of the packet, there is a risk of the local occurrence of big delays in communications. While the facsimile communications are performed, remarkable delays in communications between both the gateway devices develop. If such delays in communications develop between both the gateway devices, the delays in communications are transferred to the telephone network connecting the facsimile device to the gateway device. According to the communication procedures designated in the ITU-T Recommendation T.30 described above, if the communication delays exceeding a predetermined scale develop, a communication failure is judged to have occurred and the subsequent facsimile communications are forcedly stopped.

SUMMARY OF THE INVENTION

In view of the above, it is an object of the present invention to provide a facsimile communication system which is capable of sending out picture data from a gateway device on a receiver side to a facsimile device on the receiver side even in the development of delays in communications caused by fluctuations in a communication network and of avoiding a forced breakdown of the facsimile communication occurring based on a judgement by the facsimile communication system that a communication failure has occurred due to the delays in communications.

In the following Summary, the meaning of acronyms is a follows: CFR—confirmation of facsimile receipt; DCN—discontinue communication notification; DCS—digital communication signal; EOF—end-of-file; EOP—end of procedure; MCF—message confirmation function; NSF—non-standard function; NSS—non-standard function setting; and TCF—training check function.

According to a first aspect of the present invention, there is provided a facsimile communication system including:

a facsimile device on a sender side;

a gateway device on a sender side connectable through a telephone line to the facsimile device;

a gateway device on a receiver side connectable to the gateway device on the sender side through a communication line to which a protocol being different from that applied to the telephone line is applied;

a facsimile device on a receiver side connectable to the gateway device on the receiver side through the telephone line to which the same protocol as applied to the telephone line is applied; and whereby the gateway device on the receiver side is provided with memory, to store data transferred from the gateway device on the sender side, used when the data is transmitted from the facsimile device on the sender side through both the gateway devices to the facsimile device on the receiver side, a monitoring circuit to monitor accumulated amounts of the data to be stored in the memory and an accumulated data amount calculating circuit operated to store, in the memory, amounts of data required to prevent communication failures between the gateway device on the receiver side and the facsimile device on the receiver side even when delays in communications develop prior to the start of transmission of the data from the gateway device on the receiver side to the facsimile device on the receiver side and operated to calculate the required amounts of data, and the gateway device on the receiver side is operated to start the transmission of the data to the facsimile device on the receiver side when the accumulated amounts of data to be monitored by the accumulated amount data calculating circuit exceed the required amounts of data.

In the foregoing, a preferable mode is one wherein the gateway device on the receiver side calculates delays in communications developing in said communication line for every communication prior to the receipt of the data from the gateway device on the sender side and, when the gateway device on the receiver side judges that the communication failures may occur due to the calculated delays in communications, stores the required amounts of data in the memory based on the calculated delays in communications.

Also, a preferable mode is one wherein the delays in communications are calculated from expected delayed time data.

Also, a preferable mode is one wherein the gateway device on the receiver side judges, for every communication, whether the communication failures may occur or not based on not only the delays in communications but also a transmission rate in communications between the gateway device on the receiver side and the facsimile device on the receiver side.

Also, a preferable mode is one wherein the gateway device on the receiver side, when time elapsed after the facsimile device on the receiver side has completed a preparation for the receipt of data exceeds a predetermined threshold time being shorter than a threshold time for a communication breakdown set to communications between the gateway device on the receiver side and the facsimile device on the receiver side, regardless of whether the accumulation of required amounts of data in the memory is completed or not, transfers the data stored in the memory in consecutive order to the facsimile device on the receiver side in order to prevent the breakdown of communications between the gateway device on the receiver and the facsimile device on the receiver side.

Also, a preferable mode is one wherein the data is compressed picture data.

Also, a preferable mode is one wherein the gateway device on the receiver side, when receiving a DCS signal showing a communication mode from the facsimile device on the sender side through the gateway device on the sender side, transfers the DCS signal to the facsimile device on the receiver side and, before receiving a CFR signal showing a confirmation of the completion of receiving preparation from the facsimile device on the receiver side which has responded to the DCS signal, returns another CFR signal used to receive the data from the facsimile device on the sender side through the gateway device on the sender side to the facsimile device on the sender side.

Also, a preferable mode is one wherein the gateway device on the receiver side, when receiving the DCS signal showing the communication mode from the facsimile device on the sender side through the gateway device on the sender side, transfers the DCS signal to the facsimile device on the receiver side and then sends a TCF signal used to check a receiving capability of the facsimile device on the receiver side to the facsimile device on the receiver side and, after completion of the transmission of the TCF signal, sends a new TCF signal to the facsimile device on the receiver side before the time elapsed after the facsimile device on the receiver side has completed a preparation for receiving data exceeds said predetermined threshold time being shorter than a threshold time for a communication breakdown set to communications between the gateway device on the receiver side and the facsimile device on the receiver side, in order to prevent the breakdown of communications between the gateway device on the receiver side and the facsimile device on the receiver side during the accumulation of the required amounts of data.

According to a second aspect of the present invention, there is provided a facsimile communication system including:
a facsimile device on a sender side;
a gateway device on a sender side connectable through a telephone line to the facsimile device;
a gateway device on a receiver side connectable to the gateway device on the sender side through a communication line to which a protocol being different from that applied to the telephone line is applied;
a facsimile device on the receiver side connectable to the gateway device on the receiver side through the telephone line to which the same protocol as applied to the telephone line is applied and, after receiving all the data to be sent from the facsimile device on the sender side for every communication through the gateway device on the sender side and the gateway device on the receiver side, operated to return a receiving confirming signal showing completion of the receipt to the facsimile device on the sender side through the gateway on the receiver side and the gateway device on the sender side, and whereby the gateway device on the sender side, after receiving all the data to be sent to the facsimile device on the receiver side from the facsimile device on the sender side and before receiving the receiving confirming signal from the facsimile device on the receiver side, sends a disconnection instructing signal instructing the disconnection of communications between the facsimile device on the sender side and the gateway device on the sender side to the facsimile device on the sender side.

In the foregoing, a preferable mode is one wherein the facsimile device on the sender side, when receiving the disconnection instructing signal, sends a communication ending signal showing a termination of communications to the gateway device on the sender side and wherein the gateway device on the sender side, when receiving the communication ending signal from the facsimile device on the sender side, makes a transmission of the communication ending signal to the facsimile device on the receiver side pending and when receiving the receiving confirming signal from the facsimile device on the receiver side, sends the communication ending signal to the facsimile device on the receiver side through the gateway device on the receiver side.

Also, a preferable mode is one wherein the data is compressed picture data.

Also, a preferable mode is one wherein the receiving confirming signal is a first MCF signal and wherein the gateway device on the sender side is provided with a first notifying section operated to send a second MCF signal to the facsimile device on the sender side when, before the gateway device on the sender side receives the first MCF signal from the facsimile device on the receiver side through the gateway device on the receiver side, the gateway device on the sender side receives an EOP signal, which show that the transmission of all the data from the facsimile device on the sender side to the gateway device on the sender side has been completed, by predetermined number of times from the facsimile device on the sender side.

Also, a preferable mode is one wherein the second MCF signal contains the disconnection instructing signal instructing the disconnection of communications between the facsimile device on the sender side and the gateway device on the sender side as additional information.

Also, a preferable mode is one wherein the gateway device on the sender side is provided with a second notifying section operated to send a non-standard function signal (NSF signal) showing that the gateway device on the sender side has a capability of sending the second MCF signal to the facsimile device on the sender side prior to the receipt of the data from the facsimile device on the sender side.

Also, a preferable mode is one wherein the facsimile device on the sender side is provided with a notifying section operated to send, when receiving the NSF signal, a non-standard function setting signal (NSS signal) showing that the facsimile device on the sender side has a capability of receiving the second MCF signal.

Also, a preferable mode is one wherein the facsimile device on the sender side, when receiving the second MCF signal, sends the DCN signal being the communication ending signal to the gateway device on the sender side to terminate communications and wherein the gateway device on the sender side, when receiving the first MCF signal after having received the DCN signal, sends the DCN signal to the facsimile device on the receiver side through the gateway device on the receiver side.

Also, a preferable mode is one wherein the facsimile device on the sender side is provided with a notifying section operated to send, when receiving the second MCF signal, a first DCN signal being the DCN signal used to notify the termination of communications between gateway device on the sender side and facsimile device on the sender side containing additional information, to the gateway device on the sender side.

Also, a preferable mode is one wherein the additional information contained in the first DCN signal includes information as to whether the facsimile device on the receiver side requests that the NSS signal being a confirmation notifying signal containing the information as to whether the gateway device on the sender side has received the first MCF signal after the gateway device on the sender side has disconnected communications between the gateway device on the sender side and the facsimile device on the sender side be returned to the facsimile device on the receiver side.

A preferable mode is one wherein the gateway device on the sender side is provided with a second notifying section operated to send the NSS signal containing information as to whether the gateway device on the sender side has received the first MCF signal to the facsimile device on the sender side after the disconnection of communications between the gateway device on the sender side and the facsimile device on the sender side based on the first DCN signal and wherein the gateway device on the sender side, after receiving the first DCN signal, sends a second DCN signal used to terminate communications between the gateway device on the receiver side and the facsimile device on the receiver side to the facsimile device on the receiver side through the gateway device on the receiver side and then makes a call to the facsimile device on the sender side and, after having made the call, sends the NSS signal to the facsimile device on the sender side.

Also, a preferable mode is one wherein the facsimile device on the sender side is provided with a valid period setting section operated to set a valid period when the facsimile device on the sender side is able to receive the NSS signal containing information showing that the gateway device on the sender side has received the first MCF signal and wherein the facsimile device on the sender side, when receiving the second MCF signal, sends the first DCN signal with additional information added, to the gateway device on the sender side so that the gateway device on the sender side sends the NSS signal within the valid period to the facsimile device on the sender side.

Also, a preferable mode is one wherein the additional information is the information about the valid period.

Furthermore, a preferable mode is one wherein the gateway device on the sender side is provided with a second notifying section and wherein the gateway device on the sender side, after receiving the first DCN signal together with the additional information, sends a second DCN signal used to terminate communications between the gateway device on the receiver side and the facsimile device on the receiver side to the facsimile device on the receiver side through the gateway device on the receiver side and then makes a call to the facsimile device on the sender side and, after having made the call, by using the second notifying section, sends the NSS signal to the facsimile device on the sender side.

BRIEF DESCRIPTION OF THE DRAWINGS

The above and other objects, advantages and features of the present invention will be more apparent from the following description taken in conjunction with the accompanying drawings in which:

FIG. 10A is a first part of a flowchart explaining operations of the gateway device according to the second embodiment;

FIG. 10B is a second part of a flowchart explaining operations of the gateway device according to the second embodiment;

FIG. 11 is a third part of the flowchart explaining operations of the gateway device according to the second embodiment;

FIG. 15B is a second part of a flowchart explaining operations of the gateway device according to the third embodiment;

FIG. 16B is a fourth part of the flowchart explaining operations of the gateway device according to the third embodiment;

FIG. 23 is a second part of the flowchart explaining operations of the gateway device according to the fifth embodiment.

DESCRIPTION OF THE PREFERRED EMBODIMENTS

Best modes of carrying out the present invention will be described in further detail using various embodiments with reference to the accompanying drawings.

In the following Description, the meaning of acronyms is as follows: CFR—confirmation of facsimile receipt; DCN—discontinue communication notification; DCS—digital communication signal; EOF—end-of-file; EOP—end of procedure; MCF—message confirmation function; NSF—non-standard function; NSS—non-standard function setting; and TCF—training check function.

First Embodiment

Figure 1:
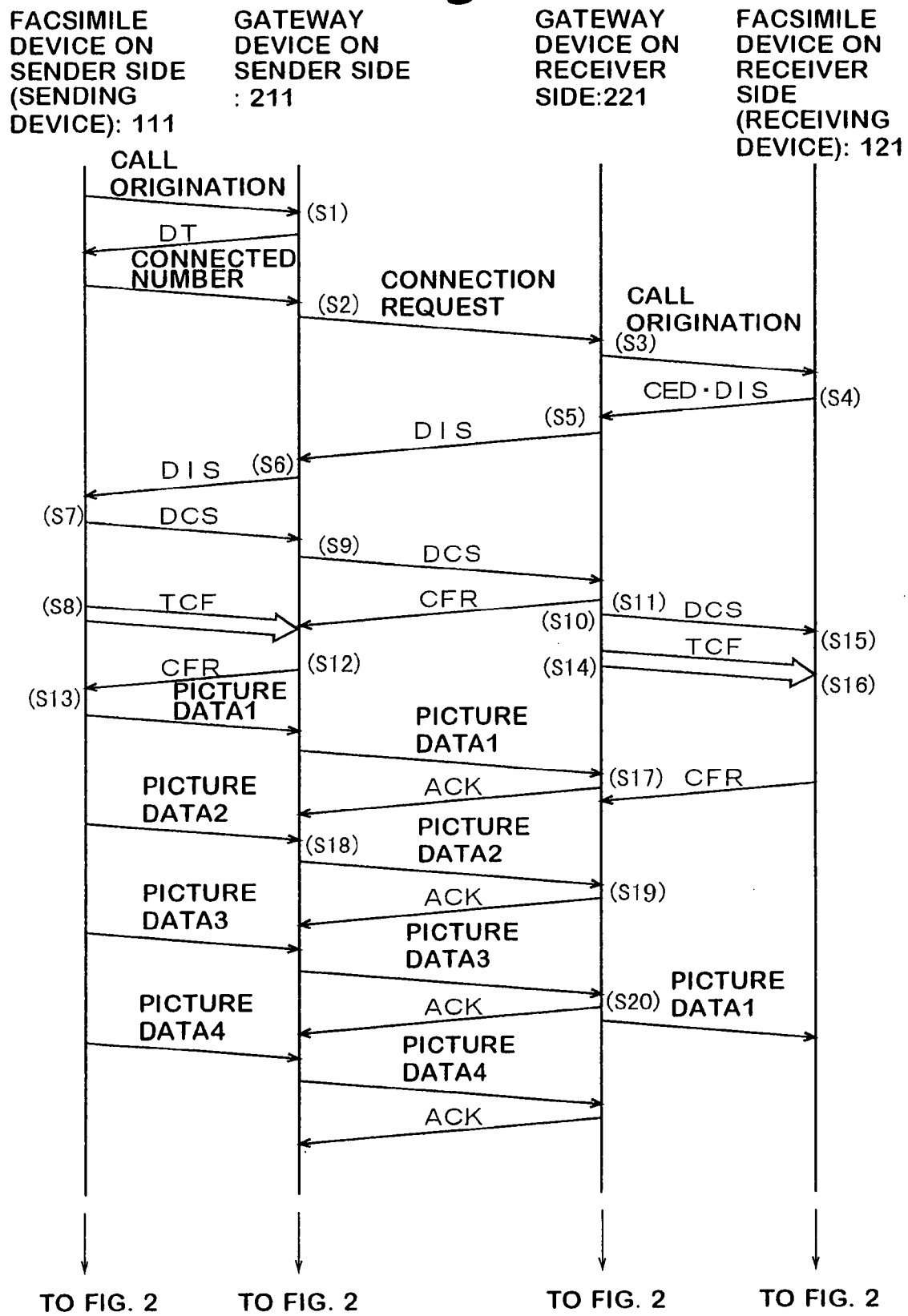
FIG. 1 is a first part of a diagram explaining communication procedures for a facsimile communication system according to a first embodiment of the present invention.
Figure 2:
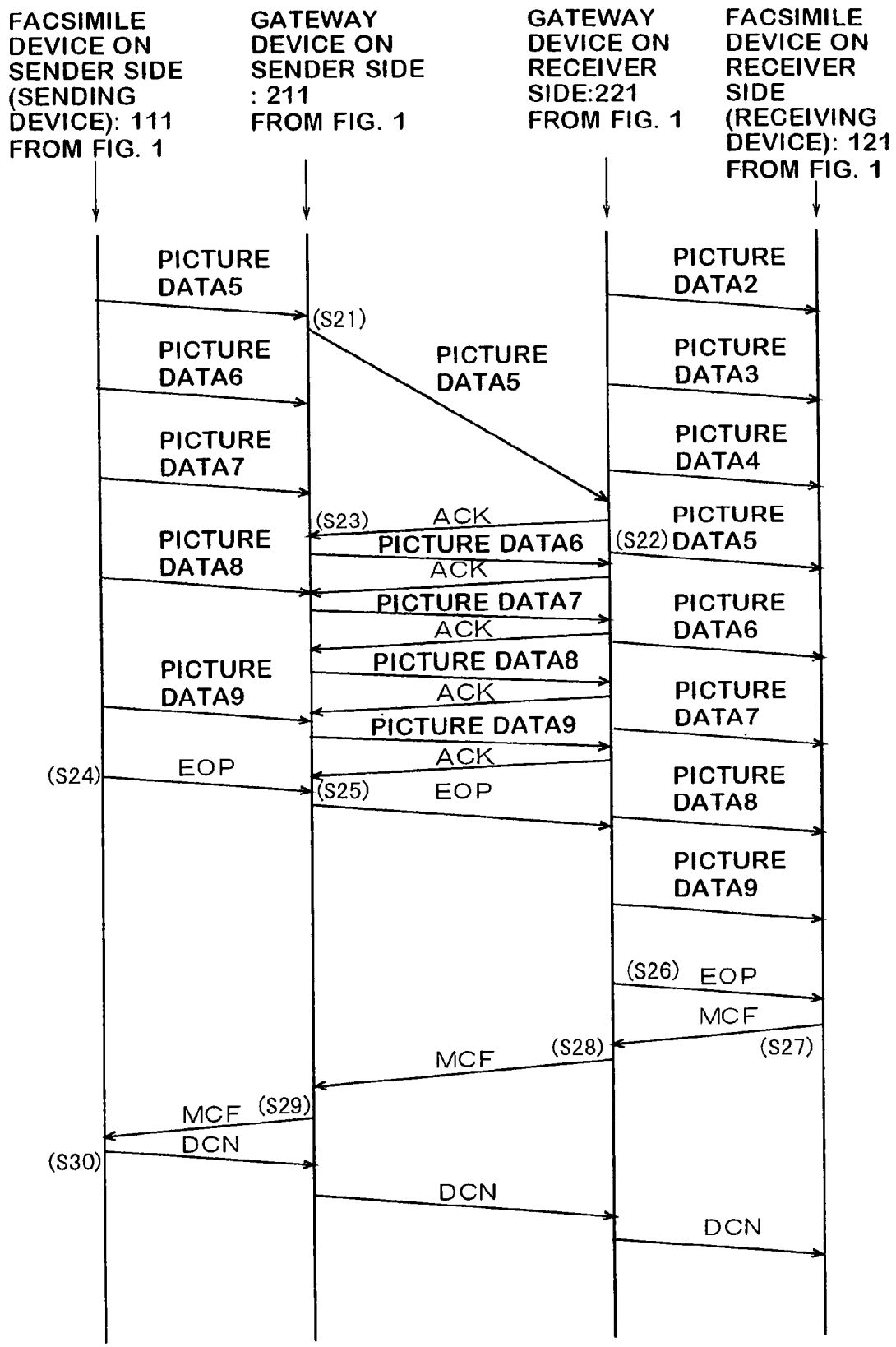
FIG. 2 is a second part of the above diagram explaining communication procedures for the facsimile communication system according to the first embodiment of the present invention.

FIGS. 1 and 2 are a first part and a second part, respectively, of a diagram explaining communication procedures for a facsimile communication system according to a first embodiment of the present invention. The procedures shown in the diagrams in FIGS. 1 and 2 contain communication procedures specific to the facsimile communication system of this embodiment. Prior to explanations of these procedures, configurations of the facsimile communication system of the present invention will be described by referring to FIG. 3.

Figure 3:
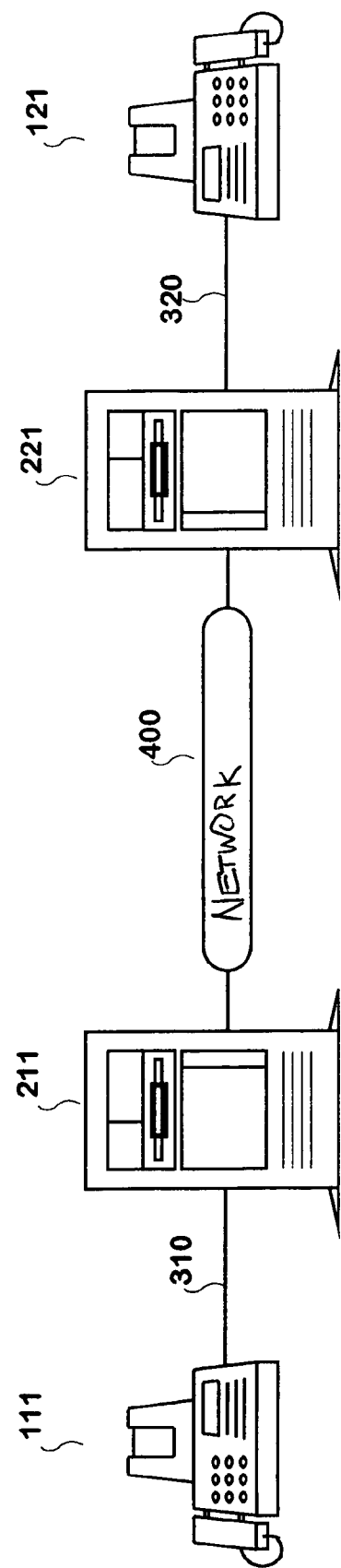
FIG. 3 is a block diagram showing the whole configuration of the facsimile communication system of the first embodiment.

FIG. 3 is a block diagram showing the whole configuration of the facsimile communication system of the first embodiment of the present invention. The facsimile communication system of the embodiment includes at least a pair of facsimile devices and at least a pair of gateway devices. As shown in FIG. 3, the facsimile communication system is chiefly composed of a facsimile device 111, a gateway device 211 that can be connected through a telephone line 310 to the facsimile device 111, a gateway device 221 that can be connected through a packet communication network 400 to the gateway device 211 and a facsimile device 121 that can be connected through a telephone line 320 to which the same communication protocol as is applied to the telephone line 310 is applied, to the gateway device 221. The packet communication network 400 is composed of, for example, the Internet. When facsimile communications are performed between the paired devices described above, if one of the paired facsimile devices is used as a sender of an image information, the facsimile device and one of the gateway devices function as the facsimile device on the sender side and as the gateway device on the sender side, while the other of the paired facsimile devices and the other gateway device function as the facsimile device on the receiver side and as the gateway device on the receiver side. As shown in FIG. 3, the communications between the facsimile devices 111 and 121 are performed through the packet communication network 400. Between the facsimile device 111 and the gateway device 211 and between the facsimile device 121 and the gateway device 221, the facsimile communications are performed in accordance with procedures designated by the ITU-T Recommendation T.30. Between the gateway devices 211 and 221, the facsimile communications are performed in accordance with procedures designated by the ITU-T Recommendation T.38.

Configurations of the facsimile device 111 are the same as those of the facsimile device 121. Similarly, configurations of the gateway device 211 are the same as those of the gateway device 221. Therefore, descriptions are made only of the facsimile device 111 and only of the gateway device 211 below.

Figure 4:
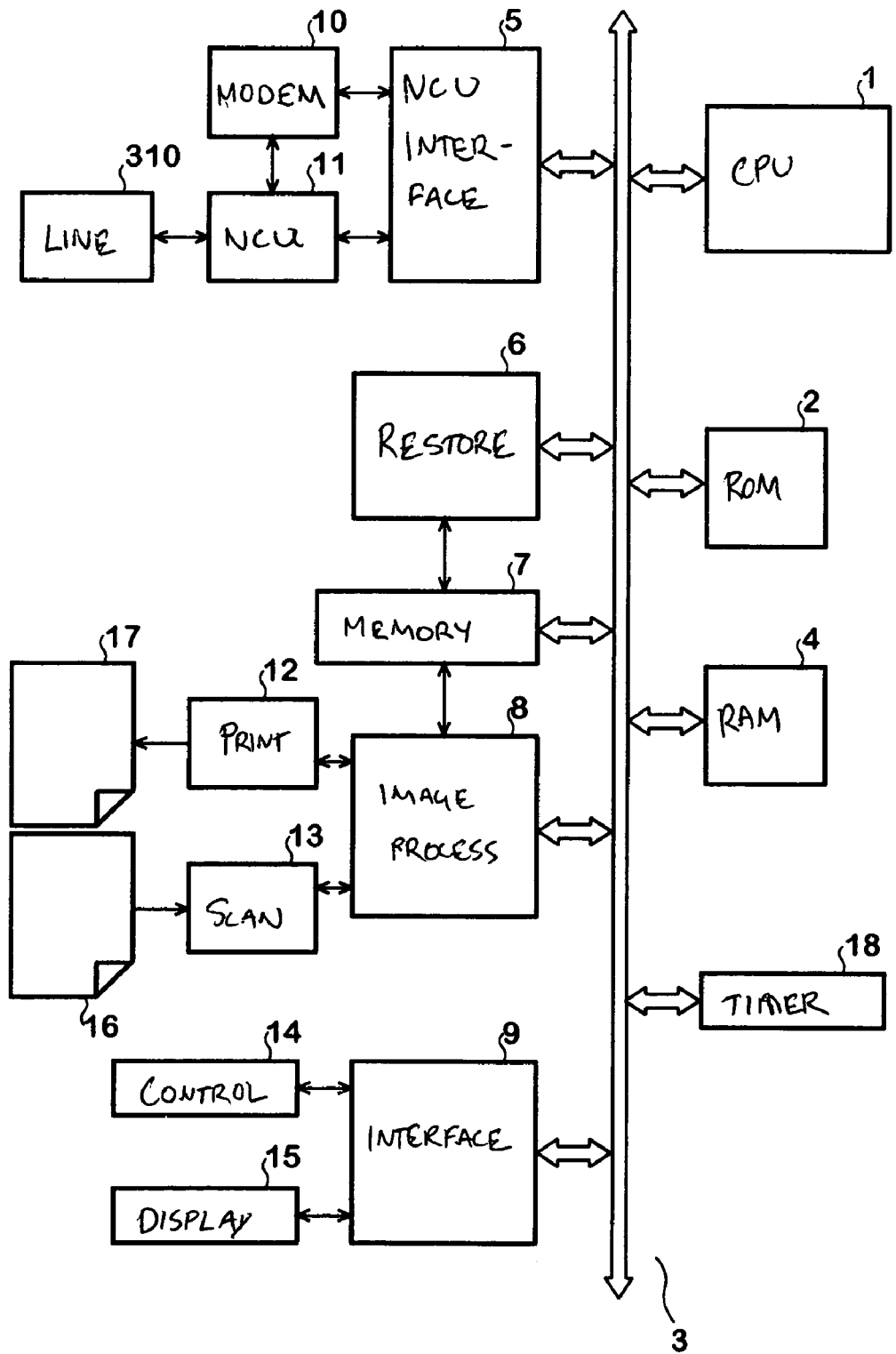
FIG. 4 is a schematic block diagram showing configurations of a facsimile device according to the first embodiment and to a second embodiment of the present invention.

First, the facsimile device 111 will be described. FIG. 4 is a schematic block diagram showing configurations of the facsimile device according to the first embodiment and to a second embodiment described later, of the present invention. As shown in FIG. 4, the facsimile device 111 is composed of a CPU 1, a ROM 2, a bus 3, a RAM 4, a modem NCU (Network Control Unit) interface 5, an image compression restoring section 6, a line memory 7, an image processing section 8, a device interface 9, a modem 10, an NCU 11, a printer 12, a scanner 13, a mechanism controlling section 14, operation displaying section 15 and a timer 18.

The CPU 1 controls the whole of the facsimile device 111. That is, the CPU 1 is a central processing unit having a function of collectively controlling the management of a data flow, communications, network control or a like. The CPU1 is connected through the bus 3 to the ROM 2, RAM 4, modem NCU interface 5, image compression restoring section 6, line memory 7, image processing section 8 and device interface 9. The ROM 2 stores a control program executed by the CPU 1 and control data. The ROM 2 stores a control program used to carry out the facsimile communication procedures and control data.

The bus 3 is a digital signal transmission path used in common by each mechanism of the facsimile device 111. The RAM 4 serves as a buffer for sending and receiving data by temporarily storing data such picture data to be sent and received by the facsimile device 111. The modem NCU interface 5 connects the modem 10 and NCU 11 to the bus 3. The image compression restoring section 6 encodes and compresses data sent from the facsimile device 111 and restores the compressed data to be received.

The line memory 7 temporarily stores the picture data sent and received by the facsimile device 111. The image processing section 8 is connected to the printer 12, scanner 13 and bus 3. The image processing section 8 performs predetermined image processing on data received from the bus 3 and outputs the image processed data to the printer 12 and also performs predetermined image processing on data received from the scanner 13 and sends the image processed data to the bus 3. The device interface 9 connects the mechanism controlling section 14 and operation displaying section 15 to the bus 3. The modem 10 modulates a signal to be sent and demodulates a received signal. The modem 10 also supports functions designated by the ITU-T, Recommendation V.17 and V.34.

The NCU 11 controls connection and disconnection with the facsimile device 121. The printer 12 reproduces data sent from the image processing section 8 on recording paper 17. The scanner 13 reads images on an original to be sent and produces image data to be sent to the image processing section 8. The mechanism controlling section 14 controls a driver and sensors used to drive each of moving parts of the facsimile device 111. The operation displaying section 15 inputs operational information and setting information of the facsimile device 111 and displays these kinds of information and state information about the device. The operation displaying device 15 is composed of a dial number operation key, liquid crystal panel or a like. The timer 18 monitors time required for communications by which the facsimile device 111 exchanges signals and/or data with the gateway device 211.

An example case is described where data is transmitted from the facsimile device 111 to the facsimile device 121. When the facsimile device 111 on the sender side transmits data, a sending original 16 is set to the scanner 13 of the facsimile device 111 on the sender side. Next, when sending operations are made by the operation displaying section 15, images on the sending original 16 are read by the scanner 13. The read image, after image processing is performed on it by the scanner 13, is transmitted as image data to the image processing section 8. The image data is given predetermined image processing by the image processing section 8 and becomes picture data which is stored in the line memory 7. The picture data read from the line memory 7 is compressed by the image compression restoring section 6 and is transmitted through the bus 3 to the RAM and is stored in the RAM 4. Then, the picture data is read from the RAM 4 and transferred through the bus 3 to the modem NCU interface 5. The picture data is transferred from the model NCU interface 5 to the modem 10 and is modulated and then transmitted through the NCU to the telephone line 310.

When the data is received by the facsimile device on the sender side 111, the picture data is received through the telephone line 310 by control of the NCU 11. The received data is transmitted to the modem 10 where the data is demodulated. Next, the picture data is transmitted from the modem 10 through the modem NCU interface 5 and the bus 3 to the RAM 4. The picture data is stored in the RAM 4. Then, the picture data, after being read from the RAM 4, is transferred through the bus 3 to the image compression restoring section 6. The picture data transferred from the RAM 4, after being restored by the image compression restoring section 6, is sent through the line memory 7 to the image processing section 8. Then, the picture data is given the predetermined image processing and is transferred to the printer, where the data is reproduced on the recording paper 17.

Prior to sending and receiving of the data between the facsimile devices 111 and 121, a control signal to establish a connection between the facsimile devices 111 and 121 is exchanged between them. For example, if the control signal is sent from the facsimile device 111 to the facsimile device 121, the control signal is read from the ROM 2 by the CPU 1 of the facsimile device 111 on the sender side and is transferred through the bus 3 to the modem NCU interface 5. Next, the control signal is transferred from the modem NCU interface 5 to the modem 10 where the signal is modulated and then the modulated signal is sent from the modem 10 through the NCU 11 to the telephone line 310. Then, the control signal is received through the gateway devices 211 and 221 and the telephone line 320 by the NCU 30 of the facsimile device 121 on the receiver side. The control signal is sent from the NCU 30 through the modem NCU interface 25 and the bus 23 to the CPU 21, where the control signal is analyzed. After that, the communication procedures are carried out in accordance with analyzed contents. Configurations and operations of the facsimile device 111 described above are the same as those of the facsimile device in the conventional facsimile communication system.

Figure 5:
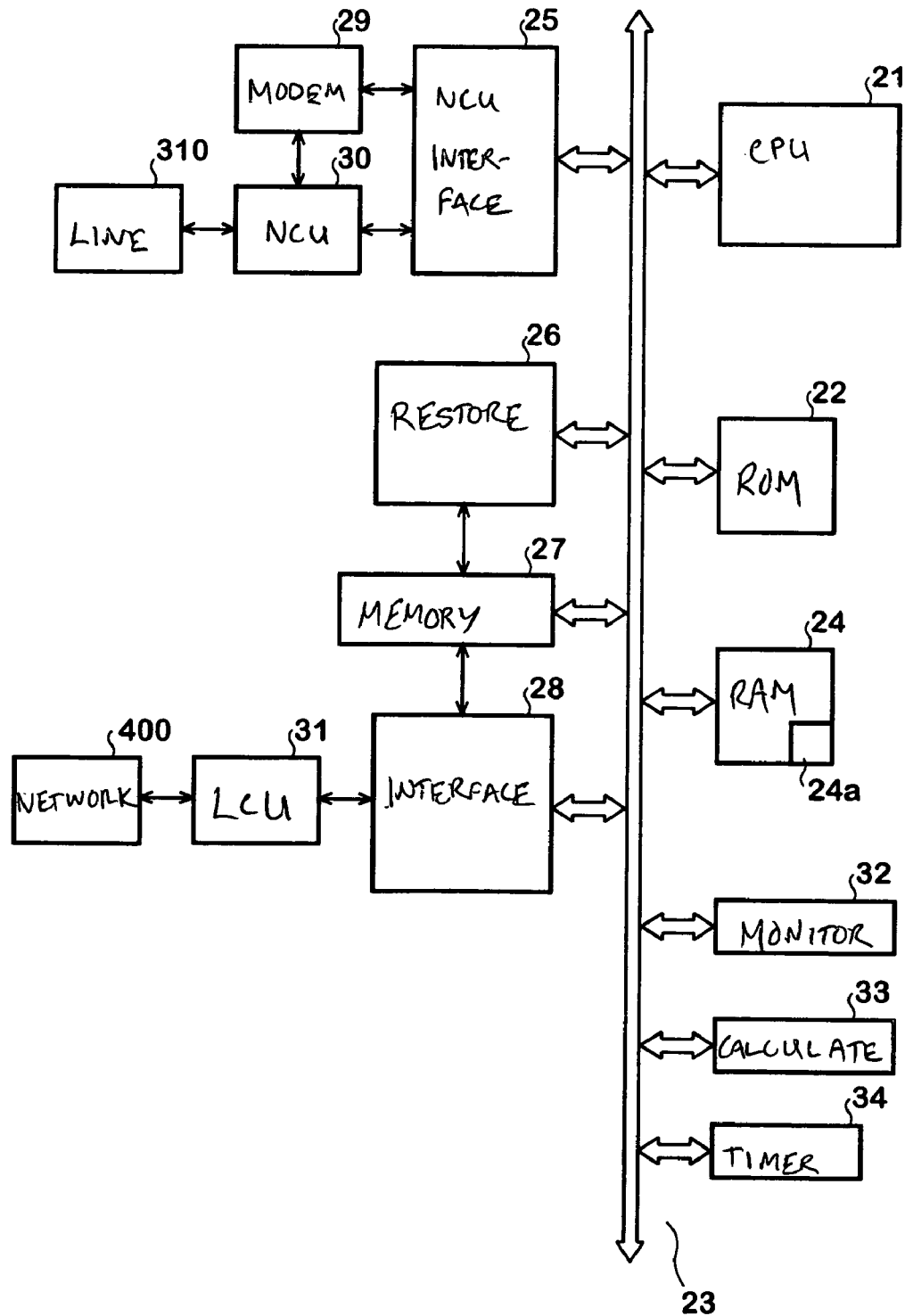
FIG. 5 is a schematic block diagram showing configurations of a gateway device according to the first embodiment and to the second embodiment of the present invention.

Next, configurations and operations of the gateway device 211 will be described below. FIG. 5 is a schematic block diagram showing configurations of the gateway device according to the first embodiment and to the second embodiment described later, of the present invention.

The gateway device 211 connected to the facsimile device 111, as is know well, is composed of a CPU 21, ROM 22, bus 23, RAM 24, modem NCU interface 25, image compression restoring section 26, line memory 27, LAN interface 28, modem 29, NCU 30, LCU (Line Control Unit) 31 and timer 34. In addition to these components, as components featuring the gateway device 211 of the present invention, a picture data accumulating memory 24*a*, accumulated data amount monitoring circuit 32 and accumulated data amount calculating circuit 33 are provided. Moreover, configurations of the gateway device 221 are the same as those of the gateway device 211 described above as shown in FIG. 5.

The CPU 21 controls the whole of the gateway device 211. The CPU is a central processing unit having a function of collectively controlling the management of a flow of data, communications, network or a like. The CPU 21 is connected through the bus 23 to the ROM 22, RAM 24, modem NCU interface 25, image compression restoring section 26, line memory 27 and LAN interface 28. The ROM 22 stores a control program to be executed by the CPU 21 and control data. The ROM 22 stores a control program used to carry out the facsimile communication procedures and control data.

The bus 23 is a digital signal transmission path used in common by each mechanism of the gateway device 211. The RAM 24 serves as a buffer by temporarily storing data to be sent or received by the gateway device 211. The modem NCU interface 25 connects the modem 29 and NCU 30 to the bus 23. The image compression restoring section 26 encodes and compresses data to be sent from the gateway device 211 and restores the compressed data to be received by the gateway device 211.

The line memory 27, as is known well, temporarily stores data to be sent or received by the gateway device 211 for each of scanning lines. The LAN interface 28 is connected to the LCU 31 and bus 23 and, when transmitting data, breaks down picture data into predetermined packets and transfers them to the LCU 31. Also, the LAN interface 28, while receiving data, constructs a control signal and data from the packet sent from the LCU 31 and outputs them to the bus 23.

The modem 29 modulates a signal to be sent and demodulates a signal received. The NCU 30 controls connection and disconnection with the facsimile device 111. The LCU 31 controls connection and disconnection with the gateway device 221. The timer 34 monitors time required for communications by which the gateway device 211 exchanges signals and/or data with the facsimile device 111. Operations of the timer 34 will be described later in detail.

A picture data accumulating memory 24*a* featuring the present invention is provided in a part of the RAM 24 adapted to store a predetermined amount of the picture data required for sending out the picture data from the gateway device on the receiver side 211 (or 221) to the facsimile device on the receiver side 111 (or 121) when a delay develops as expected, in order to prevent a breakdown of communications or connections between the gateway device on the receiver side 211 (or 221) and the facsimile device on the receiver side 111 (or 121) that may occur due to delays in data communications in the packet communication network 400. The picture data accumulating memory 24*a* may be mounted outside of the RAM 24 as well. Expected delay data, for example, for every month, every week, every day is registered in the RAM 24. The delay data may be registered in the picture data accumulating memory 24a. The accumulated data amount monitoring circuit 32 is operated to monitor the stored amount of the picture data accumulated in the picture data accumulating memory 24a. The accumulated data amount calculating circuit 33 calculates the necessary amount of the picture data described above.

An example of a case where the gateway device 211 sends out data to the packet communication network 400. The picture data is sent from the facsimile device on the sender side 111 through the telephone line 310 to the gateway device on the sender side 211 and, after it is received by the NCU 30 of the gateway device 211, is transmitted to the modem 29 where it is demodulated. Next, the picture data is transferred from the modem 24 through the modem NCU interface 25 and the bus 23 to the RAM 24 where it is stored. Then, the picture data is read from the RAM 24 and transferred through the bus 23 to the image compression restoring section 26. The picture data transferred from the RAM 24 is restored by the image compression restoring section 26 and undergoes an error checking. The picture data having undergone the error checking at the image compression restoring section 26 is transferred to the LAN interface 28. The picture data is broken down into packets by the LAN interface 28 and the packet is transmitted through the LCU 31 to the packet communication network 400.

An example of a case where the gateway device on the receiver side 221 sends out the data transmitted from the facsimile device on the sender side 111 to the telephone line 320. When the packet is sent from the packet communication network 400 to the LCU 31 of the gateway device 221, the received packet is constructed by the LAN interface 28 to be a picture data. The constructed data is sent to the line memory 27 and is stored in the line memory 27.

The picture data read from the line memory 27 is restored by the image compression restoring section 26 and undergoes an error checking. The picture data having undergone the error checking is sent through the bus 23 to the RAM 24 where it is stored and then is transferred through the bus 23 to the modem NCU interface 25. Then, the picture data is transferred to the modem 29 where it is modulated and is sent through the NCU 30 to the telephone line 320.

In the above descriptions of operations of the gateway device, the case where delays in communications do not develop is described. A case where the delays in communications develop will be described hereinafter. As described later, the picture data accumulating memory 24a, accumulated data amount monitoring circuit 32 and accumulated data amount calculating circuit 33, which are all specific to the present invention, operate to avoid communication failures when delays in communications develop.

An example case will be described assuming that the facsimile device 111 is one on the sender side to which a sending original is set and that, while facsimile communications are performed between the facsimile device 111 and the facsimile device 121 on the receiver side, delays in communications as expected have developed in the packet communication network 400.

FIGS. 1 and 2 are also diagrams showing sequence operations of the facsimile communication system of this embodiment which represent lapses of time in order of steps shown in the direction from top to bottom. The sequence operations of sending and receiving signals will be hereinafter described in order of the steps.

Step S1: When a call is made by the facsimile device on the sender side 111, the gateway device on the sender side 211 traps the line and returns a dial tone (DT) back to the facsimile device on the sender side 111 and moves to an input waiting state.

Step S2: The gateway device on the sender side 211, when receiving a PB signal showing a dial number of a device to be connected from the facsimile device on the sender side 111, retrieves an address (i.e., an IP address of the gateway device on the receiver side 221) of the packet communication network 400 corresponding to the dial number from a destination stored in the RAM 24 (see FIG. 5), adds the dial number of the facsimile device on the receiver side 121 being the device to be connected and then sends a connection request to the gateway device on the receiver side 221.

Step S3: The gateway device on the receiver side 221, when receiving the above connection request, makes a call to the facsimile device on the receiver side 121.

Step S4: The facsimile device on the receiver side 121 traps the line and, after sending a CED signal used to identify a called terminal, sends out a DIS signal being a digital identification signal used to notify signal receiving capability of the facsimile device on the receiver side 121 to the gateway device on the receiver side 221.

Step S5: The gateway device on the receiver side 221 converts the above DIS signal from the facsimile device on the receiver side 121 to packet data and sends it to the gateway device on the sender side 211.

Step S6: The gateway device on the sender side 211 sends the above DIS signal received from the gateway device on the receiver side 221 to the modem 29 (see FIG. 5) for modulation and the modem 29 transfers the modulated signal to the facsimile device on the sender side 111.

Step S7: The facsimile device on the sender side 111, after having recognized the capability of the facsimile device on the receiver side 121 by the above DIS signal from the gateway device on the sender side 211, sends a DCS signal being a digital instruction signal used to notify information about a communication mode, i.e., information including a transmission rate, size of an original or a like, to the gateway device on the sender side 211.

Step S8: The facsimile device on the sender side 111 sends a TCF signal being a training check signal used to synchronize the gateway device on the sender side 211 to the facsimile device on the sender side 111.

Step S9: The gateway device on the sender side 211 converts the DCS signal from the facsimile device on the sender side 111 to packet data, sends it to the gateway device on the receiver side 221 and receives the TCF signal from the facsimile device on the sender side 111.

Step S10: The gateway device on the receiver side 221, when receiving the DCS signal from the gateway device on the sender side 211, before receiving the CFR signal showing confirmation of the completion of a preparation for picture data receiving from the facsimile device on the receiver side 121, as described later, in order to calculate time required for storing a predetermined amount of the picture data to be fed from the facsimile device on the sender side 111, returns a CFR signal showing the same content as that of the CFR signal, regardless of the CFR signal, to the gateway device on the sender side 211, instead of the facsimile device on the receiver side 121.

Step S11: The gateway device on the receiver side 221 further transfers the DCS signal fed from the gateway device on the sender side 211 to the facsimile device on the receiver side 121 through the modem 29.

Step S12: The gateway device on the sender side 211, after receiving the TCF signal from the facsimile device on the sender side 111 shown in Step S8, sends the CFR signal from the gateway device on the receiver side 221 through the modem 29 to the facsimile device on the sender side 111.

Step S13: The facsimile device on the sender side 111, when receiving the CFR signal from the gateway device on the receiver side 221, starts sending a picture data group to the gateway device on the sender side 211. The gateway device on the sender side 211 converts the picture data from the facsimile device on the sender side 111 to packet data and sends the converted data to the gateway device on the receiver side 221.

Step S14: The gateway device on the receiver side 221 produces TCF signal based on the communication mode indicated by the DCS signal received from the gateway device on the sender side 211 at the Step S10 and then sends it to the facsimile device on the receiver side 121.

Step S15: The facsimile device on the receiver side 121, when receiving the DCS signal from the gateway device on the receiver side 221, recognizes the communication mode and then receives the TCF signal from the gateway device on the receiver side 221.

Step S16: The facsimile device on the receiver side 121, when receiving the TCF signal from the gateway device on the receiver side 221, returns the CFR signal back to the gateway device on the receiver side 221.

Step S17: The gateway device on the receiver side 221, since it has already returned the CFR signal back to the gateway device on the sender side 211 without waiting for the receipt of the CFR signal from the facsimile device 121 at the Step S10, starts receiving picture data sent from the facsimile device on the sender side 111 at the Step S113. Because of this, the gateway device on the receiver side 221, even if it receives the CFR signal from the facsimile device on the receiver side 121, does not return it back to the gateway device on the sender side 211.

Step S18: The gateway device on the sender side 211 continues to receive the picture data group sent from the facsimile device on the sender side 111 at the Step 13. Though the picture data is consecutive data within one page, since the fact is taken into consideration that, when the data is transmitted between the gateway device on the sender side 211 and the gateway device on the receiver side 221, it is converted to the packet data, in the present embodiment, the data for one page is divided into the picture data 1 to 9.

Step S19: The gateway device on the receiver side 221 returns an ACK signal showing that it has received the picture data from the gateway device on the sender side 211, back to the gateway device on the sender side 211 at every time of receiving the data. Moreover, if the picture data exceeding necessary amounts of data to be calculated by the accumulated data amount calculating circuit 33 is likely to be accumulated in the picture data accumulating memory 24a (FIG. 5) before the time elapsed after the transmission of the CFR signal by the facsimile device on the receiver side 121 exceeds the time $T_1$ being shorter than set time T, the gateway device on the receiver side 221 starts transferring the picture data to the facsimile device on the receiver side 121. Furthermore, when the elapsed time exceeds the set time $T_1$, even if the accumulated amount of the picture data does not reach the required amount of data, the gateway device on the receiver side 221 starts transferring the picture data to the facsimile device on the receiver side 121. That is, the gateway device on the receiver side 221 allows the necessary amount of the picture data to be accumulated unless the elapsed time exceeds the set time $T_1$ and if the elapsed time is likely to exceed the set time $T_1$, even if the picture data amount is less than the necessary amounts of the data, the picture data is sent to avoid the breakdown of communications.

Step S20: In the embodiment, as described later, the necessary amount of the picture data is calculated based on the delay data that has been expected and, as the necessary amount of the picture data, the data amount obtained by the accumulation of, for example, the picture data 1 to 3 is used. Therefore, at this Step S20, the gateway device on the receiver side 221, after the picture data including the picture data 1 to 3 are accumulated to the required level of amounts, starts transferring the picture data to the facsimile device on the receiver side 121.

Step S21: The gateway device on the receiver side 221, after having accumulated the above picture data or while sending it out to the facsimile device on the receiver side 121, continues receiving the picture data 4 and 5 fed by the gateway device on the sender side 211. If delays in communications develop as expected in the packet communication network 400 after the gateway device on the sender side 211 has started sending the picture data 5, the gateway device on the sender side 211, before it completes the transmission of the picture data 5 to the gateway device on the receiver side 221, receives a subsequent picture data 6 and 7 from the facsimile device on the sender side 111.

Step S22: The gateway device on the receiver side 221, an arrival of the picture data 5 to be fed from the gateway device on the sender side 211 is delayed due to the delays in communications as described in the above Step S21, in accordance with sending timing, i.e., within the set time $T_1$, transfers picture data 4 including the necessary amounts of the picture data 1 to 3 to the facsimile device on the receiver side 121 in consecutive order. Moreover, the gateway device on the receiver side 221, when receiving the picture data 5, sends the picture data 5, subsequent to the picture data 4, to the facsimile device on the receiver side 121.

Step S23: Since the picture data 6 and 7 have been stored in the gateway device on the sender side 211, the communication between the gateway device on the sender side 211 and the gateway device on the receiver side 221 are performed without dependence upon the timing between the facsimile device on the sender side 111 and the facsimile device on the receiver side 121.

Step S24: The facsimile device on the sender side 111, when having completed the transmission of the picture data 9, which is final data in the example shown in FIGS. 1 and 2, sends the EOP signal showing that the sending procedures of the picture data have completed, to the gateway device on the sender side 211.

Step S25: The gateway device on the sender side 211, after having completed the transmission of the picture data 9 to the gateway device on the receiver side 221, converts the above EOP signal fed from the facsimile device on the sender side 111 to packet data and sends it out to the gateway device on the receiver side 221.

Step S26: The gateway device on the receiver side 221, after having transferred the picture data 9 to the facsimile device on the receiver side 121, sends the above EOP signal to the facsimile device on the receiver side 121.

Step S27: The facsimile device on the receiver side 121 sends an MCF signal, which is a confirmation signal showing that the facsimile device on the receiver side 121 have received the EOP signal fed from the gateway device on the receiver side 221, back to the gateway device on the receiver side 221.

Step S28: The gateway device on the receiver side 221 converts the MCF signal fed from the facsimile device on the receiver side 121 to packet data and sends it back to the gateway device on the sender side 211.

Step S29: The gateway device on the sender side 211 sends the MCF signal fed from the gateway device on the receiver side 221 back to the facsimile device on the sender side 111 through the modem 29.

Step S30: The facsimile device on the sender side 111, when receiving the MCF signal, sends a DCN showing disconnection of communications, to the gateway device on the sender side 211 and terminates the communications.

Step S31: The gateway device on the sender side 211 sends the DCN signal fed from the facsimile device on the sender side 111 to the gateway device on the receiver side 221 and the gateway device on the receiver side 221 sends the DCN signal to the facsimile device on the receiver side 121 and terminates the communications.

Operations of the gateway device on the receiver side 221 featuring the present invention will be described in detail hereinafter referring to a flowchart shown in FIGS. 6 and 7.

Figure 6:
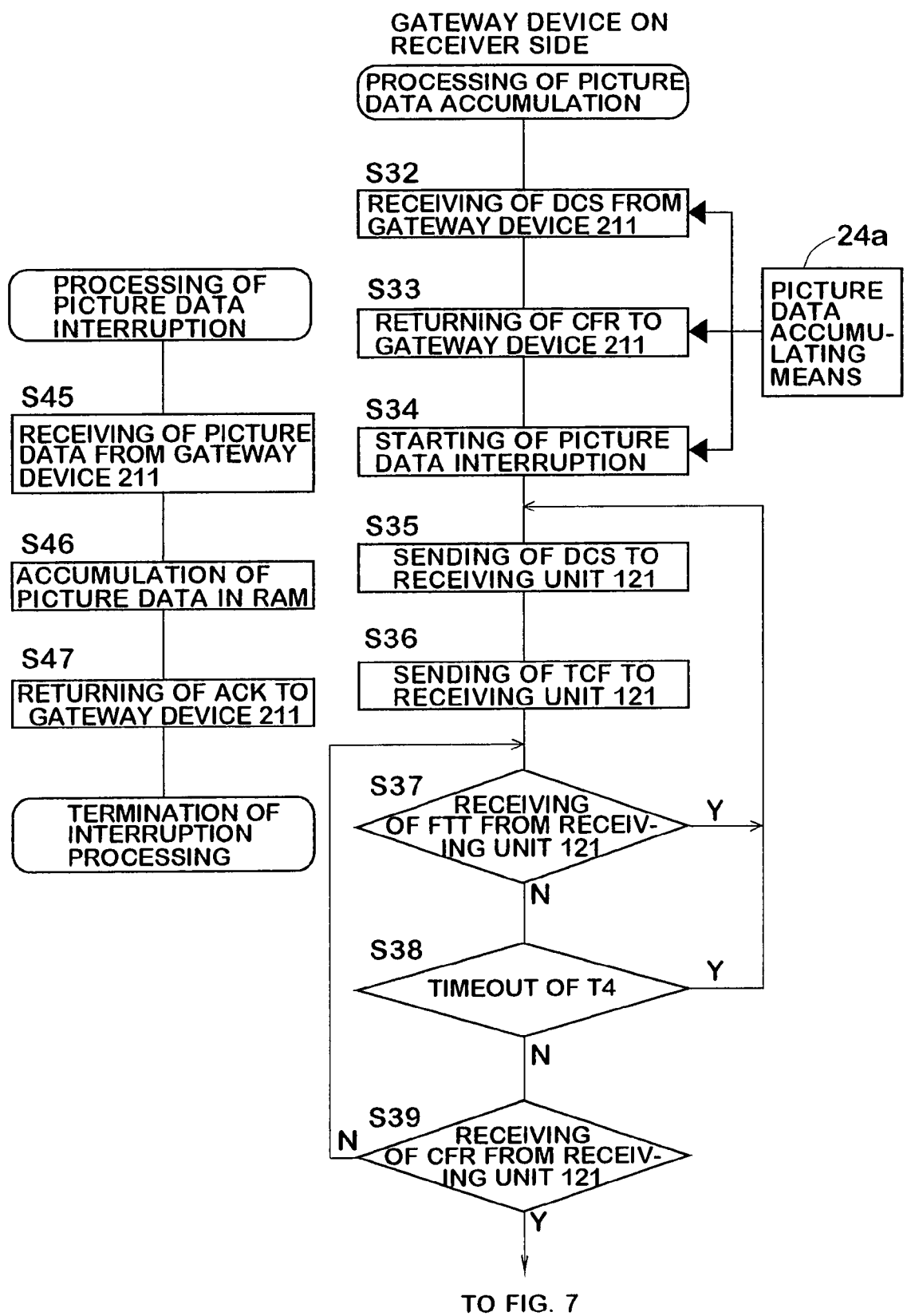
FIG. 6 is a first part of a diagram explaining operations of the gateway device according to the first embodiment.
Figure 7:
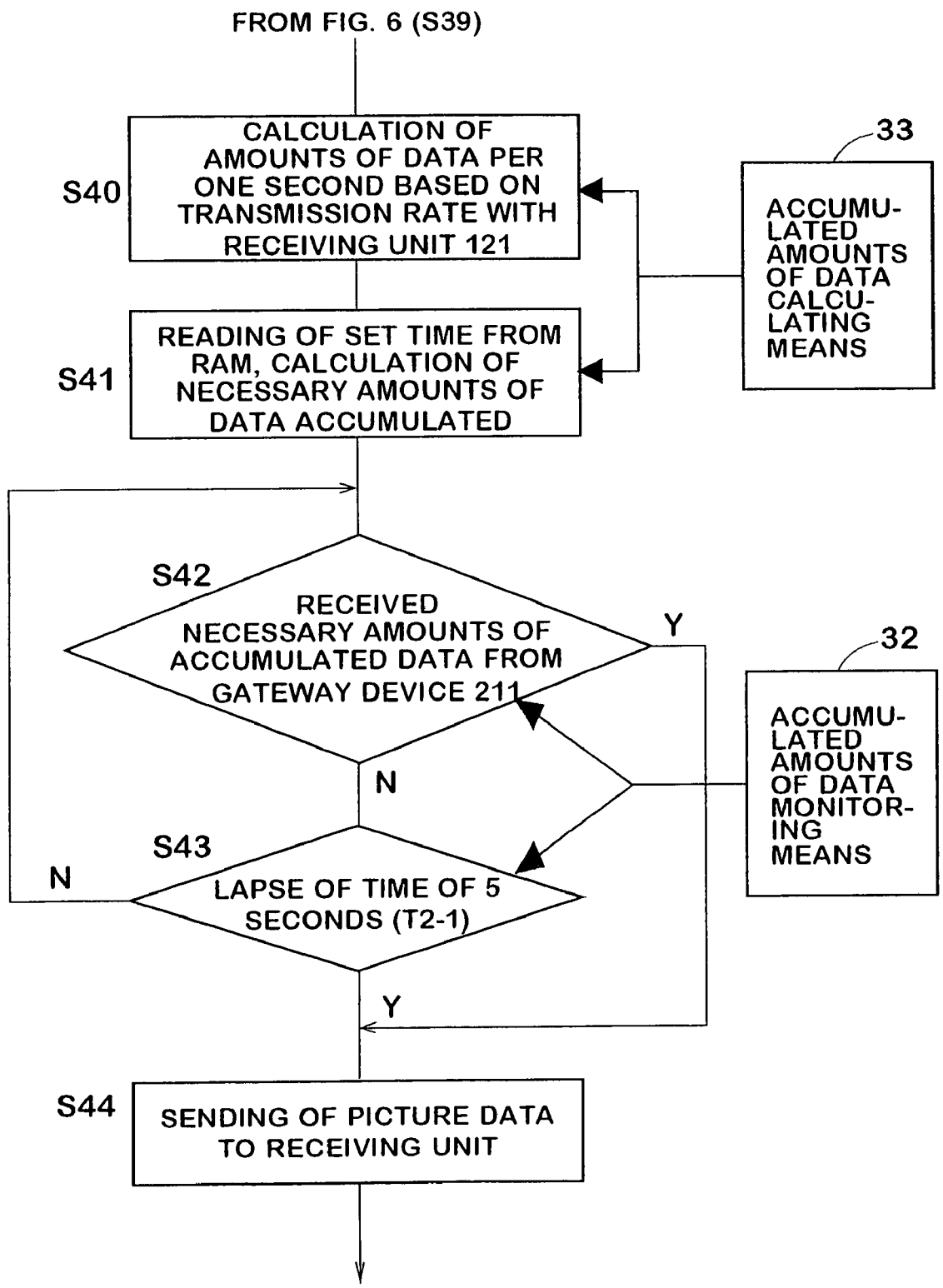
FIG. 7 is a second part of the diagram explaining operations of the gateway device according to the first embodiment.

FIGS. 6 and 7 are flowcharts explaining operations of the gateway device on the receiver side of the first embodiment. The operations of the gateway device on the receiver side 221 shown in FIGS. 6 and 7 include control operations performed by procedures taken from the time when the gateway device on the receiver side 221 have received the DCS signal at the above Step S9 to the time when the gateway device 221 sends the picture data to the facsimile device on the receiver side 121 at the above Step S20.

Step S32: The gateway device on the receiver side 221 receives the DCS signal described at the Step S9 from the gateway device on the sender side 211.

Step S33: The gateway device on the receiver side 221, in order to calculate the time to accumulate necessary amounts of the picture data required to continue the communications between the gateway device on the receiver side 221 and the facsimile device on the receiver side 121 without being affected by delays in communications described above, when receiving the DCS signal from the gateway device 211, prior to the transmission of the DCS signal to the facsimile device on the receiver side 121, returns the CFR signal described at the Step S10, which is different from the CFR signal received from the facsimile device on the receiver side 121, to the facsimile device on the sender side 111 through the gateway device on the sender side 211.

Step S34: The gateway device on the receiver side 221 allows an interruption of receiving the picture data in order to receive the picture data from the gateway device on the sender side 211. The gateway device on the receiver side 221 repeats the interruption shown at the Steps S45 to S47 described later each time it receives a request for the interruption from the gateway device on the sender side 211. The Steps S32 to S34 show controls related to the picture data accumulating memory 24a.

Step S45: Procedures for accumulating the picture data taken when the gateway device on the receiver side 221 receives the request for the interruption from the gateway device on the sender side 211 are described below. The gateway device on the receiver side 221, when receiving the request for the interruption, starts the interruption processing and receives the picture data from the gateway device on the sender side 211.

Step S46: The gateway device on the receiver side 221 stores the received picture data into the picture data accumulating memory 24a.

Step S47: The gateway device on the receiver side 221, after having accumulated the picture data, terminates the interruption and then returns the ACK signal described at the Step S19 to the gateway device on the sender side 211.

Step S35: The gateway device on the receiver side 221, as explained at the Step S34, after starting the interruption, sends the DCS signal described at the Step S11 to the facsimile device on the receiver side 121.

Step S36: The gateway device on the receiver side 221, after sending the DCS signal, transmits the TCF signal described at the Step S14 to the facsimile device on the receiver side 121.

Step S37: The gateway device on the receiver side 221, after having sent the TCF signal, if it receives a FTT signal showing that the facsimile device on the receiver side 121 has failed in the training check using the TCF signal, from the facsimile device on the receiver side 121, returns back to the Step S35 and again sends the TCF signal to the facsimile device on the receiver side 121 to perform synchronization through the training check.

Step S38: The gateway device on the receiver side 221, when the time elapsed after the initial transmission of the TCF signal exceeds the set time $T_0$ of the timer 34, in order to perform processing between the gateway device 221 and the facsimile device 121 in accordance with communication procedures designated the ITU-T, Recommendation T.30, returns back to the Step S35 and again sends the DCS and TCF signals to the facsimile device on the receiver side 121. The processing executed, for example, from the time when the gateway device 221 sends the TCF signal to the time when the gateway device 221 receives the CFR signal in response to the signal from the facsimile device on the receiver side 121 has to be performed within the set time $T_0$ based on the above communication procedures. The timer 34 is a timer to monitor the time required for executing the above processing. The set time $T_0$ is set to, for example, 3 seconds. The gateway device on the receiver side 221, if it does not receive the CFR signal from the facsimile device on the receiver side 121 even after repeating the transmission of the DCS and TCF signals three times to the facsimile device on the receiver side 121, that is, the above elapsed time exceeds 9 seconds (3 seconds×3), may perform error processing to disconnect the communications between the gateway device 221 and the facsimile device 121.

Step S39: The gateway device on the receiver side 221, when receiving the CFR signal from the facsimile device 121 within the set time $T_0$ of the timer 34, goes to Step S40 to perform arithmetic operations on accumulated amount of the picture data.

Step S40: The accumulated data amount calculating circuit 33 of the gateway device on the receiver side 221, when receiving the CFR signal, based on the transmission rate between the gateway device on the receiver side 221 and the facsimile device on the receiver side 121, which is indicated by the DCS signal received at the Step S32, calculates the amount of data to be transmitted in one second from the gateway device on the receiver side 221 to the facsimile device on the receiver side 121. For example, if the transmission rate is V.17 (14.4 kbps), the amount of data is 1800 bytes per one second.

Step S41: The accumulated data amount calculating circuit 33, after having calculated the amount of data, calculates necessary amounts of data required to continue communications between the gateway device on the receiver side 221 and the facsimile device on the receiver side 121 at the time of the communication delay, based on the transmission rate and expected delay time which is expected data on delays in communications in the packet network 400 registered in advance in the RAM 24. For example, if the transmission rate is V.17 (14.4 kbps) and the delay time is 2 seconds, the necessary amounts of data are 1800 bytes×2=3600 bytes. The expected data can be obtained by using a fluctuation in the communication delays between the gateway device on the receiver side 221 and the gateway device on the sender side 211, which is detected by making a plurality of PINGs well known conventionally for inspecting the connection of a TCP/IP (Transmission Control Protocol/Internet Protocol) network run for communications between the gateway device on the receiver side 221 and the gateway device on the sender side 211 at the time of the start of communications. The gateway device on the receiver side 221 determines the maximum value out of the expected data to be the expected delay time and registers it into the RAM 24. The calculating processing by the accumulating data amount calculating circuit 33 is performed while the picture data is being accumulated in the picture data accumulating memory 24a.

Step S42: After the accumulating data amount calculating circuit 33 has calculated the necessary amount of data, the accumulated data amount monitoring circuit 32 of the gateway device on the receiver side 221, before transferring the picture data to the facsimile device on the receiver side 121, in order to check the accumulated amount of data stored by the interruption processing in the picture data accumulating memory 24a, compares the accumulated amount of data with the necessary amounts of data. By this comparison, if the accumulated amounts of data are judged to be larger than the necessary amounts of data, i.e., if the picture data that reaches the necessary amounts of data is accumulated, the gateway device on the receiver side 221 goes to Step S44 in which the picture data is transmitted to the facsimile device on the receiver side 121, while, if the accumulated amounts of data are judged to be smaller than the necessary amounts of data, the gateway device on the receiver side 221 goes to Step S43 in which the accumulation of the picture data is continued.

Step S43: If the time required between the time when the facsimile device on the receiver side 121 sends the CFR signal to the gateway device on the receiver side 221 and the time when the facsimile device on the receiver side 121 receives normal picture data from the gateway device on the receiver side 221 exceeds the set time T based on communication procedures between both devices on the receiver side designated by the ITU-T Recommendation T.30, a breakdown of the communications between the gateway device 221 and the facsimile device 121 occurs. In the timer 18 of the facsimile device on the receiver side 121, the set time $T_1$ being shorter than the set time T described above is set to monitor the required time described above to avoid the breakdown of communications. For example, if the above set time T is 6 seconds, 5 seconds is set as the set time $T_1$ to the timer 18, which is shorter by one second than the set time T. If the time elapsed after the facsimile device on the receiver side 121 has sent the CFR signal reaches the set time $T_1$ while the gateway device on the receiver side 221 is accumulating the picture data, even if the accumulated amounts of data is less than the necessary amounts of data, the gateway device on the receiver side 221 goes to Step S44 and starts transferring the picture data to the facsimile device on the receiver side 121 to avoid the breakdown of the communications. Moreover, the gateway device on the receiver side 221, unless the elapsed time exceeds the set time $T_1$, returns back to the Step S42 and continues the accumulation of the picture data until the necessary amounts of data is satisfied.

Step S44: The gateway device on the receiver side 221, when the elapsed time exceeds the set time $T_1$ or after the necessary amounts of data are accumulated, as explained in the Step S20, starts transferring the picture data to the facsimile device on the receiver side 121.

As described above, according to the gateway device on the receiver side 221 of the first embodiment, even if delays in communications in the packet communication network 400 develop, the necessary amounts of data required to avoid the communication breakdown between the gateway device on the receiver side 221 and the facsimile device on the receiver side 221 are accumulated in the picture data accumulating memory 24a and the accumulated data amount calculating circuit 33 is operated to calculate the necessary amounts of data based on the expected delay time in the packet communication network 400 and the transmission rate between both devices 221 and 121 on the receiver side.

According to the first embodiment, the gateway device on the receiver side 221, to calculate the time required for accumulating the necessary amounts of data, without waiting for the receipt of the CFR signal showing the confirmation of the receiving preparation from the facsimile device on the receiver side 121, sends another CFR signal having the same content as the above CFR signal to the gateway device on the sender side 211. After the gateway device on the receiver side 221 has started to receive the picture data to be sent from the gateway device on the sender side 211, the amounts of the picture data stored in the picture data accumulating memory 24a are monitored by the accumulated data amount monitoring circuit 32. Therefore, even if the delays in communications develop, the breakdown of communications between the gateway device on the receiver side 221 and the facsimile device on the receiver side 121 does not occur and the picture data stored in the picture data accumulating memory 24a is, as necessary, sent from the gateway device on the receiver side 221 to the facsimile device on the receiver side 121.

Thus, according to the facsimile communication system of the first embodiment of the present invention, even if the expected delays in communications in the packet communication network between both gateway devices due to the fluctuation in the network of the facsimile communication system, the picture data can be sent out from the gateway device on the receiver side 221 to the facsimile device on the receiver side 121 without being affected by the delays in communications. Thus, the facsimile communication system can avoid a forced breakdown of the facsimile communications based on a judgement by the facsimile communication system that the communication failure has occurred due to the delays in communications, resulting in improvement in the quality of communications in the network.

Second Embodiment

Unlike in the case of the first embodiment in which, in order to accumulate the necessary amounts of the picture data in the picture data accumulating memory 24a, the gateway device on the receiver side 221, without waiting for the CFR signal showing the confirmation of completion of the preparation for the receipt fed from the facsimile device on the receiver side 121, sends another CFR signal having the same content as the above CFR signal to the gateway device on the sender side 211, in the second embodiment, the gateway device on the receiver side 221, in order to calculate the time required to accumulate the necessary amounts of the picture data in the picture data accumulating memory 24a and also in order to prevent the breakdown of communications between the gateway device on the receiver side 221 and the facsimile device on the receiver side 121, after repeating the transmission of the DCS signal and TCF signal to the facsimile device on the receiver side 121 the required number of times, starts sending the picture data to the facsimile device on the receiver side 121. That is, the gateway device on the receiver side 221, when receiving a digital instruction (DCS) signal from the gateway device on the sender side 211, transfers the DCS signal and a training check (TCF) signal to the facsimile device on the receiver side 121 and receives a receiving preparation confirmation (CFR) signal from the facsimile device on the receiver side 121. The gateway device on the receiver side 221, after returning the CFR signal back to the gateway device on the sender side 211, starts receiving the picture data fed through the gateway device on the sender side 211 from the facsimile device on the sender side 111. The gateway device on the receiver side 221, to calculate the time required to accumulate the picture data, newly returns the DCS signal and TCF signal back to the facsimile device on the receiver side 121 and after newly receiving the CFR signal from the facsimile device 121, starts transferring the picture data to the facsimile device on the receiver side 121.

Figure 8:
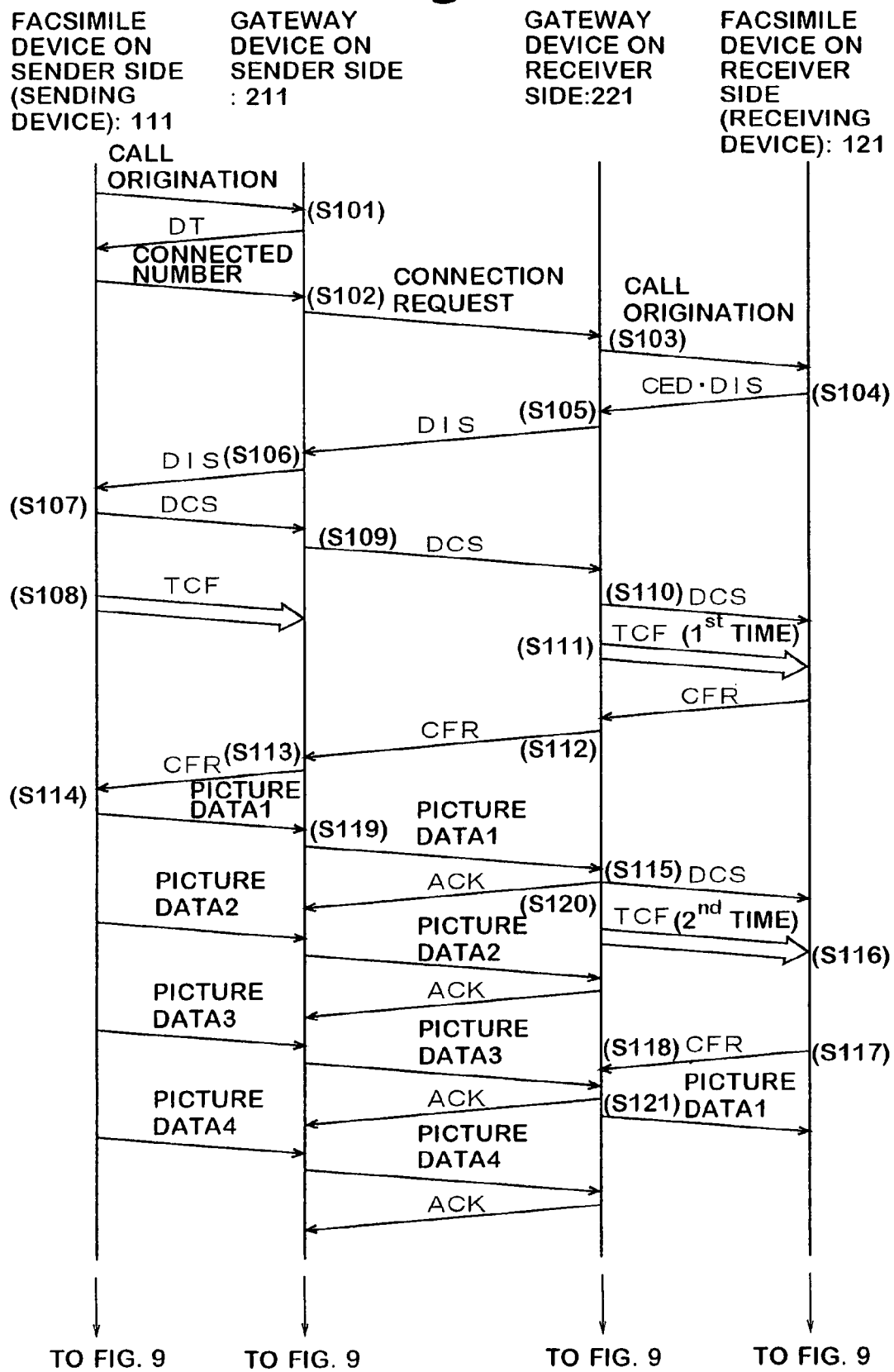
FIG. 8 is a first part of a diagram explaining procedures for facsimile communications according to a second embodiment.
Figure 9:
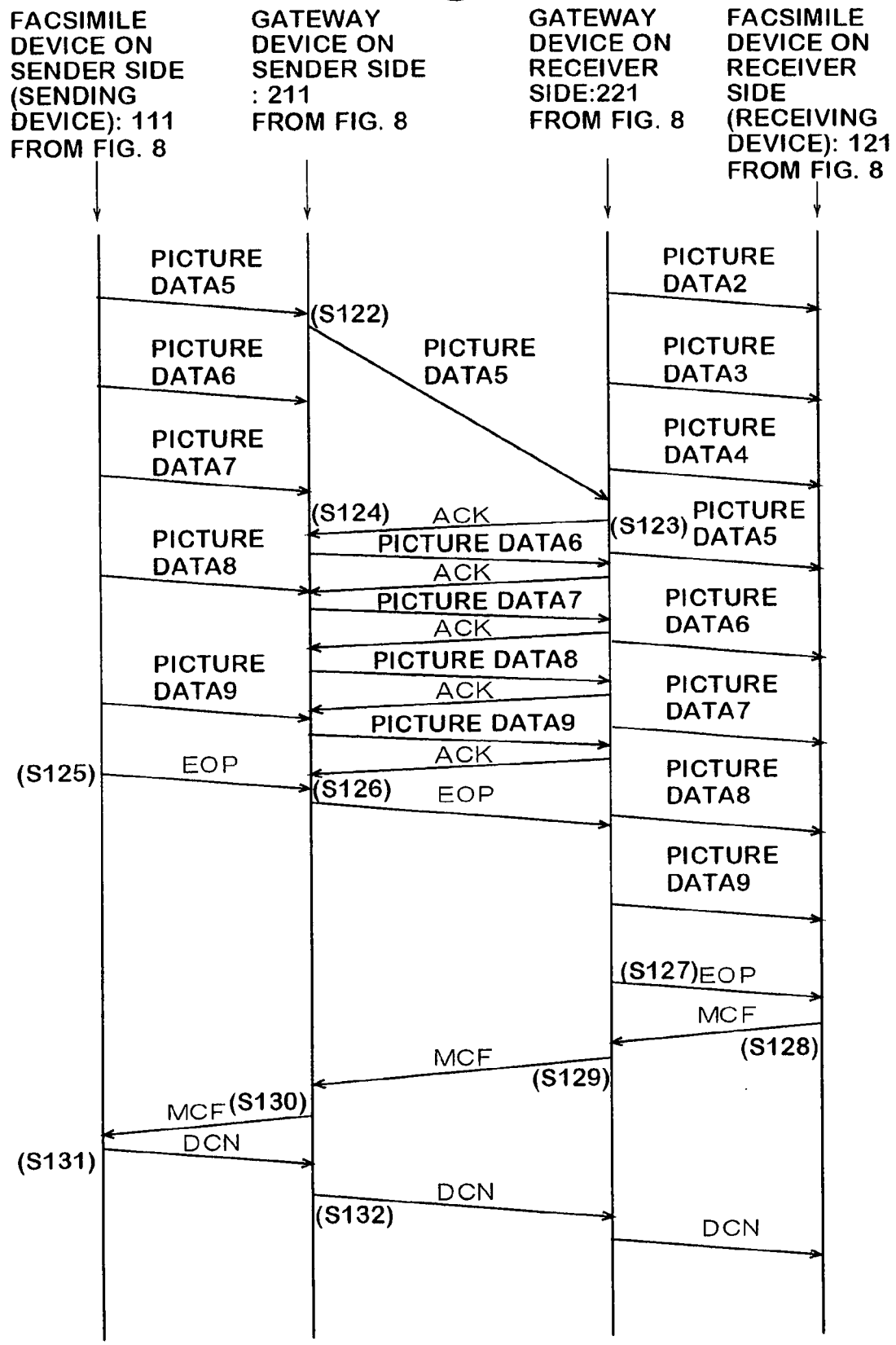
FIG. 9 is a second part of the diagram explaining procedures for facsimile communications according to the second embodiment.

Basic configurations of the facsimile communication system of the second embodiment are the same as those in the first embodiment and procedures for accumulating the picture data into the picture data accumulating memory 24*a* are different from those in the first embodiment. Communication procedures of the second embodiment containing procedures being different from those in the first embodiment will be described in detail by referring to FIGS. 8 and 9. FIGS. 8 and 9 are diagrams showing sequence operations of the facsimile communication system of the second embodiment which represent lapses of time in order of steps shown in the direction from top to bottom. The second embodiment shows an example of a case in which delays in communications based on expectation develop in the packet communication network 400 when the facsimile communications are performed by which the picture data is sent from the facsimile device on the sender side 111 to the facsimile device on the receiver side 121. The sending and receiving of signals in the whole of the system will be described in order of operational steps.

Step S101: When the facsimile device on the sender side 111 makes a call, the gateway device on the sender side 211 traps a line, returns a dial tone (DT) back to the facsimile device on the sender side 111 and gets in an input waiting state.

Step S102: The gateway device on the sender side 211, when receiving a PB signal showing a dial number of a device to be connected from the facsimile device on the sender side 111, retrieves an address in the adequate packet corresponding to the dial number from destination addresses registered in the RAM24, adds the dial number of the facsimile device on the receiver side 121 being the device to be connected to the address and sends a request for connection to the gateway device on the receiver side 221.

Step S103: The gateway device on the receiver side 221, when receiving the request for connection, puts a call on the facsimile device on the receiver side 121.

Step S104: The facsimile device on the receiver side 121 traps the line and, after sending the CED signal to the gateway device on the receiver side 221, continues to transmit the DIS signal.

Step S105: The gateway device on the receiver side 221 converts the DIS signal fed from the facsimile device on the receiver side 121 to packet data and sends it to the gateway device on the sender side 211.

Step S106: The gateway device on the sender side 211 sends the DIS signal fed from the gateway device on the receiver side 221 to the facsimile device on the sender side 111 through the modem 29.

Step S107: The facsimile device on the sender side 111, after recognizing a capability of the facsimile device on the receiver side 121 by the receipt of the DIS signal fed from the gateway device on the sender side 211, sends the DCS signal to the gateway device on the sender side 211 to notify the communication mode.

Step S108: The facsimile device on the sender side 111 sends the TCF signal to the gateway device on the sender side 211.

Step S109: The gateway device on the sender side 211 converts the DCS signal fed from the facsimile device on the sender side 111 to packet data, sends it to the gateway device on the receiver side 221 and starts receiving the TCF signal fed from the facsimile device on the sender side 111.

Step S110: The gateway device on the receiver side 221 sends the DCS signal fed from the gateway device on the sender side 211 to the facsimile device on the receiver side 121 through the modem 29.

Step S111: The gateway device on the receiver side 221 produces the TCF signal in the communication mode indicated by the DCS signal and sends it to the facsimile device on the receiver side 121.

Step S112: The gateway device on the receiver side 221, when receiving a first CFR signal fed by the facsimile device on the receiver side 121 that has responded to the DCS signal, converts it to packet data and returns it to the gateway device on the sender side 211.

Step S113: The gateway device on the sender side 211, after receiving the TCF signal from the facsimile device on the sender side 111, sends the first CFR signal fed from the gateway device on the receiver side 221 to the facsimile device on the sender side 111 through the modem 29.

Step S114: The facsimile device on the sender side 111, when receiving the first CFR signal from the gateway device on the sender side 211, starts sending the picture data group. The gateway device on the sender side 211, after converting the picture data fed from the facsimile device on the sender side 111 to packet data, sends it to the gateway device on the receiver side 221.

Step S115: The gateway device on the receiver side 221 starts receiving the picture data fed through the gateway device on the sender side 211 from the facsimile device on the sender side 111. For example, if the accumulating time required to store a predetermined amount of the picture data exceeds the set time T, a breakdown of communications occurs between the gateway device on the receiver side 221 and the facsimile device on the receiver side 121 in accordance with the communication procedures. The gateway device on the receiver side 221, to avoid the communication breakdown caused by the fact that the elapsed time has exceeded the set time T, sends a new DCS signal to the facsimile device on the receiver side 121 and consecutively the TCF signal to the facsimile device on the receiver side 121. Contents associated with this Step S115 will be described later in detail.

Step S116: The facsimile device on the receiver side 121, after recognizing the communication mode by the receipt of the DCS signal, receives the TCF signal from the gateway device on the receiver side 221.

Step S117: The facsimile device on the receiver side 121, when receiving the TCF signal, returns a new CFR signal, subsequent to the previous CFR signal sent at the Step S112, i.e., a second CFR signal back to the gateway device on the receiver side 221.

Step S118: Since the gateway device on the receiver side 221 has returned the first CFR signal back to the facsimile device on the sender side 111 through the gateway device on the sender side 211 at the Step S112 and it has also started receiving the picture data from the facsimile device on the sender side 111 through the gateway device on the sender side 211 in response to the CFR signal, the gateway device on the receiver side 221, even if it receives the second CFR signal, does not return newly it to the gateway device on the sender side 211. The gateway device on the receiver side 221, after having received the CFR signal from the facsimile device on the receiver side 121 at the Step S117, starts sending the picture data to the facsimile device 121.

Step S119: The gateway device on the sender side 211 continues to receive the picture data group from the facsimile device on the sender side 111. The picture date is provided in the form of consecutive data in one page. However, in the communications between the gateway device on the sender side 211 and the gateway device on the receiver side 221, it is transmitted in the state where the picture data is converted to packet data. Taking it into consideration in the second embodiment as in the case of the first embodiment, one page of data is divided into the picture data 1 to 9.

Step S120: The gateway device on the receiver side 221, when receiving the picture data from the gateway device on the sender side 211, returns, in response to the receipt of the data, the ACK signal back to the gateway device on the sender side 211 each time the picture data is received.

Step S121: In the embodiment, as one of the example, amounts of data from the picture data 1 to 3 are used as the necessary amounts of data which are accumulated in the picture data accumulating memory 24*a* of the gateway device on the receiver side 221. The gateway device on the receiver side 221, while the picture data is being accumulated into the picture data accumulating memory 24*a*, if the picture data exceeding the necessary amounts of data is likely to be accumulated into the memory 24*a* before the time elapsed after the transmission of the second CFR signal by the facsimile device on the receiver side 121 exceeds the set time $T_1$ of the timer 18, starts transferring the picture data to the facsimile device on the receiver side 121. Moreover, if the lapse of the time exceeds the set time $T_1$, even when the accumulated amount of the picture data does not reach the necessary amounts of data, the gateway device on the receiver side 221 starts transferring the picture data to the facsimile device on the receiver side 121. Therefore, the gateway device on the receiver side 221 allows the necessary amounts of the picture data to be accumulated unless the elapsed time exceeds the set time $T_1$ and if the elapsed time is likely to exceed the set time $T_1$, even when the picture data amount is less than the necessary amounts of the data, the picture data is sent to avoid the breakdown of communications.

Step S122: The gateway device on the receiver side 221, after the picture data is accumulated or while it is being sent, continues to receive the picture data 4 and 5 which have been sent by the gateway device on the sender side 211. After the transmission of the picture data 5 is started by the gateway device on the sender side 211, if the delays in communications in the packet communication network 400 occur in the manner that has been expected, the gateway device on the sender side 211, before completing the transmission of the picture data 5 to the gateway device on the receiver side 221, receives the subsequent picture data 6 and 7 from the facsimile device on the sender side 111.

Step S123: The gateway device on the receiver side 221, even if the arrival of the picture data 5 from the gateway device on the sender side 211 is delayed due to delays in communications, before the picture data is received, transfers the necessary amounts of the picture data including the picture data 1 to 3 to the facsimile device on the receiver side 121 in accordance with the sending timing and without putting the interval of the set time $T_1$. The gateway device on the receiver side 221, when receiving the picture data 5, sends the picture data 5, subsequent to the picture data 4, to the facsimile device on the receiver side 121.

Step S124: Since the picture data 6 and 7 have been accumulated in the gateway device on the sender side 211, the communications between the gateway device on the sender side 211 and the gateway device on the receiver side 221 is performed without dependence on timing of the facsimile device on the sender side 111 and the facsimile device on the receiver side 121.

Step S125: The facsimile device on the sender side 111 sends the EOP signal, subsequent to the picture data 9 being the final picture data, in the example shown in FIGS. 8 and 9, to the gateway device on the sender side 211.

Step S126: The gateway device on the sender side 211, after sending out the picture data 9 fed from the facsimile device on the sender side 111 to the gateway device on the receiver side 221, when receiving the EOP signal, converts the EOP signal to packet data and sends it to the gateway device on the receiver side 221.

Step S127: The gateway device on the receiver side 221, after transferring the picture data 9 to the facsimile device on the receiver side 121 from the gateway device on the sender side 211, sends the EOP signal to the facsimile device on the receiver side 121.

Step S128: The facsimile device on the receiver side 121, when receiving the EOP signal from the gateway device on the receiver side 221, returns the MCF signal back to the gateway device on the receiver side 221.

Step S129: The gateway device on the receiver side 221 converts the MCF signal fed from the facsimile device on the receiver side 121 and returns it back to the gateway device on the sender side 211.

Step S130: The gateway device on the sender side 211 sends the MCF signal fed from the gateway device on the receiver side 221 to the facsimile device on the sender side 111 through the modem 29.

Step S131: The facsimile device on the sender side 111, when receiving the MCF signal fed from the gateway device on the sender side 211, sends the DCN signal to the gateway device on the sender side 211 and terminates the communications.

Step S132: The gateway device on the sender side 211 sends the DCN signal fed from the facsimile device on the sender side 111 to the gateway device on the receiver side 221. Then, the gateway device on the receiver side 221 sends the DCN signal to the facsimile device on the receiver side 121 and completes the communications.

Operations featuring the gateway device on the receiver side 221 will be hereinafter described by referring to a flowchart. FIGS. 10A, 10B and 11 are first, second and third parts of a flowchart, respectively, explaining operations of the gateway device on the receiver side 221 according to the first embodiment. The operations of the gateway device on the receiver side 221 shown in FIGS. 10A, 10B and 11 include controlling operations performed by procedures taken between the time when the gateway device on the receiver side 221 have received the DCS signal at the above Step S109 and the time when the gateway device 221 has sent the picture data to the facsimile device on the receiver side 121 at the above Step S121. The controlling operations will be described by referring to FIGS. 10A, 10B and 11.

Step S133: The gateway device on the receiver side 221 receives the DCS signal shown at the Step S109 from the gateway device on the sender side 211.

Step S134: The gateway device on the receiver side 221, immediately after the transmission of the DCS signal fed from the gateway device on the sender side 211 to the facsimile device on the receiver side 121, sends the TCF signal shown at the Step S111 to the facsimile device on the receiver side 121.

Step S135: The gateway device on the receiver side 221, if it receives the FTT signal showing a failure of the training check by the facsimile device on the receiver side 121 using the TCF signal from the facsimile device on the receiver side 121, returns to the Step S134 and tries to perform synchronization using the training check by newly sending the TCF signal to the facsimile device on the receiver side 121.

Step S136: The gateway device on the receiver side 221, when the time elapsed after the first transmission of the TCF signal exceeds the time $T_0$ set to the timer 34, to perform processing based on the communication procedures designated by the ITU-T Recommendation T.30 applied between both the devices 221 and 121, returns back to the Step S134 and proceeds to re-send the TCF and TCF signals to the facsimile device on the receiver side 121. The contents of the timer 34 and the set time $T_0$ are the same as in the case of the first embodiment.

Step S137: The gateway device on the receiver side 221, when receiving the CFR signal shown at the Step S112 from the facsimile device on the receiver side 121 within the time $T_0$ set to the timer 34, goes to Step S138.

Step S138: The gateway device on the receiver side 221 returns the CFR signal fed from the facsimile device on the receiver side 121 back to the gateway on the sender side 211.

Step S139: The gateway device on the receiver side 221 starts to allow the interruption to receive the picture data from the gateway device on the sender device 211. The gateway device on the receiver side 221 repeats the interruption shown at the Steps S149 to S151 each time it receives the request for interruption from the gateway device on the sender side 211.

Step S149: The procedures of accumulating the picture data taken when the request for interruption is received by the gateway device on the receiver side 221 are described below. The gateway device on the receiver side 221, when receiving the request for interruption, starts to execute the interruption for receiving the picture data from the gateway device from the sender side 211.

Step S150: The gateway device on the receiver side 221 stores the received picture data in the picture data accumulating memory 24*a*.

Step S151: The gateway device on the receiver side 221, after having stored the picture data in the memory 24*a*, terminates the interruption and returns the ACK signal shown at the Step S120 back to the gateway device on the sender side 211.

Step S140: The gateway device on the receiver side 221, after having sent the CFR signal to the gateway device on the sender side 211, without being affected by the communication delays developed based on the expectation in the packet communication network 400, starts to accumulate the amounts of the picture data required for continuing the communications between the gateway device on the receiver side 221 and the facsimile device on the receiver side 121. The gateway device on the receiver side 221, in order to secure the time required for accumulating the picture data, i.e., the accumulating time shown at the Step S115, after the facsimile device on the receiver side 121 has sent the first CFR signal, before the accumulating time exceeds the time $T_1$ set to the timer 34, newly sends the DCS signal to the facsimile device on the receiver side 121 and then the TCF signal to the facsimile device on the receiver side 121. The contents of the timer 18 and the set time $T_1$ are the same as in the case of the first embodiment.

Step S141: The gateway device on the receiver side 221, after having sent the TCF signal, if it receives the FTT signal showing the failure of the training check from the facsimile device on the receiver side 121, returns back to the Step S140 and tries to perform synchronization by newly sending the TCF signal to the facsimile device on the receiver side 121.

Step S141: The gateway device on the receiver side 221, when the time elapsed after the initial transmission of the TCF signal exceeds the time $T_0$ set to the timer 34, in order to perform processing based on the communication procedures designated in the ITU-T Recommendation T.30, returns back to the Step S140 to proceed to again send the DCS and TCF signals to the facsimile device on the receiver side 121.

Step S143: The gateway device on the receiver side 221, when receiving the CFR signal shown at the Step S117 from the facsimile device on the receiver side 121 within the set time $T_0$, goes to Step S144 for calculation of the amounts of data.

The Steps S140 to S143 are procedures to control the picture data accumulating memory 24*a* according to the second embodiment.

Step S144: The gateway device on the receiver side 221, when receiving the CFR signal from the facsimile device on the receiver side 121, proceeds to the processing by the accumulated data amount calculating circuit 33 in the same manner as in the first embodiment. The accumulated data amount calculating circuit 33 calculates the amounts of data transmitted for one second from the gateway device on the receiver side 221 to the facsimile device on the receiver side 121 based on the transmission rate in communications between the gateway device on the receiver side 221 and the facsimile device on the receiver device 121. If the transmission rate is, for example, V.17 (14.4 kbps), the amount of data is 1800 bytes per one second.

Step S145: The accumulated data amount calculating circuit 33, after the calculation of the amount of data has been completed, calculates the necessary amounts of data based on the transmission rate and expected delay time. For example, the transmission rate is V.17 (14.4 kbps) and the expected delay time is 2 seconds, the required amounts of data are 1800 bytes×2=3600 bytes. The calculating processing by the accumulated data amount calculating circuit 33 is carried out during the accumulation of the picture data in the picture data accumulating memory 24*a*.

Step S146: After the accumulated data amount calculating circuit 33 has calculated the required amounts of data, the gateway device on the receiver side 221 proceeds to the processing in the accumulated data amount monitoring circuit 32 in the same manner as in the first embodiment. That is, the accumulated data amount calculating circuit 32, prior to the transmission of the picture data to the facsimile device on the receiver side 121, in order to check the amounts of data accumulated in the picture data accumulating memory 24*a* by the interruption processing, compares the required amounts of data with the accumulated amounts of data in the picture data accumulating memory 24a. From this comparison, if the accumulated amounts of data are judged to be larger than the required amounts of data, i.e., if the accumulated amounts of data reaches the required amounts of data, the gateway device on the receiver side 221 goes to Step S148 to transfer the picture data to the facsimile device on the receiver side 121 and, if the accumulated amounts of data is smaller than the required amounts of data, goes to Step S147 to continue accumulating the picture data.

Step S147: If the time elapsed after the facsimile device on the receiver side 121 has sent the second CFR signal reaches the set time $T_1$ while the facsimile device on the receiver side 121 is accumulating the picture data, the gateway device on the receiver side 221, even if the accumulated amounts of data is less than the required amounts of data, in order to avoid the communication breakdown, goes to Step S148 to start the transmission of the picture data to the facsimile device on the receiver side 121. Moreover, the gateway device on the receiver side 221 returns back to Step S146 and continues the accumulation of the necessary amounts of the picture data unless the elapsed time exceeds the set time $T_1$.

Step S148: The gateway device on the receiver side 221, as described above, if the above-described elapsed time exceeds the set time $T_1$ or after the accumulation of the necessary amounts of data, starts to send the picture data to the facsimile device on the receiver side 121 in the same manner as at the Step S121.

As described above, in the gateway device on the receiver side 221 of the second embodiment, although each of the accumulated data amount calculating circuit 33 and the accumulated data amount monitoring circuit 32 performs the same processing as in the first embodiment to avoid the breakdown of communications between the gateway device on the receiver side 221 and the facsimile device on the receiver side 121 caused by delays in communications developed in the packet communication network 400, procedures of accumulating the picture data in the picture data accumulating memory 24a are different from those in the first embodiment. That is, to secure the time required for accumulating the necessary amounts of data, after the DCS signal is transferred from the gateway device on the receiver side 211 to the facsimile device on the receiver side 121 and the TCF signal is then sent before the time elapsed after the facsimile device on the receiver side 121 has sent the first CFR signal exceeds the set time $T_1$, new DCS and TCF signals are sent out to the facsimile device on the receiver side 121. Therefore, the transmission of the picture data is started without causing the communication breakdown between the gateway device on the receiver side 221 and the facsimile device on the receiver side 121 during the accumulation of the picture data.

Thus, according to the facsimile communication system of the second embodiment of the present invention, the picture data can be sent out from the gateway device on the receiver side 221 to the facsimile device on the receiver side 121 even in the development of delays in communications in the packet communication network caused by fluctuations in the communication network without being affected by the breakdown of the facsimile communications. Thus, the facsimile communication system can avoid the forced breakdown of the facsimile communications based on the judgement by the facsimile communication system that the communication failure has occurred due to the delays in communications, resulting in improvement of the quality of communications in the network.

In the first and second embodiments described above, the example of the case where the communication breakdown between the gateway device on the receiver side 221 and the facsimile device on the receiver side 121 caused by delays in communications due to fluctuations between both gateway devices 211 and 221 can be prevented.

Third Embodiment

In the embodiments including a third embodiment described below, examples of cases are shown where the communication breakdown between both gateway devices 111 and 211 caused by delays in communications due to fluctuations in the network between both gateway devices can be prevented.

Though general configurations of the facsimile communication system according to the third embodiment are the same as those in FIG. 3, as is described later by referring to FIGS. 12 and 13, configurations of the facsimile device on the sender side 111 and the gateway device on the sender side 211 are specific to the facsimile communication system of the third embodiment, which are constructed so as to avoid the breakdown of communications between the facsimile device on the sender side 111 and the gateway device on the sender side 211 caused by fluctuations in the network between both the gateway devices.

The gateway device on the sender side 211 of the third embodiment proceeds to accumulative communications to avoid the communication failure between the facsimile device on the sender side 111 and the gateway device on the sender side 211 even if delays in communications in the packet communication network 400 develop when the request for processing to the device 211 occurs during real time communications which can respond immediately. The accumulative communications represent a series of processes in which the gateway device on the sender side 211, before the completion of the receipt of all the picture data to be sent from the facsimile device on the sender side 111, sends the picture data, in consecutive order, from the facsimile device on the sender side 111 to the gateway device on the receiver side 221 or, after receiving all the picture data, gives an instruction for disconnection of communications between the gateway device on the sender side 211 and the facsimile device on the sender side 111 to the facsimile device on the sender side 111 and, after the facsimile device on the sender side 111 has completed the disconnection of communications, sends the picture data that has been already accumulated to the gateway device on the sender side 221 from the facsimile device on the sender side 111 in consecutive order. That is, when the delays in communications occurs, the gateway device on the sending side 211, when receiving an EOP signal showing a termination of the procedure from the facsimile device on the sender side 111 a predetermined number of times, without waiting for the receipt of a first MCF signal being a confirming signal to receive all the picture data, fed from the facsimile device on the receiver side 121 through the gateway device on the receiver side 221, sends a second MCF signal being a message confirming signal with additional information used to inform the proceeding from the real-time communication to the accumulative communications. The facsimile device on the sender side 111, when receiving the second MCF signal, disconnects the communication with the facsimile device on the sender side 111. The details will be explained below.

Figure 12:
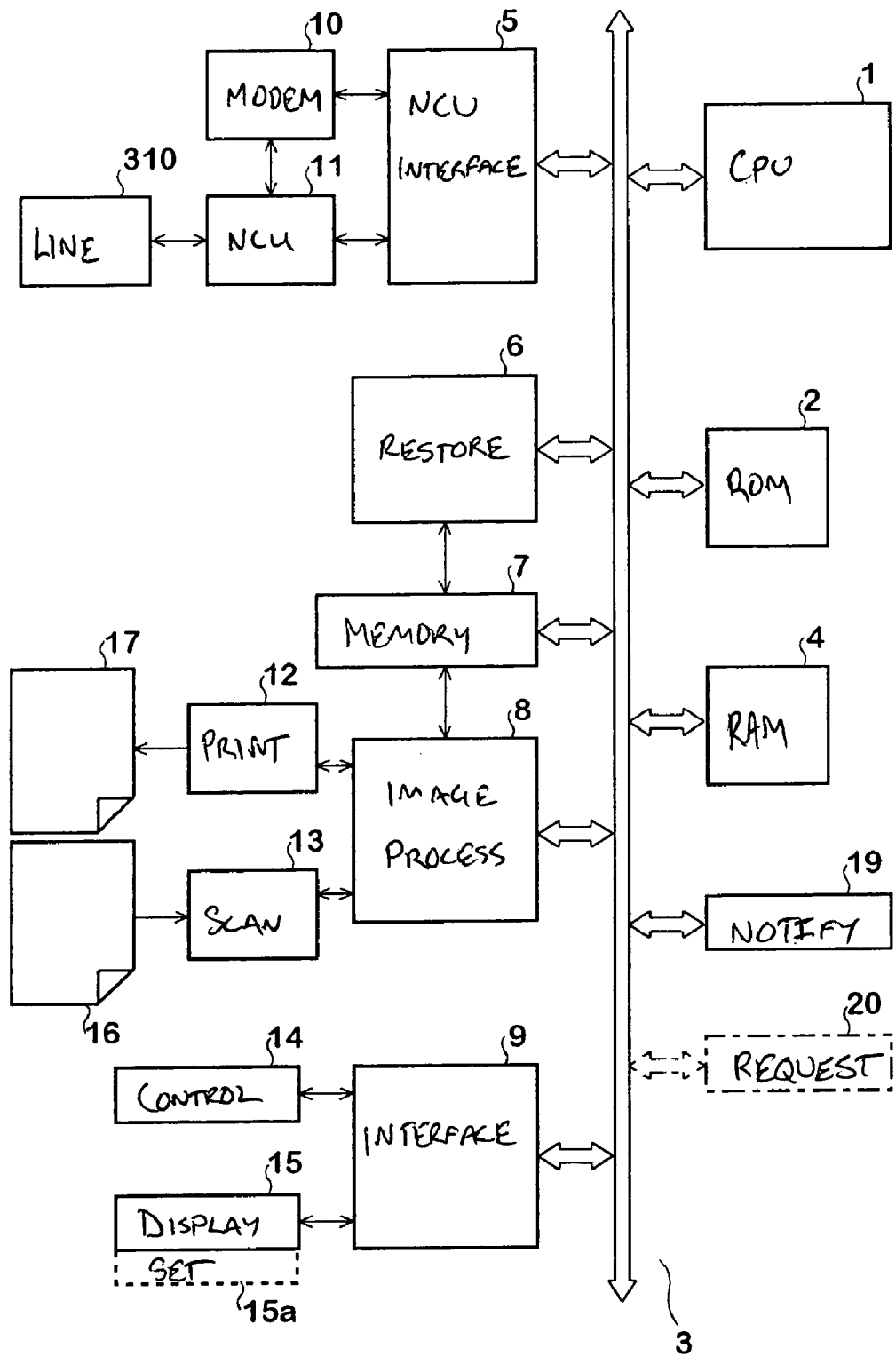
FIG. 12 is a schematic block diagram showing configurations of a facsimile device according to a third to fifth embodiments.
Figure 13:
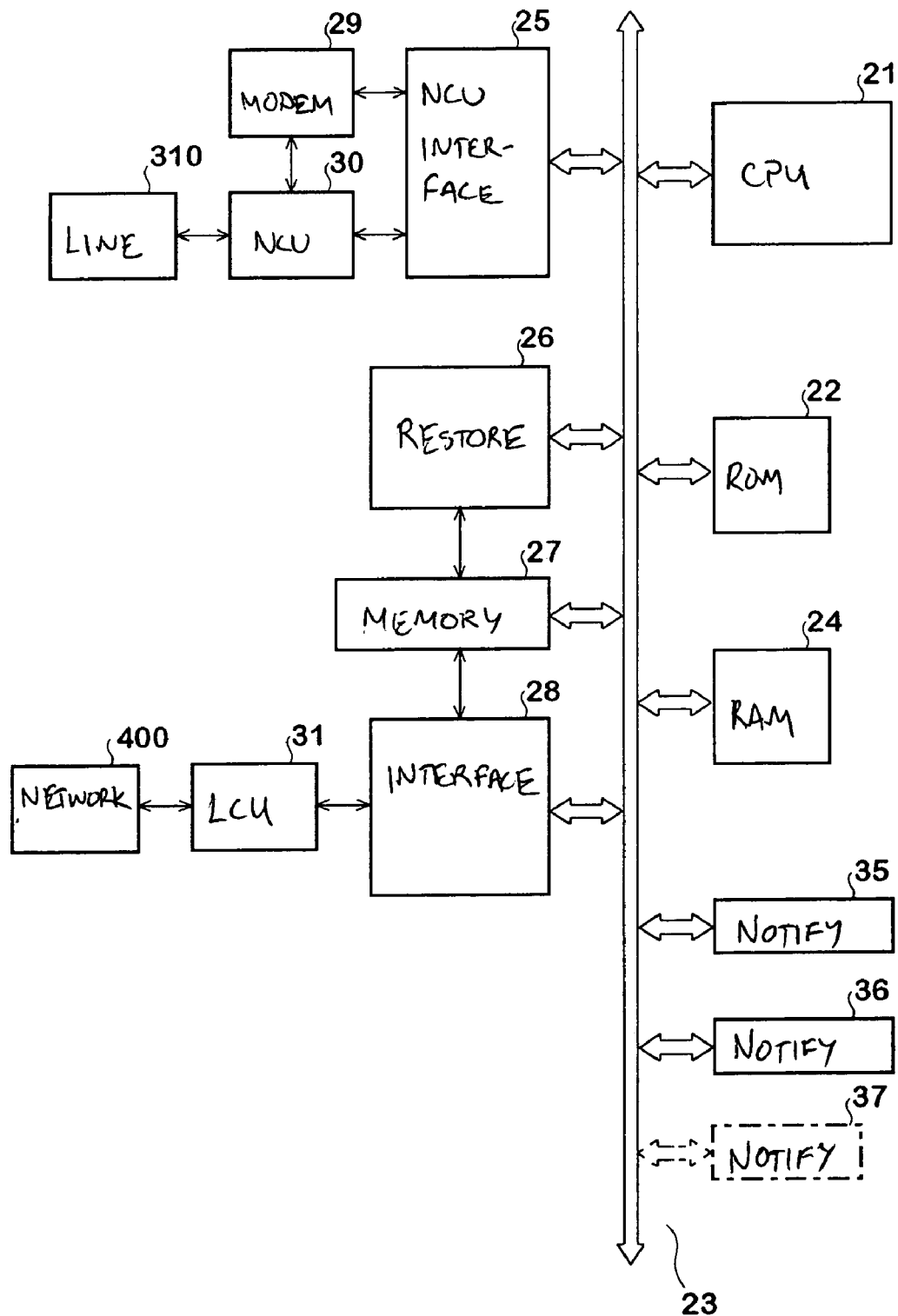
FIG. 13 is a schematic block diagram showing configurations of a gateway device according to the third to fifth embodiments.

Configurations of the facsimile device and gateway device according to the third to fifth embodiments are shown in FIGS. 12 and 13. In FIGS. 12 and 13, same reference numbers are assigned to parts having the same functions as those in the first and second embodiments. As shown in FIGS. 12 and 13, as a configuration featuring the facsimile device on the sender side 111 of the third embodiment, a capability declaration notifying section 19 is additionally provided. Moreover, the gateway device on the sender side 211 is provided with an accumulative communication proceeding notifying section 35 being a first notifying section and a switching function notifying section 36 being a second notifying section 36.

The switching function notifying section 36 of the gateway device on the sender side 211 notifies the facsimile device on the sender side 111 of the fact that the gateway device 211 has the function of notifying the switching from the real-time communication to the accumulative communications, i.e., the function of notifying the switching. The accumulative communication proceeding notifying section 35 of the gateway device on the sender side 211 notifies, by using the function, the facsimile device on the sender side 111 of the fact that the gateway device on the sender side 211 is switched from the real-time communication to the accumulative communications. The capability declaration notifying section 19 mounted in the facsimile device on the sender side 111, in response to the notification by the switching function notifying section 36, notifies the gateway device on the sender side 211 of the fact that the facsimile device 111 has the function of receiving the notification. The configurations featuring the system of the third embodiment may be provided not only for the devices on the sender side 111 and 211 but also for the facsimile device on the receiver side 121 and the gateway device on the receiver side 221 for mutual communications.

Figure 14:
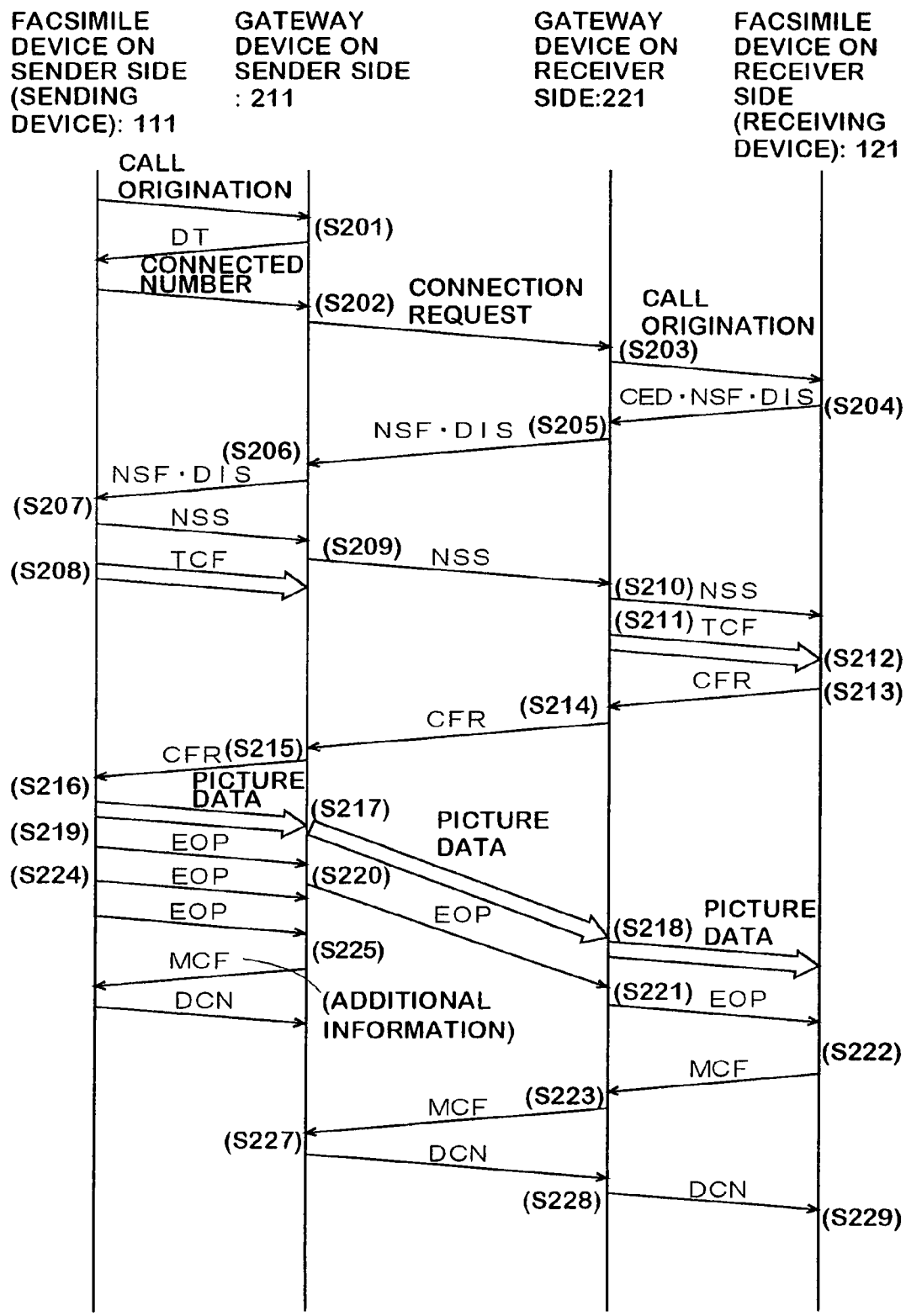
FIG. 14 is a diagram explaining communication procedures according to the third embodiment.
Figure 15A:
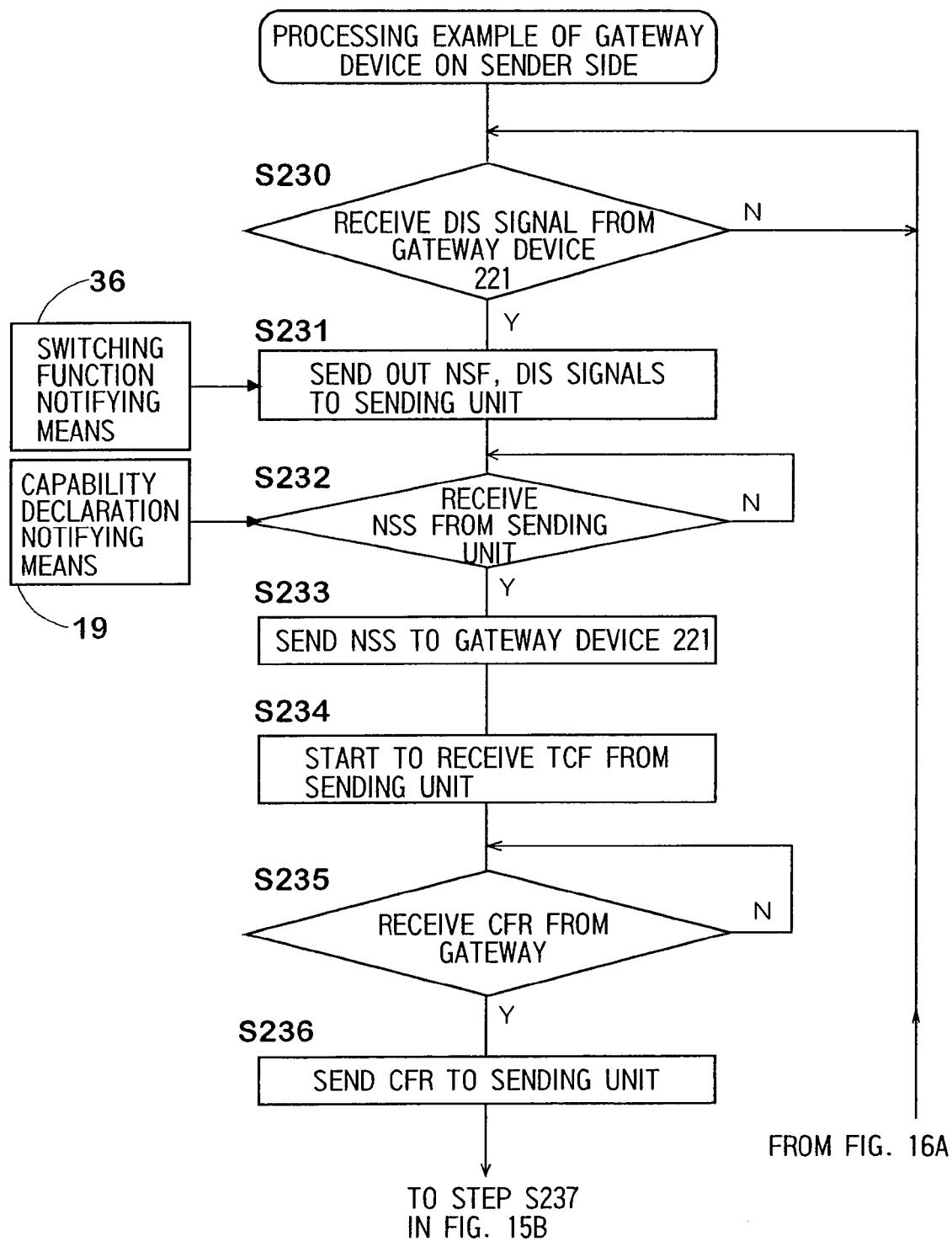
FIG. 15A is a first part of a flowchart explaining operations of the gateway device according to the third embodiment.
Figure 16A:
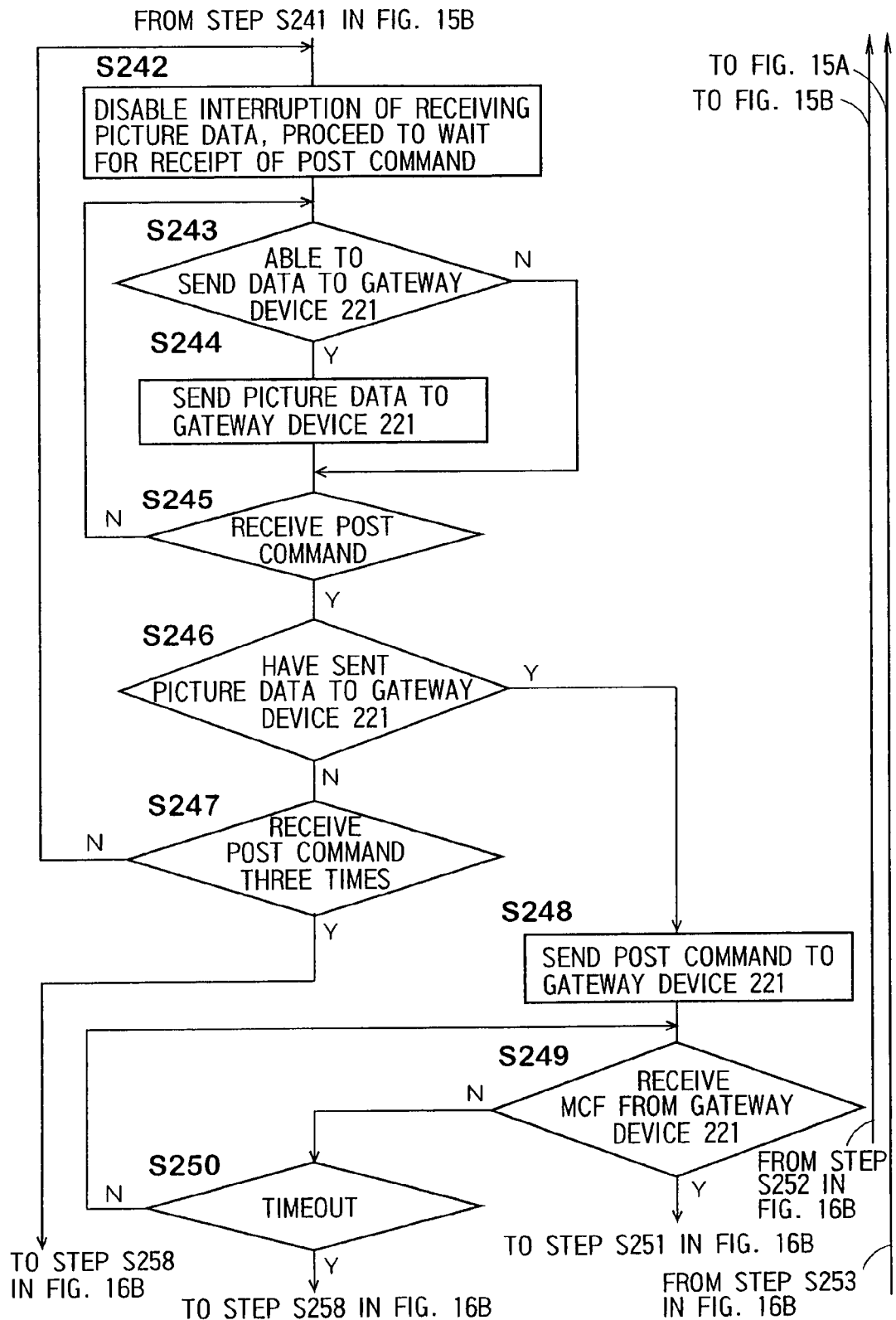
FIG. 16A is a third part of the flowchart explaining operations of the gateway device according to the third embodiment.

FIG. 14 is a diagram showing the whole communication procedures of the communication system shown in the third embodiment and showing sequence operations of the facsimile communication system of the third embodiment which represent lapses of time in order of steps shown in the direction from top to bottom. In FIG. 14, an example of a case where one page of an original to be sent is transmitted from the facsimile device on the sender side 111. Receiving and sending of signals in the whole system are described in order of steps of operations.

Step S201: When the facsimile device on the sender side 111 makes a call, the gateway device on the sender side 211 traps a line, returns a dial tone (DT) to the facsimile device on the sender side 111 and gets into an input waiting state.

Step S202: The gateway device on the sender side 211, when receiving a PB signal showing a dial number of a device to be connected from the facsimile device on the sender side 111, retrieves an address of the adequate packet network corresponding to the dial number from the destination address registered in the RAM 24 and, after adding a dial number of the facsimile device on the receiver side 121 being the device to be connected, sends a request for the connection to the gateway device on the sender side 221.

Step S203: The gateway device on the receiver side 221, when receiving the request for the connection, places a call on the facsimile device on the receiver side 121.

Step S204: The facsimile device on the receiver side 121, after having trapped the line and sent the CED signal to the gateway device on the receiver side 221, sends the DIS signal and an NSF signal to inform a non-standard function, i.e., a function not recommended by the ITU-T. The NSF signal is used to notify the fact that the gateway device 211 has a capability to perform the switching from the real-time communications to the accumulative communications.

Step S205: The gateway device on the receiver side 221 converts the DIS signal fed from the facsimile device on the receiver side 121 and the above NSF signals to packet data and sends it to the gateway device on the sender side 211.

Step S206: The gateway device on the sending side 211 gives the NSF signal the function to notify that the gateway device 211 has the function to perform the switching from the real-time communications to the accumulative communications. That is, information about availability of functions to notify the capability of performing the switching is added to a part of a plurality of bit signals representing the NSF signal. The gateway device on the sender side 211, when receiving the NSF signal and the DIS signal fed from the gateway device on the receiver side 221, sends these signals to the facsimile device on the sender side 111 through the modem 29. The gateway device on the sender side 211 achieves the function of notifying the switching from the real-time communications to the accumulative communications by sending the MCF signal designated by the above Recommendation T.30, i.e., the second MCF signal obtained by adding additional information described later to the first MCF signal, to the facsimile device on the sender side 111.

Step S207: The facsimile device on the sender side 111, when receiving the NSF signal fed from the gateway device on the sender side 211, recognizes, by the received NSF signal, the capability of the gateway device 211 that it has the function to perform the switching. Then, the facsimile device on the sender side 111 sends a non-standard function setting signal containing information showing that the facsimile device on the sender side 111 is capable of receiving the second MCF signal, i.e., an NSS signal, to the gateway device on the sender side 211 to notify that the facsimile device on the sender side 111 has the capability of receiving signals. That is, the facsimile device on the sender side 111 makes a capability declaration notification to the facsimile device on the sender side 111.

Step S208: The facsimile device on the sender side 111 sends the TCF signal, subsequent to the NSS signal, to the gateway device on the sender side 211.

Step S209: The gateway device on the sender side 211, after having deleted the information about the capability declaration contained in the NSS signal fed from the facsimile device on the sender side 111, i.e., the information showing that the facsimile device on the sender side 111 is capable of receiving the second MCF signal, converts the NSS signal to packet data and sends it to the gateway device on the receiver 221. Then, the gateway device on the sender side 211 proceeds to the receipt of the TCF signal fed from the facsimile device on the sender side 111.

Step S210: The gateway device on the sender side 221 sends the NSS signal fed from the gateway device on the sender side 211 through the modem 29 to the facsimile device on the receiver side 121.

Step S211: The gateway device on the receiver side 221 produces the TCF signal in the communication mode indicated by the NSS signal fed from the gateway device on the sender side 211 and sends it to the facsimile device on the receiver side 121.

Step S212: The facsimile device on the receiver side 121 receives the TCF signal from the gateway device on the receiver side 221.

Step S213: The facsimile device on the receiver side 121, when receiving the TCF signal, returns the CFR signal back to the gateway device on the receiver side 221.

Step S214: The gateway device on the receiver side 221 converts the CFR signal fed from the facsimile device on the receiver side 121 to packet data and returns it to the gateway device on the sender side 211.

Step S215: The gateway device on the sender side 211 returns the CFR signal fed from the gateway device on the receiver side 221 to the facsimile device on the sender side 111 through the modem 29.

Step S216: The facsimile device on the sender side 111, when receiving the CFR signal fed from the gateway device on the sender side 211, proceeds to send the picture data.

Step S217: The gateway device on the sender side 211, when receiving the picture data from the facsimile device on the sender side 111, converts it to packet data and sends it to the gateway device on the receiver side 221.

Step S218: The gateway device on the receiver side 221 transfers the picture data fed from the gateway device on the sender side 211 to the facsimile device on the receiver side 121 through the modem 29. The gateway device on the receiver side 221, as is for the procedures of the second embodiment in FIG. 8, every time it receives the picture data from the gateway device on the sender side 211, sends the ACK signal showing the receipt of the picture data to the gateway device 211, however, to simplify the drawing, these procedures are omitted in FIG. 14.

Step S219: The facsimile device on the sender side 111, after returning all the picture data to be transmitted, to the gateway device on the sender side 211, sends the EOP signal to the gateway device on the sender side 211.

Step S220: The gateway device on the sender side 211, in the example shown in FIG. 14, after the completion of the transmission of the whole picture data to the gateway device on the receiver side 221, converts the EOP signal fed from the facsimile device on the sender side 111 to packet data and sends it to the gateway device on the receiver side 221.

Step S221: The gateway device on the receiver side 221 sends the EOP signal fed from the gateway device on the sender side 211 to the facsimile device on the receiver side 121 through the modem 29.

Step S222: The facsimile device on the receiver side 121, after receiving the EOP signal fed from the gateway device on the receiver side 221, returns the first MCF signal being a confirmation signal showing the receipt of the EOP signal, back to the gateway device on the receiver side 221.

Step S223: The gateway device on the receiver side 221 converts the first MCF signal fed from the facsimile device on the receiver side 121 to packet data and returns it to the gateway device on the sender side 211. The first MCF signal sent out from the gateway device on the receiver side 221, if it is returned to the gateway device on the sender side 211 because the communication delays in the packet communication network 400 does not develop, is returned back to the facsimile device on the sender side 111 from the gateway device 211. However, if the communication delays develop, because the communication failure occurs between the gateway device on the sender side 211 and the facsimile device on the sender side 111, in the example shown in FIG. 14, the following control is provided between the gateway device on the sender side 211 and the facsimile device on the sender side 111 in accordance with procedures designated in the Recommendation T.30, in order to avoid the communication failure even if the communication delays develop.

Step S224: The facsimile device on the sender side 111, after having sent the EOP signal at the Step S219, if the first MCF signal to be fed from the facsimile device on the receiver side 121 through both the gateway devices 221 and 211 is not returned within 3 seconds due to the delays in communications, sends out repeatedly the EOP signal every 3 seconds after the transmission of the above EOP signal.

Step S225: The gateway device on the sender side 211, if it receives the EOP signal consecutively three times from the facsimile device on the sender side 111 before receiving the first MCF signal from the facsimile device on the receiver side 121 through the gateway device on the receiver side 221, sends the second MCF signal to the facsimile device on the sender side 111. That is, if the delays in communications do not develop, the gateway device on the sender side 211, after receiving the first MCF signal from the facsimile device on the receiver side 121 through the gateway device on the receiver side 221, transfers the signal to the facsimile device on the sender side 111. However, the gateway device on the sender side 211, if the delays in communications develop, prior to the receipt of the first MCF signal, sends out the second MCF signal used to notify the switching to the accumulative communications, instead of the first MCF signal, to the facsimile device on the sender side 111. An additional information is added to the above second MCF signal, which includes, for example, 2 bits of signals (01) used to show that the gateway device on the sender side 211 is switched to the accumulative communications. This Step S225 will be again described later in detail.

Step S226: The facsimile device on the sender side 111, when recognizing the switching of the gateway device on the sender side 211 to the accumulative communications by the receipt of the second MCF signal for disconnecting the communications between the gateway device on the sender side 211 and the facsimile device on the sender side 111, sends the DCN signal to the gateway device on the sender side 211. This allows a normal termination of the communications without causing an accidental breakdown of the switching due to the above-described communication failure between the gateway device on the sender side 211 and the facsimile device on the sender side 111. Therefore, the second MCF signal including the additional information showing the switching to the accumulative communications serves as a disconnection instructing signal that instructs the facsimile device on the sender side 111 to disconnect the communications with the gateway device on the sender side 211.

Step S227: The gateway device on the sender side 211, after the communications between the gateway device on the sender side 211 and the facsimile device on the sender side 111 have been disconnected, waits for the first MCF signal to be fed from the gateway device on the receiver side 221 and, when receiving it, sends out the DCN signal to the gateway device on the receiver side 221.

Step S228: The gateway device on the receiver side 221 sends the DCN signal received from the gateway device on the sender side 211 to the facsimile device on the receiver side 121 through the modem 29.

Step S229: The facsimile device on the receiver side 121, when receiving the DCN signal from the gateway device on the receiver side 221, disconnects the communications between the gateway device on the receiver side 221 and the facsimile device on the receiver side 121. By the disconnection in communications between the gateway device on the sender side 211 and the facsimile device on the sender side 111 and between both the devices 221 and 121, the communication procedures taken between the facsimile device on the sender side 111 and the facsimile device on the receiver side 121 are all completed.

Operations featuring the gateway device on the sender side 211 will be described further in detail by referring to the flowchart shown in FIGS. 15A, 15B, 16A and 16B.

FIGS. 15A, 15B, 16A and 16B are first to fourth parts of a flowchart, respectively, explaining operations of the gateway device on the sender side 211 of the above system according to the third embodiment. The flowchart includes procedures for controlling operations between the receipts of the NSF signal and the DIS signal by the gateway device 211 from the gateway device on the receiver side 221 at the Step S206 and the sending of the DCN signal by the gateway device on the sender side 211 to the gateway device on the receiver side 221.

Step S230: The gateway device on the sender side 211 waits for the receipt of the NSF and DIS signals to be fed from the gateway device on the receiver side 221 as described at the Step S205 and, when receiving the signal, goes to the Step S231 to notify that the gateway device on the sender side 211 has the function of notifying the switching.

Step S231: The gateway device on the sender side 211 sends the DIS signal fed from the gateway device from the receiver side 221 to the facsimile device on the sender side 111. At the same time, the switching function notifying section 36 serving as a second notifying section of the gateway device on the sender side 211, in order to notify that the gateway device 211 has the function of notifying the switching from the real-time communications to the accumulative communications, as described at the Step S206, sets the bit indicating that the gateway device 211 has the above function, to the NSF signal and sends the signal to the facsimile device on the sender side 111.

Step S232: When the facsimile device on the sender side 111 receives the DIS and NSF signals from the gateway device on the sender side 211, as described at the Step S207, the capability declaration notifying section 19 of the facsimile device on the sender side 111 recognizes, by the NSF signal, that the gateway device on the sender side 211 has the function of notifying the switching described above. Then, the capability declaration notifying section 19 sends the NSS signal for notifying the gateway device on the sender side 211 that the facsimile device on the sender side 111 is capable of receiving the second MCF signal to the gateway device on the sender side 211. That is, the second MCF signal is a signal by which the gateway device on the sender side 211 notifies the switching to the accumulative communications and the capability declaration notifying section 19 notifies the gateway device on the sender side 211 that the facsimile device on the sender side 111 has the capability of receiving the second MCF signal, by sending the NSS signal to the gateway device on the sender side 211. This notification is called "capability declaration notification". The gateway device on the sender side 211 waits for the NSS signal to be fed from the facsimile device on the sender side 111 and, when receiving the signal, goes to Step S233 to send it to the gateway device on the receiver side 221.

Step S233: The gateway device on the receiver side 211, as described at the Step S209, after deleting the information about the capability declaration notification contained in the NSS signal fed from the facsimile device on the sender side 111, converts the NSS signal containing the information about the communication mode or the like to packet data and sends it to the gateway device on the receiver side 221.

Step S234: The gateway device on the sender side 211, after having sent out the NSS signal, waits for the receipt of the TCF signal to be fed from the facsimile device on the sender side 111.

Step S235: The gateway device on the sender side 211 waits for the receipt of the CFR signal which is a confirmation signal to show the completion of the preparation for receiving the picture data from the facsimile device on the receiver side 121 through the gateway device on the receiver side 221 and, then when receiving the CFR signal, goes to Step S236 to send the signal to the facsimile device on the sender side 111.

Step S236: The gateway device on the sender side 211, when receiving the TCF signal from the facsimile device on the sender side 111, sends the CFR signal to the facsimile device on the sender side 111.

Step S237: The gateway device on the sender side 211, after having sent out the CFR signal, allows the interruption for receiving the picture data from the facsimile device on the sender side 111 and goes to Step S256 to execute the interruption.

Step S256: Procedures for the interruption of the picture data to be performed by the gateway device on the sender side will be taken as follows. That is, the gateway device on the sender side 211, after allowing the interruption, receives the picture data from the facsimile device on the sender side 111 and starts to execute the interruption.

Step S257: The gateway device on the sender side 211, after storing the data into the RAM 24 to send the picture data to the gateway device on the receiver side 221, terminates the interruption and goes to Step S238 to check the accumulated amounts of data.

Step S238: The gateway device on the sender side 211 repeats the interruption processing to accumulate the picture data for one packet into the RAM 24 and, after storing the picture data, goes to Step S239 to send out it to the gateway device on the receiver side.

Step S239: The gateway device on the sender side 211, prior to sending the picture data to the gateway device on the receiver side 221, checks whether the picture data can be sent to the packet communication network 400. If it is judged that the picture data would be sent to the gateway device on the receiver side 221 without any problem, goes to Step S240 to send out the picture data, and if the picture data cannot be sent, makes the transmission of the picture data pending and then goes to Step S241 to consecutively receive the picture data.

Step S240: The gateway device on the sender side 211, to send the picture data fed from the facsimile device on the sender side 111 to the facsimile device on the receiver side 121, based on the judgement described above, sends the accumulated picture data to the gateway device on the receiver side 221.

Step S241: The gateway device on the sender side 211, if the receipt of all the picture data to be sent is complete after the picture data has been sent out, goes to Step S242 to disable the interruption for receiving the picture data and, if the receipt of all the picture data is not complete, returns back to the Step S238 to consecutively accumulate the picture data fed from the facsimile device on the sender side 111.

Step S242: The gateway device on the sender side 211, when completing the receipt of all the picture data, after disabling the interruption for receiving the picture data, proceeds to wait for the receipt of a post command showing a subsequent request for processing from the facsimile device on the receiver side 111. One example of cases for the receipt of the post command is shown in FIG. 14 where the gateway device on the sender side 211 receives the EOP signal showing that the facsimile device on the sender side 111 has completed the transmission of all the picture data as the post command from the facsimile device on the sender side 111.

Step S243: The gateway device on the sender side 211, while waiting for the receipt of the post command, in the same manner as at the Step S239, monitors the state of communications in the packet communication network 400 and if the gateway device on the sender side judges the picture data to be transmitted normally depending on the communication state to the gateway device on the receiver side 221 in a manner that is well known, goes to Step S244 to perform the transmission of the picture data, and if it judges the transmission of the picture data to be difficult, goes to Step S245 to continue to wait for the receipt of the EOP signal being the post command.

Step S244: The gateway device on the sender side 211, if it judges the picture data to be sent out at the Step S243, sends the picture data accumulated in the RAM 24 by the interruption for receiving the picture data, to the gateway device on the receiver side 221 in consecutive order. The gateway device on the sender side 211, after having sent the picture data to the gateway device on the receiver side 221 as described at the Step S218, receives the ACK signal sent in response to the receipt of the picture data from the gateway device 221 and then sends the next picture data.

Step S245: The gateway device on the sender side 211, while waiting for the receipt of the EOP signal, repeats the Steps S243 and S244 to perform the transmission of the accumulated data in the RAM 24 in consecutive order. The gateway device on the sender side 211, while waiting for the receipt of the EOP signal, if it receives the EOP signal, goes to Step S246 to send all the picture data to be sent to the gateway device on the receiver side 221.

Step S246: The gateway device on the sender side 211, after receiving the EOP signal, judges whether the transmission of all the picture data to the gateway device on the receiver side 221 is complete or not. If the transmission of all the picture data is complete, the gateway device on the sender side 211, goes to Step S248 to send the EOP signal to the gateway device on the receiver side 221 and if it is not complete, goes to Step S247 and continue the transmission of the picture data.

Step S247: The gateway device on the sender side 211, if, for example delays in communications develop in the packet communication network 400 during the transmission of the picture data to the gateway device on the receiver side 221, based on the judgement as to the communication delays between both the gates 211 and 221 as described at the Step S239, keeps the transmission of the picture data and the subsequent EOP signal pending. Because of this, the state of not sending the first MCF signal fed from the facsimile device on the receiver side 121 which responded to the EOP signal continues. The facsimile device on the sender side 111, as described at the Step S224, without waiting for the receipt of the first MCF signal fed from the facsimile device on the receiver side 121 where the state of not sending the first MCF signal continues, repeats the transmission of the EOP signal to the gateway device on the sender side until it receives the second MCF signal from the gateway device on the sender side 211. The gateway device on the sender side 211 which receives the EOP signal, in order to wait for the receipt of the first MCF signal fed from the facsimile device on the receiver side 121 through the gateway device on the receiver side 221 for the execution of the real-time communications, continues receiving the EOP signal, unless it receives the first MCF signal, until a predetermined time elapses, for example, until it receives the EOP signal from the facsimile device on the sender side 111 consecutively three times. The gateway device on the sender side 211, when receiving the EOP signal from the facsimile device on the sender side 111 three times, goes to Step S258 to proceed to the accumulative communications to avoid the communication failure between the gateway device on the sender side 211 and the facsimile device on the sender side 111.

Step S258: Procedures by which the gateway device on the sender side 211 performs the switching to the accumulative communications are as follows. That is, the first notifying section of the gateway device on the sender side 211, i.e., the accumulative communication proceeding notifying section 35, to notify the facsimile device on the sender side 111 of the switching to the accumulative communications by the gateway device on the sender side 211, as described at the Step S225, sends the second MCF signal to the facsimile device on the sender side 111.

Step S259: The facsimile device on the sender side 111, when receiving the second MCF signal, as described at the Step S226, sends the DCN signal showing that the communications between the gateway device on the sender side 211 and the facsimile device on the sender side 111 are disconnected, to the gateway device on the sender side 211. Then, the gateway device on the sender side 211 recognizes, by the receipt of the DCN signal, the disconnection of the communication by the facsimile device on the sender side 111.

Step S260: The gateway device on the sender side 211, after the communications between the gateway device on the sender side 211 and the facsimile device on the sender side 111 are disconnected, waits for the receipt of the first MCF signal to be fed from the gateway device on the receiver side 221 and, after receiving it, goes to Step S261 to terminate the communications between both the gateway devices 211 and 221.

Step S261: The gateway device on the sender side 211, to terminate the communications between both the gateway devices 211 and 221 in the packet communication network 400, sends the DCN signal to the gateway device on the receiver side 221 and terminates the accumulative communications. Then, as described at the Step S229, by the receipt of the DCN signal by the facsimile device on the receiver side 121, the communications between the facsimile device 121 and the gateway device on the receiver side 221 are disconnected and all procedures for the communications between the facsimile device on the sender side 111 and the facsimile device on the receiver side 121 are completed.

Step S248: As described at the Step S246, the gateway device on the sender side 211, if it has completed the transmission of all the picture data to the facsimile device on the sender side before it receives the EOP signal from the facsimile device on the sender side 111 three times, sends the EOP signal described at the Step S220 as the post command to the gateway device on the receiver side 221.

Step S249: The gateway device on the sender side 211, after sending the EOP signal to the gateway device on the receiver side 221, goes to Step S250 to continue to wait for the receipt of the first MCF signal fed from the gateway device on the receiver side 221 until the predetermined time and when receiving the first MCF signal, goes to Step S251 to send the signal to the facsimile device on the sender side 111.

Step S250: The gateway device on the sender side 211, during the real-time communications, if a timeout occurs while the gateway device 211 is waiting for the receipt of the first MCF signal, that is, as described at the Step S247, if the gateway device 211 receives the EOP signal from the facsimile device on the sender side 111 consecutively three times before receiving the first MCF signal, goes to Step S258 to switch to the accumulative communications in the same manner as described at the Step S258. Then, the gateway device on the sender side 211, after taking the procedures for the accumulative communications including the Steps S258 to S261, completes the procedures for communications between the facsimile device on the sender side 111 and the facsimile device on the receiver 121.

Step S251: The gateway device on the sender side 211, as described at the Step S249, if it receives the first MCF signal before the timeout occurs, transfers the first MCF signal to the facsimile device on the receiver side 111 and continues the real-time communications. That is, in the real-time communications, as well known, the gateway device on the sender side 211, after the completion of the smooth transmission of all the picture data fed from the facsimile device on the sender side 111 to the gateway device on the receiver side 221 without any stagnation of the transmission by the gateway device on the sender side 211 caused by delays in communications in the packet communication network 400, terminates the communications between the facsimile device on the sender side 111 and the facsimile device on the receiver side 121.

Step S252: At the Step S242, the example of the case where the post command is the EOP signal is described by referring to FIG. 14. Though the description is omitted in FIG. 14, at the Step S245 in the flowchart shown in FIG. 16A, the gateway device on the sender side 211, when receiving the MPS signal showing that the original to be sent from the facsimile device on the sender side as the post command has two or more pages from the facsimile device on the sender side 111, receives the picture data fed from the facsimile device on the sender side 111 after the gateway device on the sender side 211 has disabled the interruption, i.e., after the completion of the Step S242. The gateway device on the sender side 211 repeats the Steps S237 to S252 to receive the data for each page. The gateway device on the sender side 211, after the completion of the receipt of the picture data for all pages to be received by the gateway device 211, since it does not receive any new MPS signal, goes to Step S253.

Step S253: At the Step S245 in the flowchart in FIG. 16A, when the gateway device on the sender side 211 receives the EOM signal showing the termination of the message fed from the facsimile device on the sender 111, since, at this point, at the Step S251, the first MCF signal has been already transferred to the facsimile device on the sender side 111, the gateway device on the sender side 211, after transferring the MCF signal, returns back to the Step S230 to wait for the receipt of the DIS signal to be fed from the gateway device on the receiver side 221. However, as described above, the gateway device on the sender side 211, if it has received the EOP signal from the facsimile device 111 as the post command, after transferring the first MCF signal to the facsimile device on the sender side 111, goes to Step S254 to receive the DCN signal to be sent from the gateway device on the sender side 211.

Step S254: The gateway device on the sender side 211 waits for the receipt of the DCM signal showing that the facsimile device on the sender side 111 has disconnected the communications between both the devices 111 and 211, from the facsimile device on the sender side 111. The gateway device on the sender side 211, when receiving the DCN signal, goes to Step S255 to send this signal to the gateway device on the receiver side 221.

Step S255: The gateway device on the sender side 211, when recognizing, by the receipt of the DCN signal, the disconnection of the communications between the gateway device on the sender side 211 and the facsimile device on the sender side 111, to terminate the communications between both the devices 211 and 221 in the packet communication network 400, sends the DCN signal to the gateway device on the receiver side 221. The gateway device on the sender side 211 terminates the real-time communications by sending the DCN signal. Then, when the facsimile device on the receiver side 121 receives the DCN signal through the gateway device on the receiver 221, the communications between the facsimile device on the receiver side 121 and the gateway device on the receiver side 221 is broken down and all procedures for communications between the facsimile device on the sender side and the facsimile device on the receiver side 121 are terminated.

In the above descriptions, the example of control by the accumulative communication switching notifying means, i.e., the accumulative communication proceeding notifying section 35 on the switching from the real-time communications to the accumulative communications is explained based on the judgements made in Steps S247 and S250, however, this embodiment is not limited to the above two cases. Other control by other accumulative communication switch notifying means can be selected as necessary.

As described above, the gateway device on the sender side 211 of the third embodiment sends the NSF signal from the switching function notifying section 36 to the facsimile device on the sender side 111 to notify the facsimile device on the sender side 111 that the gateway device on the sender side 211 has the capability to send the second MCF signal used to notify the switching to the accumulative communications, i.e., the function of notifying the switching. The facsimile device on the sender side 111 which receives the NSF signal from the gateway device on the sender side 211, in response to the NSF signal, sends the NSS signal showing that the facsimile device on the sender side 111 has the capability of receiving the second MCF signal, from the capability declaration notifying section 19 to the gateway device on the sender side 211. After the above capabilities notified by the capability declaration notifying section 19 and by the switching function notifying section 36 are conformed between the facsimile device 111 and gateway device 211, the transmission of the picture data from the facsimile device on the sender side 111 to the gateway device on the sender side 211 is started. The facsimile device on the sender side 111, after sending out all the picture data, waits for the receipt of the first MCF signal from the facsimile device on the receiver side 121 through both the gateway devices 211 and 221. However, if the state continues that the gateway device on the sender side 211 does not receive the first MCF signal caused by the delays in communications in the packet communication network 400, since the facsimile device on the sender side 111 cannot receive the first MCF signal, it repeats the transmission of the EOP signal in accordance with communication procedures designated in the above Recommendation. According to the procedures designated in the Recommendation, before the gateway device on the sender side 211 receives the first MCF signal, if the predetermined time based on the time required for the repetition elapses, by the judgement that the communication failure has occurred between the gateway device on the sender side 211 and the facsimile device on the sender side 111, the communications between both the devices 211 and 111 are disconnected suddenly. That is, the gateway device on the sender side 211 does not transfer the first MCF signal to the facsimile device on the sender side 111 within the predetermined period of time during real-time communications, the communications between the facsimile device on the sender side 211 and the facsimile device on the sender side 111 are forcedly disconnected. According to the embodiment of the present invention, to avoid the sudden breakdown of the communications, the gateway device on the sender side makes the switching to the accumulative communications. That is, the gateway device on the sender side 211, in order to make the switching to the accumulative communications in which the device 211 waits for the receipt of the first MCF signal after normally terminating the communications between both the devices 211 and 111 without causing the above breakdown of communications, when the predetermined time elapses, prior to receiving the first MCF signal, sends the second MCF signal to notify the switching to the accumulative communications, to the facsimile device on the sender side 111 from the accumulative communication proceeding notifying section 35. The facsimile device on the sender side 111, when receiving the second MCF signal, recognizes that the gateway device on the sender side 211 have made the switching to the accumulative communications. Then, the gateway device on the sender side 211 sends the DCN signal used to disconnect the communications between the gateway device on the sender side 211 and the facsimile device on the sender side 111, to the gateway device on the sender side 211 to disconnect the communications between both the devices 211 and 111. The gateway device on the sender side 211, since it continues to wait for the receipt of the first MCF signal even if delays in communications develop in the packet communication network 400, in order to make the switching to the accumulative communications, notifies the switching from the real-time communications to the accumulative communications to the facsimile device on the sender side 111. By this notification, without causing the breakdown of communications between the gateway device on the sender side 211 and the facsimile device on the sender side 111, the communications between both the devices 211 and 111 can be terminated normally. Therefore, according to the facsimile communication system of the present invention, even if delays in communications develop, it can prevent the forced breakdown of the facsimile communication occurring based on the judgement by the facsimile communication system that a communication failure has occurred between the facsimile device on the sender side 111 and the gateway device on the sender side 211, thus, improving the quality of communications in the network.

Fourth Embodiment

In the above third embodiment, an example of the case where the gateway device on the sender side 211, after having notified the facsimile device on the sender side 111 of the switching to the accumulative communications, starts the accumulative communications.

In the fourth embodiment, additional procedures by which the gateway device on the sender side 211, by a request from the facsimile device on the sender side 111, notifies the facsimile device 111 of the information about the results of the accumulative communications, i.e., procedures for confirming notification are added to those described in the third embodiment. According to the facsimile device and gateway device of the fourth embodiment, in order to make the confirming notification, as shown by virtual lines (dotted lines) in FIGS. 12 and 13 showing the third embodiment, the facsimile device on the sender side 111 is provided additionally with a confirming notification requesting section 20 which serves as a notifying section of the device 111 and the gateway device on the sender side 211 is provided additionally with a confirmation notifying section 37 which serves as a second notifying section of the device 211.

The confirming notification requesting section 20 of the facsimile device on the sender side 111 requests the gateway device on the sender side 211 to notify the facsimile device on the sender side 111 of the information about the results of the accumulative communications, i.e., the information as to if the gateway device on the sender side 211 normally terminates the accumulative communications and the information about the time of the end of the accumulative communications. That is, the facsimile device on the sender side 111, via a confirming notification requesting section 20, requests the gateway device on the sender side 211 to make the confirming notification described above. The gateway device on the sender side 211, in response to the request from the facsimile device on the sender side 111 that the confirming notification should be made, sends the information about results of communications to the facsimile device on the sender side 111 via the confirmation notifying section 37. Moreover, the confirming notification requesting section 20 and the confirmation notifying section 37 featuring the fourth embodiment described above may be additionally mounted not only to both the devices on the sender side 111 and 211 but also to the facsimile device on the receiver side 121 and the gateway device on the receiver side 221.

Figure 17:
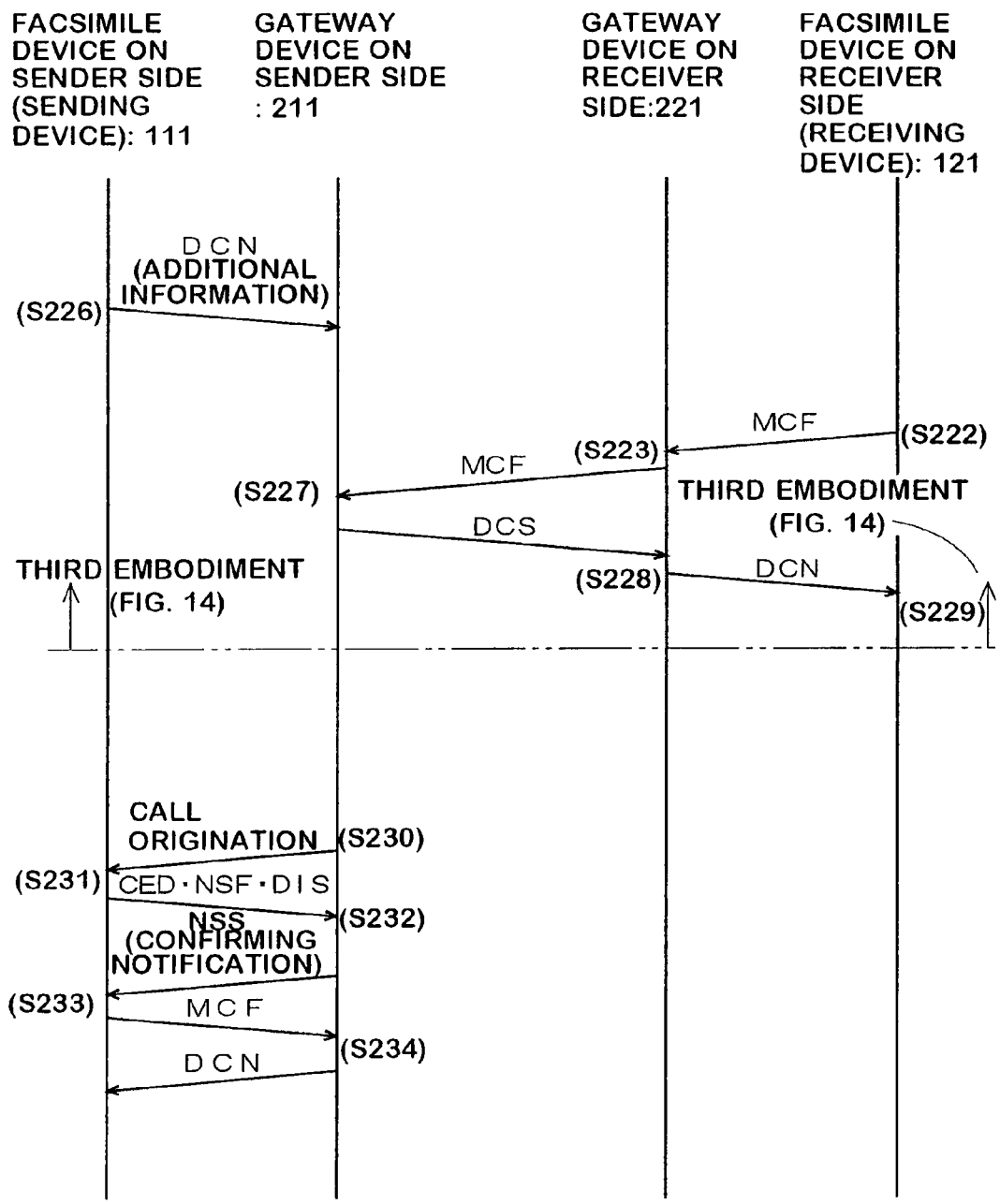
FIG. 17 is a diagram explaining communication procedures according to a fourth embodiment.

FIG. 17 is a diagram showing communication procedures according to the fourth embodiment, however, same procedures as explained in the third embodiment have been omitted in FIG. 7. In FIG. 17, Steps S226 to S234 featuring the fourth embodiment are included. The sequences of the embodiment will be described by referring to FIG. 17. Unlike in the case of the Step S226 in the third embodiment, in the Step S226 taken by the facsimile device on the sender side 111 in FIG. 17 in the fourth embodiment, an additional information is added to the DCN signal described in the third embodiment.

Figure 18:
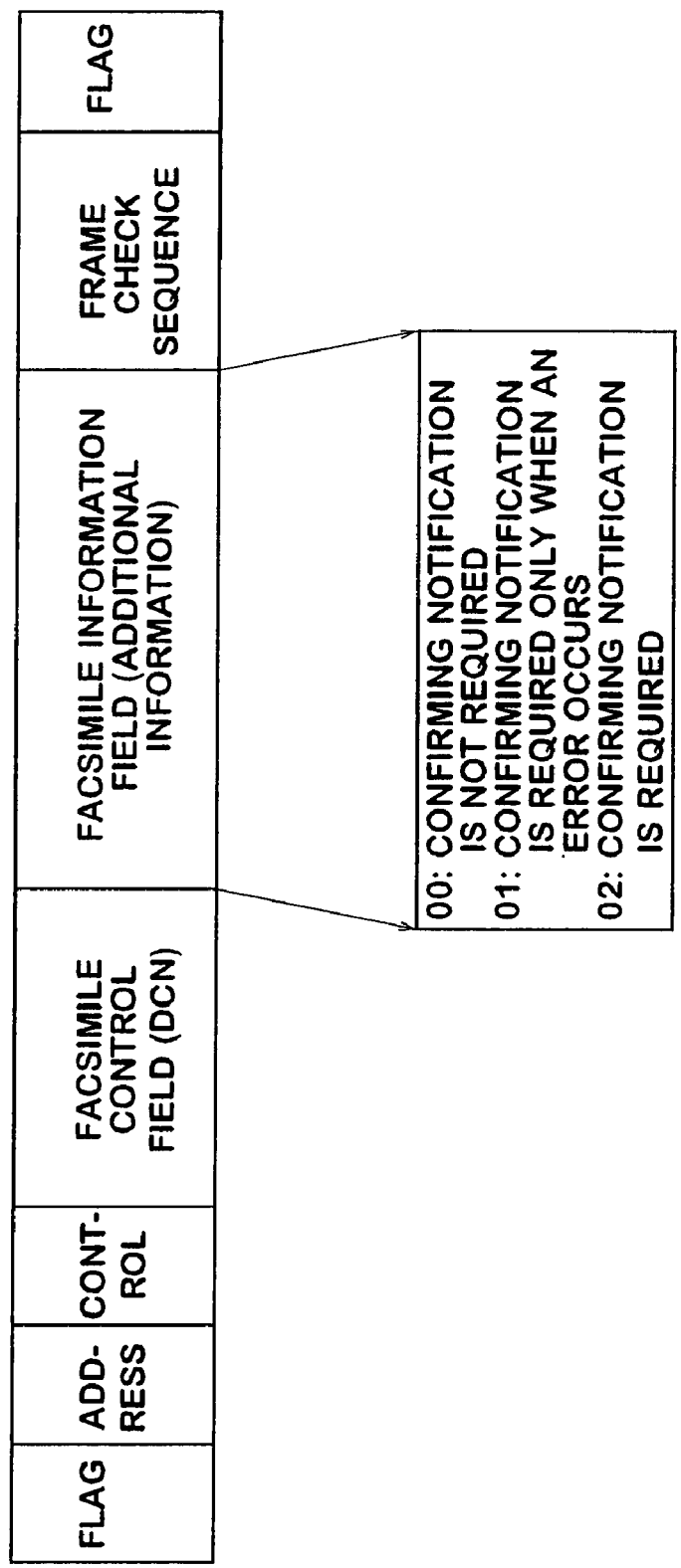
FIG. 18 is a diagram showing configurations of a DCN (first DCN signal) containing additional information.

Step S226: The facsimile device on the sender side 111 sends a first DCN signal with an additional information added to the gateway device on the sender side. The additional information is the information as to whether the facsimile device on the sender side 111 requests the gateway device on the sender side 211 to make the confirming notification of the accumulative communications. One additional information represented by a bit signal is selected out of a "00" signal showing that the confirming notification is not required, "01" signals showing that the confirming notification is required only when the accumulative communications are not terminated normally and "02" signals showing that the confirming notification is required regardless of existence of errors as shown in FIG. 18. In addition to the above notifying signal, another necessary additional signal can be contained, when each of two or more additional signals is delimited by a mark "·X·".

The same Steps as taken in the third embodiment are contained in the Steps S227 to S229 to be described below.

Step S227: The gateway device on the sender side 211, when receiving a first MCF signal from the facsimile device on the receiver side 121 after having received the first DCN signal, sends a second DCN signal for terminating communications between the gateway device on the receiver side 211 and the gateway device on the receiver side 221 to the gateway device on the receiver side 221. The second DCN signal is produced by removing the additional information about the request for the confirming notification described above.

Step S228: The gateway device on the receiver side 221 sends the second DCN signal fed from the gateway device on the sender side 211 to the facsimile device on the receiver side 121.

Step S229: The facsimile device on the receiver side 121, when receiving the second DCN signal from the gateway device on the receiver side, disconnects the communications between the gateway device on the receiver side 221 and facsimile device on the receiver side 121. When the communications between both the devices on the sender side 211 and 111 and between both the devices on the receiver side 221 and 121 are disconnected, the communications between the facsimile device on the sender side 111 and the facsimile device on the receiver side 121 are terminated.

Step S230: As described in the Step S226 in the fourth embodiment, the above additional information is added to the first DCN signal to be fed to the gateway device on the sender side 211. In the example shown in FIG. 17, the additional information shows the case of the "02" signals showing that the confirming notification is required regardless of existence of errors. The gateway device on the sender side 211, in order to make the notification, makes a call to the facsimile device on the sender side 111 after the completion of the communications described at the Step S229.

Step S231: The facsimile device on the sender side 111, when receiving the call from the gateway device on the sender 211, traps a line and, after sending the CED signal to the gateway device on the sender 211, sends the NSF and DIS signals. A bit signal showing that the facsimile device on the sender side 111 has a capability of receiving the confirming notification is set to the NSF signal.

Figure 19:
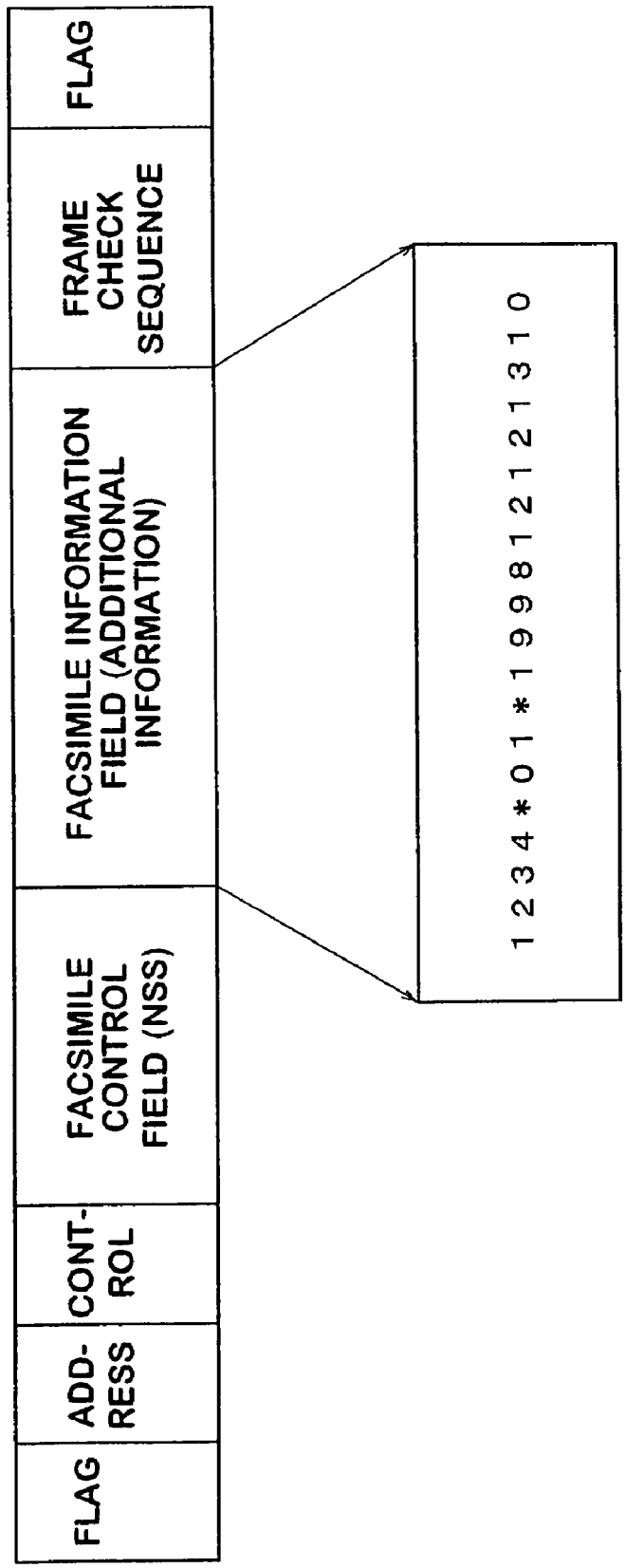
FIG. 19 is a diagram showing configurations of an NSS signal containing information used to make a confirming notification.

Step S232: The gateway device on the sender side 211, when receiving the NSF signal from the facsimile device on the sender side 111, in response to the request for the confirming notification added to the first DCN signal, performs the confirming notification. That is, the gateway device on the sender side 211 sends the NSS signal showing the information about results of the accumulative communications to the facsimile device on the sender side 111. The information contained in the NSS signal for the confirming notification described above includes an acceptance number, communication result, communication ending time or the like. Each of the information is delimited by the mark "·X·". The same value as has been added to the second MCF signal sent out by the gateway device on the sender side 211 at the Step S225 at the time of the switching to the accumulative communications is assigned to the acceptance number. In the example as shown in FIG. 19, numerals "1234" are set as the acceptance number. If the accumulative communications was not normally terminated, for example, if the gateway device on the sender side 211 could not receive the first MCF signal after the switching to the accumulative communications, the "00" signals are set as the bit signal showing result of the accumulative communications. If the accumulative communications was normally terminated, the "01" signal is set. Moreover, though, in the example, local time is set as the communication ending time, standard time can be set as well.

Step S233: The facsimile device on the sender side 111, when receiving the NSS signal from the gateway device on the sender side 211, confirms contents of the communication that has been notified by the confirming notification. The facsimile device on the sender side 111, in response to the NSS signal, returns the MCF signal showing that the signal has been received to the gateway device on the sender side 211.

Step S234: The gateway device on the sender side 211, after having sent the MCF signal, sends the DCN signal for disconnecting the communication between both the devices 211 and 111 to the facsimile device on the sender side 111. This causes the communications between the gateway device on the sender side 211 and the facsimile device on the sender side 111 to be all terminated.

Figure 20:
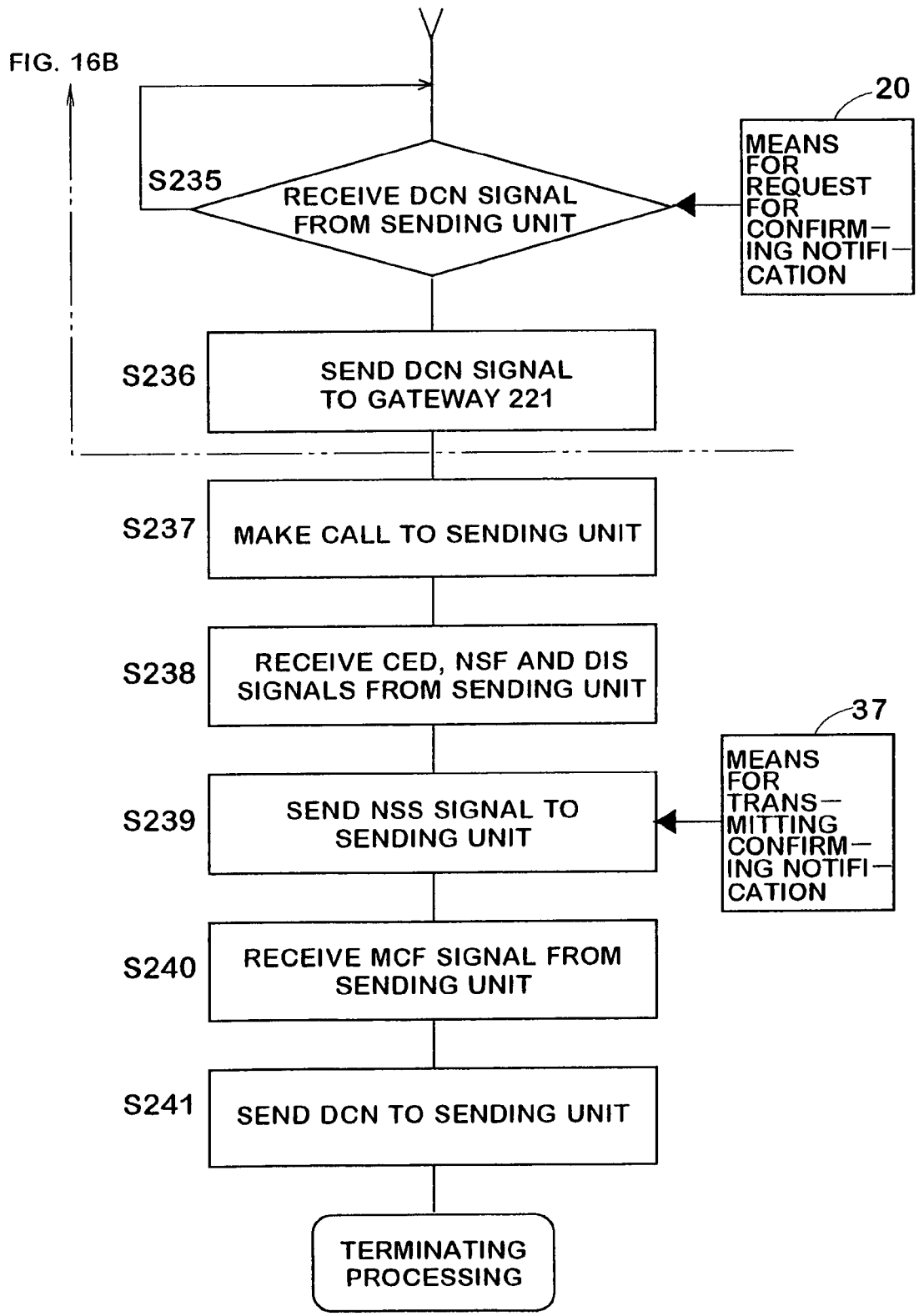
FIG. 20 is a flowchart explaining operations of the gateway device according to the fourth embodiment.

Next, operations of the gateway device on the sender side 211 will be described in details by referring to flowcharts shown in FIG. 20. FIG. 20 is a flowchart explaining operations of the gateway device on the sender side 211 of the facsimile communication system, which contains control operations from the receipt of the first DCN signal by the gateway device on the sender side 211 from the facsimile device on the sender side 111 to the transmission of the DCN signal by the gateway device on the sender side 211 to the facsimile device on the sender side 111.

Step S235: The facsimile device on the sender side 111 sends the first DCN signal containing the request for the confirming notification through its confirmation notifying section 37 to the gateway device on the sender side 211. The gateway device on the sender side 211, when receiving the first DCN signal from the facsimile device on the sender side 111, recognizes, by the first DCN signal received, whether the facsimile device on the sender side 111 requires the confirming notification or not. Then, the gateway device on the sender side 211 goes to Step S236 for sending the second DCN signal to the gateway device on the receiver side 221.

Step S236: The gateway device on the sender side 211, when receiving the first MCF signal from the facsimile device on the receiver side 121 after the receipt of the first DCN signal, as explained at the Step S227 of the fourth embodiment, sends the second DCN signal to the gateway device on the receiver side 221 and terminates communications between both the devices 211 and 221. Then, by the transmission of the second DCN signal from the gateway device on the receiver side 221 to the facsimile device on the receiver side 121, the communications between both the devices on the receiver side 221 and 121 are disconnected and the communications between the facsimile device on the sender side 111 and the facsimile device on the receiver side 121 are terminated.

Step S237: The gateway device on the sender side 211, as explained at the Step S230, after the communications between both the facsimile devices 111 and 121 are terminated, makes a call to the facsimile device 111 to provide the confirming notification to the facsimile device on the sender side 111.

Step S238: The facsimile device on the sender side 111 traps the line and, after sending the CED signal to the gateway device on the sender side 211, continues to transmit the NSF and DIS signals.

Step S239: The gateway device on the sender side 211, when receiving the NSF signal from the facsimile device on the sender side 111 and recognizing, by this signal, that the facsimile device on the sender side can receive the confirming notification, as explained at the Step S232, sends the NSS signal for making the confirming notification to the facsimile device on the sender 111 through the confirmation notifying section 37.

Step S240: The facsimile device on the sender side 111, after confirming contents of results of communications notified by the confirming notification by receiving the NSS signal from the gateway device on the sender side 211, in response to the NSS signal, returns the MCF signal showing the receipt of the NSS signal back to the gateway device on the sender side 211. The gateway device on the sender side 211, when receiving the MCF signal from the facsimile device on the sender side 111, goes to Step S241 to disconnect the communications between the gateway device on the sender side 211 and the facsimile device on the sender side 111.

Step S241: The gateway device on the sender side 211 sends the DCN signal to the facsimile device on the sender side 111 to terminate the communications between both the devices 111 and 211. Then, when the facsimile device on the sender side 111 receives the DCN signal and disconnects the communications between the gateway device on the sender side 211 and the facsimile device on the sender side 111, the procedures for communications between both the devices 211 and 111 are all completed.

As described above, the facsimile device on the sender side 111, when receiving the second MCF signal showing the switching to the accumulative communications from the gateway device on the sender side 211, sends the first DCN signal for requesting the gateway device on the sender side 211 to make the confirming notification to the gateway device on the sender side 211 from the confirming notification requesting section 20. Then, the facsimile device on the sender side 111 disconnects the communications between the facsimile device on the sender side 111 and the gateway device on the sender side 211. The gateway device on the sender side 211, when receiving the first MCF signal from the facsimile device on the receiver 121 after having received the first DCN signal, sends the second DCN signal to the facsimile device on the receiver side 121 through the gateway device on the receiver side 221 to terminate the accumulative communications. The gateway device on the sender side 211, in order to make the confirming notification requested by the facsimile device on the sender side 111, after terminating the accumulative communications and then making a call to the facsimile device on the sender side 111, transmits the NSS signal for making the confirming notification to the facsimile device on the sender side 111 from the confirmation notifying section 37.

As described above, the facsimile device on the sender side 111, by sending the first DCN signal to the gateway device on the sender side 211 through the confirming notification requesting section 20, can make a request for the confirming notification of the gateway device on the sender side 211. Moreover, by the confirming notification made by the gateway device on the sender side 211 through the confirmation notifying section 37 to the facsimile device on the sender side in response to the request described above, the facsimile device on the sender side 111 can obtain the information about results of the accumulative communications performed after the disconnection of the communications between both the devices 211 and 111.

Therefore, according to the facsimile communication system of the fourth embodiment, since additional effects that the facsimile device on the sender side 111 can obtain results of accumulative communications can be achieved, in addition to those effects achieved in the third embodiment, it is possible to perform communications with higher reliability.

Fifth Embodiment

In the fourth embodiment described above, the additional procedure is provided for those in the third embodiment, that is, the procedure in which the gateway device on the sender side 211 makes the above confirming notification to the facsimile device on the sender side 111. In this fifth embodiment, a valid period in which the facsimile device on the sender side 111 can receive the NSS signal being the information about results of the accumulative communications from the gateway device on the sender side 211 is set by the facsimile device on the sender side 111 and then the gateway device on the sender side 211 is adapted to make the confirming notification so as to match the valid period. That is, when a sender wants to obtain the information about results of the accumulative communications within a desired valid period of time, if the valid period is inputted in the facsimile device on the sender side 111, based on the information about the period, the NSS signal is sent from the gateway device on the sender side 211 to the facsimile device on the sender side 111 within the valid period. In the facsimile device of the fifth embodiment, in order to execute the procedure for setting the valid period, as shown by virtual lines (dotted lines) in FIG. 12, the facsimile device on the sender side 111 is provided with a valid period setting section 15a which serves as a setting section of the facsimile device 111. The valid period setting section 15a has a liquid crystal panel and a dial number operating key and, as shown in FIG. 12, is mounted at a part of the operation displaying section 15 of the facsimile device 111. The operation displaying section may be used as the valid period setting section 15a. The sender sets the valid period at the valid period setting section 15a.

Figure 21:
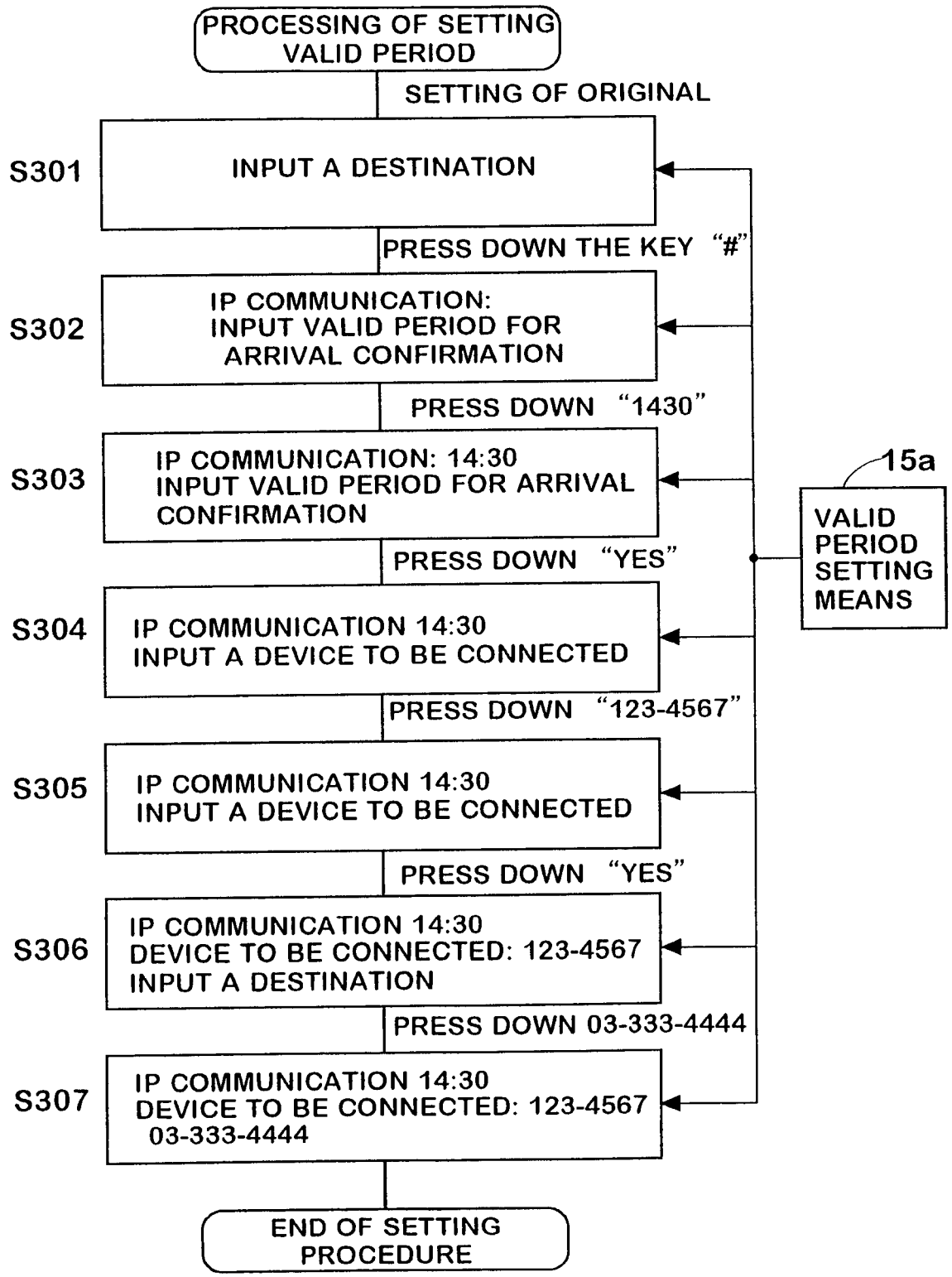
FIG. 21 is a flowchart explaining additional procedures for setting a valid period by a valid period setting means (a valid period setting section)

FIG. 21 is a flowchart explaining additional procedures for setting a valid period by a valid period setting means (i.e., the valid period setting section 15a). An operator who sends an original takes procedures as shown in FIG. 21 at the time of starting communications to set the valid period. Contents shown as procedures S301 to S307 in FIG. 21 represent messages displayed on the liquid crystal panel of the valid period setting section 15a.

Step S301: When the sending original is set by the operator, a message prompting the operator to enter a destination issued by the control from the CPU 1 (refer to FIG. 4) of the facsimile device on the sender side 111 is displayed on the liquid crystal panel.

Step S302: When a key "#" is pressed down by the operator using an operation key of the valid period setting section 15a, in response to the request for inputting the destination, operations of the facsimile device on the sender side 111 are switched to the IP communication mode by the control from the CPU. Then, the message prompting the operator to input the valid period by the control from the CPU is displayed on the panel.

Step S303: In response to the request for inputting the valid period, the operator inputs valid time. In the example shown in FIG. 21, numerals "1430" are inputted which means "14:30 (30 minutes past 14 o'clock)".

Step S304: After the "1430" is inputted by the operator, if an "YES" key is pressed down to confirm the inputting, a message prompting the operator to input a device to be connected to the IP network, i.e., a gateway number, is displayed on the panel.

Step S305: The operator inputs the gateway number "123-4567" representing the device to be disconnected.

Step S306: When the operator presses down the "YES" key confirming the number of the device to be connected, a message prompting the operator to input the destination by the control from the CPU is displayed on the panel.

Step S307: When the operator inputs the destination "03-333-4444), the facsimile device on the sender side 111 is switched to the operation in the communication mode to start the communication with the facsimile device on the receiver 121.

When procedures shown as Steps S301 to S307 are completed, the communications between the facsimile device on the sender side 111 and the facsimile device on the receiver side 121 are performed by steps described in the third and fourth embodiment.

Figure 22:
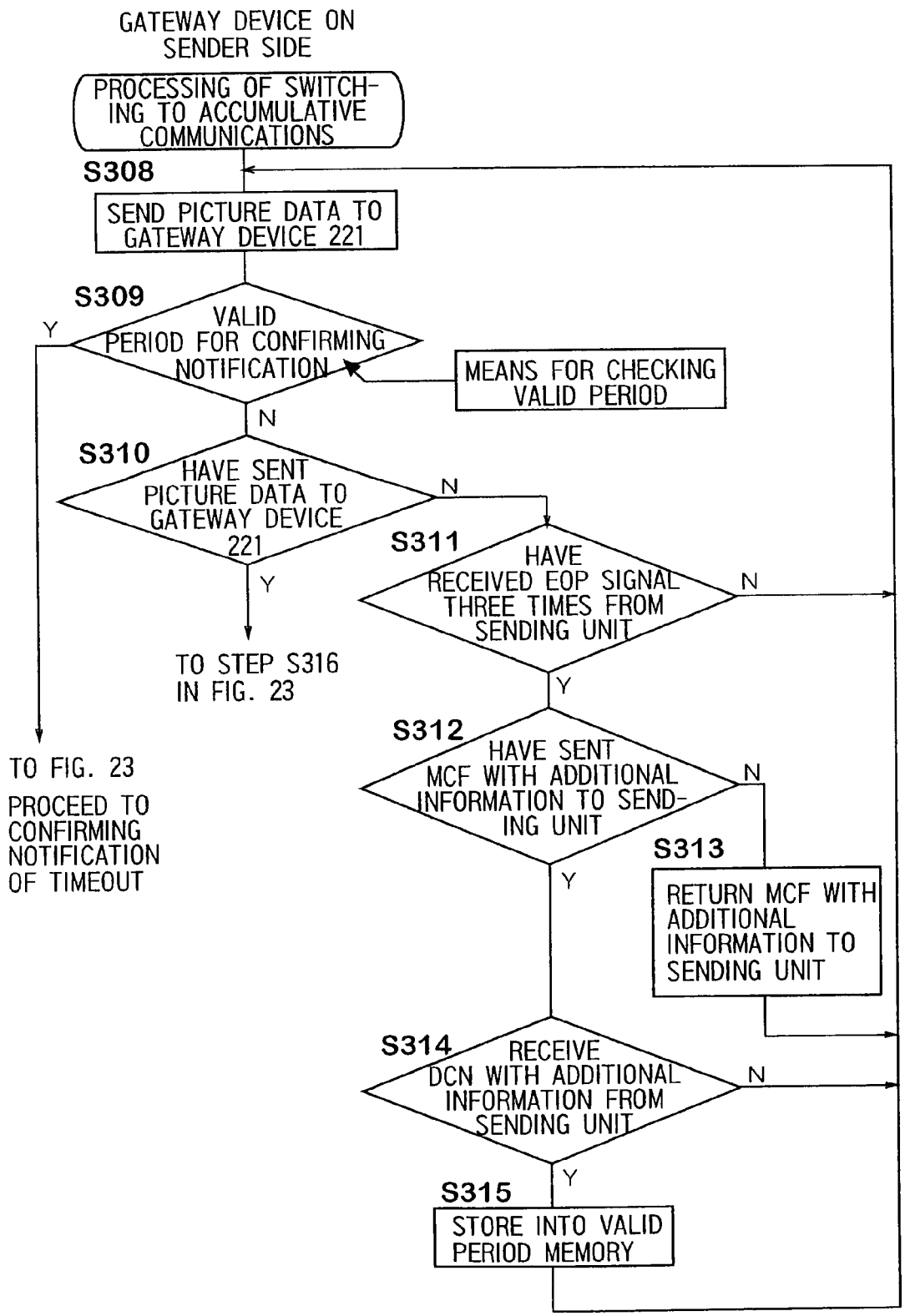
FIG. 22 is a first part of a flowchart explaining operations of the gateway device according to a fifth embodiment.

FIGS. 22 and 23 are first and second parts of a flowchart explaining operations of the gateway device according to the fifth embodiment. The flowchart in FIGS. 22 and 23 contains control operations from the start of receiving the picture data by the gateway device on the sender side 211 from the facsimile device on the sender side 111 at the Step S219 of the third embodiment in FIG. 14 and to the receipt of the DCN signal from the facsimile device on the sender side 111 at the Step S226 in FIG. 14.

Step S308: The gateway device on the receiver side 211, as explained at the Step S219 in FIG. 14, after having received the picture data from the facsimile device on the sender side 111, sends the picture data to the gateway device on the receiver side 221. Then, the gateway device on the sender side 211 continues to send the picture data to the gateway device on the receiver side 221.

Step S309: The gateway device on the sender side 211, if it has not yet undergone the procedure at the Step S315, after the completion of taking the above Step S308, goes to Step S310 disregarding the procedures at the Step S309. That is, the gateway device on the sender side 211, if it goes to the Step 10 and then up to Step S315 in consecutive order, returns to Step S308 and then goes to Step S309. The gateway device on the sender side 211 continues to monitor whether the time elapsed before it sends the picture data to the gateway device on the receiver side 221 is within the valid period. If the time elapsed before the gateway device on the sender side 211 completes the transmission of the picture data to the gateway device on the receiver side 221 is judged to have reached the valid period, the gateway device on the sender side 211 proceeds to make the confirming notification to notify the facsimile device on the sender side 111 within the valid period that a timeout has occurred. Moreover, if the time described above is judged to be within the valid period, the gateway device on the sender side 211 goes to Step S310 to continue the transmission in order to terminate the transmission of the picture data. When the gateway device on the sender side 211 makes the confirming notification of the timeout, (00) signals showing that accumulative communications are not normally terminated within the valid period is set, for example, as results of the communications, to the bit signal for the NSS signal described in the fourth embodiment and the time when the timeout has occurred is set as the communication ending time. After the completion of the above setting, the gateway device on the sender side 211 makes the same confirming notification as described in the fourth embodiment to the facsimile device on the sender side 111.

Step S310: The gateway device on the sender side 211 monitors whether the transmission of the picture data to the gateway device on the receiver side 221 is completed or not, and if it is completed, goes to Step S316 to receive the EOP signal from the facsimile device on the sender side 111, and if it is not completed, goes to Step S311 to continue to send the picture data.

Step S311: The gateway device on the sender side 211, if it has not yet completed the transmission of the picture data to the gateway device on the receiver side 221, checks whether it has received, three times, the EOP signal from the facsimile device on the sender side 111. The gateway device on the sender side 211, if it has not yet received three times the EOP signal, returns back to the Step S308 to continue the transmission of the picture data, and if it has already received it three times, goes to Step S312 to proceed to accumulative communications.

Step S312: The gateway device on the sender side 211 checks whether it has sent the second MCF signal to the facsimile device 111 and if it has not yet sent the second MCF signal, goes to Step S313 to transmit the signal, and if it has already sent the second MCF signal, goes to Step S314 to receive the first DCN signal and the additional information added to the first DCN signal.

Step S313: The gateway device on the sender side 211, after having sent the second MCF signal to the facsimile device on the sender side 111, returns to the Step S308 to continue the transmission of the picture data.

Step S314: The gateway device on the sender side 211 checks whether it has received the first DCN signal and additional information added to the signal from the facsimile device on the sender side 111. The additional information is one about the valid period. The gateway device on the sender side 211, if it has not yet received it, returns to the Step S308 and continues to send the picture data to the gateway device on the receiver side. The gateway device on the sender side 211, if it has not yet received the first DCN signal and the additional information, recognizes that the facsimile device on the sender side 111 has disconnected the communications between both the devices 211 and 111 and goes to Step S315 to store the valid period.

Step S315: The gateway device on the sender side 211, after storing the information about the valid period indicated by the additional information added to the first DCN signal into the memory and returns to the Step S308 to continue the transmission of the picture data. The RAM of the gateway device on the sender side 211 may be used as the memory to store the above information as well.

Procedures taken when the gateway device on the sender side 211 has completed the transmission of the picture data to the gateway device on the receiver side 221 in the Step S310 will be described below.

Step S316: The gateway device on the sender side 211 waits for the receipt of the EOP signal to be fed from the facsimile device on the sender side 111 and, after receiving the signal, goes to Step S317.

Step S317: The gateway device on the sender side 211 sends the EOP signal to the gateway device on the receiver side 221.

Step S318: The gateway device on the sender side 211 checks whether it has received the first MCF signal fed from the facsimile device on the sender side 111 through the gateway device on the receiver side 221 and, if it has received it, transfers the signal to the facsimile device on the sender side 111 and goes to Step S325 to continue the real-time communications, and if it has not yet received, goes to Step S319 to wait for the receipt of the signal.

Step S319: The gateway device on the sender side 211, in the case where it has not yet received the first MCF signal, while waiting for the receipt of the signal, if it receives the EOP signal three times from the facsimile device on the sender side 111, goes to Step S321 to proceed to the accumulative communications.

Step S320: The gateway device on the sender side 211, if it receives the EOP signal three times, sends the MCF signal for notifying the switching to the accumulative communications to the facsimile device on the sender side 111.

Step S321: The facsimile device on the sender side 111, when receiving the second MCF signal from the gateway device on the sender side 211, sends the first DCN signal and additional information about the valid period to the device 211. The facsimile device on the sender side 111 notifies the gateway device on the sender side 211 of the valid period and of the disconnection of the communications between the gateway device on the sender side 211 and the facsimile device on the sender side 111. The gateway device on the sender side 211 checks the receipt of the first DCN signal and the additional information from the facsimile device on the sender side 111 during the accumulative communications and, if it has not yet received, returns to the Step S318 and waits for the first MCF signal, and if it has received, goes to Step S322 to store the information about the valid period indicated by the additional information.

Step S322: The gateway device on the sender side 211, after storing the information about the valid period indicated by the additional information added to the first DCN signal into the memory, goes to Step S323 to check the valid period.

Step S323: The gateway device on the sender side 211, after storing the information about the valid period, checks whether the time elapsed while it is waiting for the receipt of the first MCF signal from the gateway device on the receiver side 221 is within the valid period. During the time required before the time is judged to be within the valid period, the gateway device on the sender side 211 repeats the procedure including the Steps S318 to S323 to wait for the receipt of the first MCF signal. Moreover, the gateway device on the sender side 211, if an timeout occurs before receiving the first MCF signal, i.e., if the time elapsed while the device 211 is waiting for the receipt of the signal is judged to have reached the valid period, proceeds to the confirming notification of the timeout, as described at the Step S309, that is used to notify the facsimile device on the sender side 111 within the valid time that the timeout has occurred.

Step S325: The gateway device on the sender side 211, if it is receiving the first MCF signal from the gateway device on the receiver side 221, sends the signal to the facsimile device on the sender side 111. The gateway device on the sender side 211 continues the real-time communications.

Step S326: The facsimile device on the sender side 111, when receiving the first MCF signal, sends the DCN signal to the gateway device on the sender side 211 and then terminates the communications between the facsimile device on the sender side 111 and the gateway device on the sender side 211. The gateway device on the sender side 211, after receiving the DCN signal from the facsimile device on the sender side 111, sends the signal to the facsimile device on the receiver side 121 through the gateway device on the receiver side 221. Then, the gateway device on the sender side 211 terminates the real-time communications.

At the Step S321, after the disconnection of the communications between the gateway device on the sender side 211 and the facsimile device on the sender side 111, i.e., after the switching to the accumulative communications, the gateway device on the sender side 211, if it receives the first MCF signal within the valid period, makes the same confirming notification as described in the fourth embodiment in order to notify the facsimile device on the sender side 111 that the accumulative communications is normally terminated.

Moreover, the facsimile device on the sender side 111, when receiving the confirming notification of the timeout from the gateway device on the sender side 211, may switch its communicating operations to direct communications with the facsimile device on the receiver side 121 using the public communication lines.

As described above, at the time of starting the communications between the facsimile device on the sender side 111 and the facsimile device on the receiver side 121, after the sender has set the valid period by using the valid period setting section 15a of the gateway device on the sender side 211, the facsimile device on the sender side 111 starts the communications with the facsimile device 121 to send the picture data to the facsimile device on the receiver side 121 through both the gateway devices 211 and 221. The gateway device on the sender side 211, after the start of the transmission of the picture data from the facsimile device on the sender side 111 to the gateway device on the receiver side 221, when switching its operations to the accumulative communications, sends the second MCF signal to the facsimile device on the sender side 111 by the same procedures as for the fourth embodiment. The facsimile device on the sender side 111, when receiving the second MCF signal, in order to request the gateway device on the sender side 211 to make the confirming notification within the valid period, sends the first DCN signal and the additional information about the valid period and then disconnects the communications between both the devices 111 and 211.

The gateway device on the sender side 211, after obtaining the information about the valid period indicated by the additional information fed from the facsimile device on the sender side 111, checks whether the time elapsed after the switching to the accumulative communications is within the valid period. The gateway device on the sender side 211, if the accumulative communications cannot be normally terminated, i.e., if the first MCF signal is not received within the valid period, sends the NSS signal to the facsimile device on the sender side 111 to make the confirming notification in order to notify the facsimile device on the sender side 111 of the information about the timeout. Moreover, the gateway device on the sender side 211, when the accumulative communications can be normally terminated within the valid time, in order to notify the facsimile device on the sender side 111 of the information, makes the same confirming notification as described in the fourth embodiment.

As described above, in the facsimile communications between the facsimile device on the sender side 111 and the facsimile device on the receiver side 121 through the packet communication network 400, even if the accumulative communications are not terminated normally due to delays in communications in the packet communication network 400, the gateway device on the sender side 211 is adapted to perform the confirming notification within the valid period set by the valid period setting section 15a. Therefore, the sender, in order normally to terminate the transmission of the picture data from the facsimile device on the sender side 111 to the facsimile device on the receiver side 121, is allowed to take measures including the use of the public communication lines, thus providing the communication with higher reliability.

It is apparent that the present invention is not limited to the above embodiments but may be changed and modified without departing from the scope and spirit of the invention.

What is claimed is:

1. A facsimile communication system comprising:
a facsimile device on the sender side;
a gateway device on a sender side connectable through a telephone line to said facsimile device;
a gateway device on a receiver side connectable to said gateway device on the sender side through a communication line to which a protocol being different from that applied to said telephone line is applied;
a facsimile device on the receiver side connectable to said gateway device on the receiver side through the telephone line to which the same protocol as applied to said telephone line is applied; and
whereby said gateway device on the receiver side is provided with memory, to store data transferred from said gateway device on the sender side, used when said data is transmitted from said facsimile device on the sender side through both said gateway devices to said facsimile device on the receiver side, a monitoring circuit to monitor accumulated amounts of said data to be stored in said memory and an accumulated data amount calculating circuit operated to store, in said memory, amounts of data required to prevent communication failures between said gateway device on the receiver side and said facsimile device on the receiver side even when delays in communications develop prior to the start of transmission of said data from said gateway device on the receiver side to said facsimile device on the receiver side and operated to calculate said required amounts of data, and said gateway device on the receiver side is operated to start the transmission of said data to said facsimile device on the receiver side when said accumulated amounts of data to be monitored by said accumulated amount data calculating circuit exceed said required amounts of data;

wherein said gateway device on the receiver side calculates delays in communications in said communication line for every communication prior to the receipt of said data from said gateway device on the sender side and, when said gateway device on the receiver side judges that said communication failures may occur due to said calculated delays in communications, stores said required amounts of data in said memory based on said calculated delays in communications.

2. The facsimile communication system according to claim 1, wherein said delays in communications are calculated from expected delayed time data.

3. The facsimile communication system according to claim 1, wherein said gateway device on the receiver side judges, for every communication, whether said communication failures may occur or not based on not only said delays in communications but also a transmission rate in communications between said gateway device on the receiver side and said facsimile device on the receiver side.

4. A facsimile communication system comprising:
a facsimile device on a sender side;
a gateway device on the sender side connectable through a telephone line to said facsimile device;
a gateway device on a receiver side connectable to said gateway device on the sender side through a communication line to which a protocol being different from that applied to said telephone line is applied;
a facsimile device on the receiver side connectable to said gateway device on the receiver side through the telephone line to which the same protocol as applied to said telephone line is applied and, after receiving all data to be sent from said facsimile device on the sender side for every communication through said gateway device on the sender side and said gateway device on the receiver side, operated to return a receiving confirming signal showing completion of the receipt to said facsimile device on the sender side through said gateway on the receiver side and said gateway device on the sender side, and
whereby said gateway device on the sender side, after receiving said all data to be sent to said facsimile device on the receiver side from said facsimile device on the sender side and before receiving said receiving confirming signal from said facsimile device on the receiver side, sends a disconnection instructing signal instructing the disconnection of communications between said facsimile device on the sender side and said gateway device on the sender side to said facsimile device on the sender side;
wherein said receiving confirming signal is a first message confirmation function signal and wherein said gateway device on the sender side is provided with a first notifying section operated to send a second message confirmation function signal to said facsimile device on the sender side when, before said gateway device on the sender side receives said first message confirmation function signal from said facsimile device on the receiver side through said gateway device on the receiver side, said gateway device on the sender side receives an end-of-file signal, which show that the transmission of all the data from said facsimile device on the sender side to said gateway device on the sender side has been completed, by predetermined number of times from said facsimile device on the sender side;
wherein said facsimile device on the sender side is provided with a notifying section operated to send, when receiving said second message confirmation function signal, a first discontinue communication notification signal being the discontinue communication notification signal used to notify the termination of communications between said gateway device on the sender side and said facsimile device on the sender side containing additional information, to said gateway device on the sender side;
wherein said facsimile device on the sender side is provided with a valid period setting section operated to set a valid period when said facsimile device on the sender side is able to receive a non-standard function setting signal containing information showing that said gateway device on the sender side has received said first message confirmation function signal and wherein said facsimile device on the sender side, when receiving said second message confirmation function signal, sends said first discontinue communication notification signal with additional information added, to said gateway device on the sender side so that said gateway device on the sender side sends said non-standard function setting signal within said valid period to said facsimile device on the sender side.

5. The facsimile communication system according to claim 4, wherein said additional information is the information about said valid period.

6. The facsimile communication system according to claim 4, wherein said gateway device on the sender side is provided with a second notifying section and wherein said gateway device on the sender side, after receiving said first discontinue communication notification signal together with said additional information, sends a second discontinue communication notification signal used to terminate communications between said gateway device on the receiver side and said facsimile device on the receiver side to said facsimile device on the receiver side through said gateway device on the receiver side and then makes a call to said facsimile device on the sender side and, after having made the call, by using said second notifying section, sends said non-standard function setting signal to said facsimile device on the sender side.

7. A facsimile communication system comprising:
a first facsimile device on a sender side;
a first gateway device on the sender side connectable through a first telephone line to the first facsimile device;
a second gateway device on a receiver side connectable to the first gateway device through a communication line to which a protocol different from that applied to the first telephone line is applied;
a second facsimile device on the receiver side connectable to the second gateway device on the receiver side through a second telephone line to which the same protocol as is applied to the first telephone line is applied;

a picture data accumulating memory comprised in the second gateway device; and circuitry sending picture data from the picture data accumulating memory to the second facsimile device only after a preset interval of time, the preset interval of time being less than a communication failure time interval at which communication among the gateway devices and the facsimile devices is interrupted by at least one of those devices, due to a communication delay in the communication line, wherein the circuitry calculates the communication delays in the communication line for every communication prior to the receipt of data from the first gateway device and, when said second gateway device judges that communication failures may occur due to the calculated communication delays, stores required amounts of data in the accumulating memory based on the calculated communication delays.

8. The facsimile communication system according to claim 7, wherein the circuitry sending picture data comprises an accumulated data amount monitoring circuit;
an accumulated data amount calculating circuit; and
a timer.

9. The facsimile communication system according to claim 7, wherein the communication delays are calculated from expected delayed time data.

10. The facsimile communication system according to claim 7, wherein the second gateway device judges, for every communication, whether communication failures may occur or not based on not only the communication delays but also a transmission rate in communications between the second gateway device and the second facsimile device.

11. The facsimile communication system according to claim 7, wherein the second gateway device, when a time elapsed after the second facsimile device has completed a preparation for the receipt of data exceeds a predetermined threshold time being shorter than a threshold time for a communication breakdown set to communications between the second gateway device and the second facsimile device, regardless of whether the accumulation of required amounts of data in the memory is completed or not, transfers the data stored in the memory in consecutive order to the second facsimile device in order to prevent any breakdown of communications between the second gateway device on the receiver and the second facsimile device.

12. The facsimile communication system according to claim 7, wherein the picture data is compressed picture data.

13. The facsimile communication system according to claim 7, wherein the second gateway device, when receiving a digital communication signal showing a communication mode from the first facsimile device through the first gateway device, transfers the digital communication signal to the second facsimile device and, before receiving a confirmation of facsimile receipt signal showing a confirmation of the completion of receiving preparation from the second facsimile device which has responded to the digital communication signal, returns another confirmation of facsimile receipt signal used to receive the data from the first facsimile device through the first gateway device to the first facsimile device.

14. The facsimile communication system according to claim 7, wherein the second gateway device, when receiving a digital communication signal showing a communication mode from the first facsimile device through the first gateway device, transfers the digital communication signal to the second facsimile device and then sends a training check function signal used to check a receiving capability of the second facsimile device to the second facsimile device and, after completion of the transmission of the training check function signal, sends a new training check function signal to the second facsimile device before a time elapsed after the second facsimile device has completed a preparation for receiving data exceeds a predetermined threshold time being shorter than a threshold time for a communication breakdown set to communications between the second gateway device and the second facsimile device, in order to prevent the breakdown of communications between the second gateway device and the second facsimile device during the accumulation of the required amounts of data.

15. The facsimile communication system according to claim 7, wherein, after receiving all the data to be sent from the first facsimile device for every communication through the first gateway device and the second gateway device, operated to return a receiving confirming signal showing completion of the receipt to the first facsimile device through the second gateway device on the receiver side and the first gateway device, and whereby the first gateway device, after receiving all the data to be sent to the second facsimile device from the first facsimile device and before receiving the receiving confirming signal from the second facsimile device, sends a disconnection instructing signal instructing the disconnection of communications between the first facsimile device and the first gateway device to the first facsimile device.

16. The facsimile communication system according to claim 15, wherein the first facsimile device, when receiving the disconnection instructing signal, sends a communication ending signal showing a termination of communications to the first gateway device and wherein the first gateway device, when receiving the communication ending signal from the first facsimile device, makes a transmission of the communication ending signal to the second facsimile device pending and, when receiving the receiving confirming signal from the second facsimile device, sends the communication ending signal to the second facsimile device through the second gateway device.

17. The facsimile communication system according to claim 15, wherein the picture data is compressed picture data.

18. The facsimile communication system according to claim 15, wherein the receiving confirming signal is a first message confirmation signal and wherein the first gateway device is provided with a first notifying section operated to send a second message confirmation signal to the first facsimile device when, before the first gateway device receives the first message confirmation signal from the second facsimile device through the second gateway device, the first gateway device receives an end of file signal, which show that the transmission of all the data from the first facsimile device to the first gateway device has been completed, by a predetermined number of times from the first facsimile device.

19. The facsimile communication system according to claim 18, wherein the second message confirmation signal contains the disconnection instructing signal instructing the disconnection of communications between the first facsimile device and the first gateway device as additional information.

20. The facsimile communication system according to claim 18, wherein the first gateway device is provided with a second notifying section operated to send a non-standard function (NSF) signal showing that the first gateway device has a capability of sending the second message confirmation signal to the first facsimile device prior to the receipt of the data from the first facsimile device.

21. The facsimile communication system according to claim 20, wherein the first facsimile device is provided with a notifying section operated to send, when receiving the NSF signal, a non-standard function setting signal showing that the first facsimile device has a capability of receiving the second message confirmation signal.

22. The facsimile communication system according to claim 18, wherein the first facsimile device, when receiving the second message confirmation signal, sends a discontinue communication notification signal being a communication ending signal to the first gateway device to terminate communications and wherein the first gateway device, when receiving the first message confirmation signal after having received the discontinue communication notification signal, sends the discontinue communication notification signal to the second facsimile device through the second gateway device.

23. The facsimile communication system according to claim 18, wherein the first facsimile device is provided with a notifying section operated to send, when receiving the second message confirmation signal, a first discontinue communication notification signal being a discontinue communication notification signal used to notify the termination of communications between said first gateway device and said first facsimile device containing additional information, to the first gateway device.

24. The facsimile communication system according to claim 23, wherein the additional information contained in the first discontinue communication notification signal includes information as to whether the second facsimile device requests that the signal being a confirmation notifying signal containing the information as to whether the first gateway device has received the first message confirmation signal after the first gateway device has disconnected communications between the first gateway device and the first facsimile device be returned to the second facsimile device.

25. The facsimile communication system according to claim 23, wherein the first gateway device is provided with a second notifying section operated to send a non-standard function setting signal containing information as to whether the first gateway device has received the first message confirmation signal to the first facsimile device after the disconnection of communications between the first gateway device and the first facsimile device based on the first discontinue communication notification signal and wherein the first gateway device, after receiving the first discontinue communication notification signal, sends a second discontinue communication notification signal used to terminate communications between the second gateway device and the second facsimile device to the second facsimile device through the second gateway device and then makes a call to the first facsimile device and, after having made the call, sends the non-standard function setting signal to the first facsimile device.

26. The facsimile communication system according to claim 23, wherein the first facsimile device is provided with a valid period setting section operated to set a valid period when the first facsimile device is able to receive a non-standard function setting signal containing information showing that the first gateway device has received the first message confirmation signal and wherein the first facsimile device, when receiving the second message confirmation signal, sends the first discontinue communication notification signal with additional information added, to the first gateway device so that the first gateway device sends the non-standard function setting signal within the valid period to the first facsimile device.

27. The facsimile communication system according to claim 26, wherein the additional information is the information about the valid period.

28. The facsimile communication system according to claim 26, wherein the first gateway device is provided with a second notifying section and wherein the first gateway device, after receiving the first discontinue communication notification signal together with the additional information, sends a second discontinue communication notification signal used to terminate communications between the second gateway device and the second facsimile device to the second facsimile device through the second gateway device and then makes a call to the first facsimile device and, after having made the call, by using the second notifying section, sends the non-standard function setting signal to the first facsimile device.

* * * * *